(12) United States Patent
Kadowaki et al.

(10) Patent No.: US 10,223,984 B2
(45) Date of Patent: Mar. 5, 2019

(54) DISPLAY PANEL PRODUCTION CONTROL SYSTEM AND METHOD OF CONTROLLING DISPLAY PANEL PRODUCTION

(71) Applicant: SHARP KABUSHIKI KAISHA, Sakai, Osaka (JP)

(72) Inventors: Shinya Kadowaki, Sakai (JP); Hidefumi Yoshida, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/576,966

(22) PCT Filed: May 20, 2016

(86) PCT No.: PCT/JP2016/064974
§ 371 (c)(1),
(2) Date: Nov. 27, 2017

(87) PCT Pub. No.: WO2016/190229
PCT Pub. Date: Dec. 1, 2016

(65) Prior Publication Data
US 2018/0158421 A1 Jun. 7, 2018

(30) Foreign Application Priority Data
May 28, 2015 (JP) .................. 2015-108642

(51) Int. Cl.
*G09G 3/36* (2006.01)
*G05B 19/418* (2006.01)
(Continued)

(52) U.S. Cl.
CPC ............ *G09G 3/36* (2013.01); *G02F 1/1333* (2013.01); *G02F 1/1339* (2013.01);
(Continued)

(58) Field of Classification Search
CPC .... G02F 1/13; G02F 1/133514; G02F 1/1339; G02F 1/136286; G02F 1/1333;
(Continued)

(56) References Cited

U.S. PATENT DOCUMENTS 6,001,203 A * 12/1999 Yamada ................. C09J 163/10
156/106
7,218,374 B2 * 5/2007 Park ...................... G02F 1/1339
349/187
(Continued)

FOREIGN PATENT DOCUMENTS

JP 2008-033370 A 2/2008

*Primary Examiner* — Dmitriy Bolotin
(74) *Attorney, Agent, or Firm* — ScienBiziP, P.C.

(57) ABSTRACT

A production control system for liquid crystal panels includes a general design circuit board producing section configured to produce general design circuit boards, a frame processing section configured to process frames of the general design circuit boards based on an outline of the liquid crystal panels in an order from a customer, a customer terminal, a processor, and information and communication lines. At least the outline of the liquid crystal panels and an order quantity are input to the customer terminal by the customer. The processor is configured to control the general design circuit board producing section to produce the general design circuit boards and the frame processing section to process the frames of the general design circuit boards for an order quantity based on the outline of the display panels and the order quantity entered in the customer terminal.

15 Claims, 39 Drawing Sheets

(51) Int. Cl.
*G06Q 50/04* (2012.01)
*G02F 1/1335* (2006.01)
*G02F 1/1339* (2006.01)
*G02F 1/1362* (2006.01)
*G02F 1/1333* (2006.01)

(52) U.S. Cl.
CPC .. *G02F 1/133514* (2013.01); *G02F 1/136286* (2013.01); *G05B 19/418* (2013.01); *G06Q 50/04* (2013.01); *G02F 2201/56* (2013.01); *Y02P 90/02* (2015.11); *Y02P 90/30* (2015.11)

(58) Field of Classification Search
CPC .. G02F 2201/56; G05B 19/418; G06Q 50/04; G09G 3/36; Y02P 90/02; Y02P 90/30
See application file for complete search history.

(56) References Cited

U.S. PATENT DOCUMENTS

| | | | |
|---|---|---|---|
| 2001/0021000 A1* | 9/2001 | Egami | G02F 1/1341 349/187 |
| 2002/0080321 A1* | 6/2002 | Sugimura | G02F 1/1341 349/156 |
| 2003/0223030 A1 | 12/2003 | Byun et al. | |
| 2004/0001177 A1* | 1/2004 | Byun | G02F 1/1339 349/187 |
| 2005/0248715 A1 | 11/2005 | Byun et al. | |
| 2018/0143486 A1* | 5/2018 | Kadowaki | G02F 1/133 |

\* cited by examiner

DISPLAY PANEL PRODUCTION CONTROL SYSTEM AND METHOD OF CONTROLLING DISPLAY PANEL PRODUCTION

TECHNICAL FIELD

The present invention relates to a display panel production control system and a method of controlling display panel production.

BACKGROUND ART

Conventionally, a manufacturing system for producing liquid crystal display devices disclosed in Patent Document 1 has been known. The manufacturing system disclosed in Patent Document 1 includes a liquid crystal forming line, a sealant forming line, a bonding and curing line, an inspection line. The liquid crystal forming line is for dropping liquid crystals onto a first substrate. The sealant forming line is for dropping a sealant onto a second substrate. The bonding and curing line is for bonding the first substrate and the second substrate together and curing the sealant. The inspection line is for cutting the first and the second substrates that are bonded and cured into panel segments, polishing the panel segments, and inspecting the panel segments. The manufacturing system includes processes of: dropping the liquid crystals onto the first substrate using a dispenser; forming a UV curable sealant on the second substrate; vacuum-bonding the first and the second substrates; UV-curing the UV curable sealant; cutting the bonded substrates into cell segments; polishing the cut substrates in the segments; and performing a final inspection on the polished substrates.

RELATED ART DOCUMENT

Patent Document

Patent Document 1: Unexamined Japanese Patent Application Publication No. 2008-33370

Problem to be Solved by the Invention

A first problem in the manufacturing system for producing the liquid crystal display devices disclosed in Patent Document 1 is that photo masks that are used for producing first and second substrates and designed and produced for different types of liquid crystal panels are required to produce different types of liquid crystal panels having different outlines when an order for such liquid crystal panel are taken. Therefore, a period from an acceptance of the order to a shipment of the liquid crystal panels tends to be long. In addition, specially designed photo masks are required for every order and thus production costs of liquid crystal panels become high.

A second problem in the manufacturing system for producing the liquid crystal display devices disclosed in Patent Document 1 is that if the first and the second substrates in the liquid crystal panels are produced by a foundry on outsourcing basis, it is necessary to make an outsourcing order for every incoming order. Therefore, production costs of the first substrates and the second substrates tend to increase.

DISCLOSURE OF THE PRESENT INVENTION

The present invention was made in view of the above circumstances. A first object is to reduce a period from an acceptance of order to a shipment and a production cost of a display panel. A second object is to reduce a production cost of a general design circuit board.

Means for Solving the Problem

A first production control system for producing display panels with at least one type of outline specified in an order from a customer according to the present invention includes a general design circuit board producing section, a frame processing section, a customer terminal, a processor, and information and communication lines. The general design circuit board producing section is configured to produce general design circuit boards in general design including at least an estimate maximum outline of the liquid crystal panels in an expected order. The frame processing section is configured to process frames of the general design circuit boards based on the specified outline of the liquid crystal panels in the order from the customer. The customer terminal is configured to receive the specified outline of the liquid crystal panels and an order quantity entered by the customer. The processor is configured to control the general design circuit board producing section to produce the general design circuit boards and the frame processing section to process frames of the general design circuit boards for the order quantity based on the specified outline of the display panels and the order quantity entered in the customer terminal. The information and communication lines connect the general design circuit board producing section, the frame processing section, and the customer terminal to the processor for interactive information communication.

The processor controls the general design circuit board producing section to produce the general design circuit boards in general design including at least the estimated maximum outline of the liquid crystal panels in the expected order prior to an order from the customer. When the specified outline of the display panels and the order quantity are entered in the customer terminal by the customer, the processor controls the frame processing section to process the frames of the number of the general design circuit boards corresponding to the order quantity taken out from the general design circuit boards produced in advance to produce the display panels with the specified outline in the order. Therefore, a period between an acceptance of the order of the display panels and shipment (lead time) can be shortened. Because the frames of the general design circuit boards are processed by the frame processing section based on the specified outline of the display panels in the order, the display panels with different outlines can be produced at low cost.

Preferable embodiments of the first display panel production control system according to the present invention may have the following configuration.

(1) The production control system may include a memory configured to store ordered design information on the specified outline of the display panel in the order from the customer and general design information on the general design circuit boards. The processor may execute a process for checking the ordered design information against the general design information and outputting notification for modification of outline design of the display panels to the customer terminal if the ordered design information is incompatible with the general design information. When the customer enters the outline of the display panels and the order quantity into the customer terminal, the ordered design information on the outline of the display panels is stored in the memory. The processor checks the ordered design information on the outline of the display panels stored in the memory against the general design information on the general design circuit boards. If the ordered design information is incompatible with the general design information, the processor executes a process for outputting the notification to the customer terminal to prompt the modification of the outline design of the display panels. Therefore, the customer can modify the outline design of the display panels and make a new order. The "general design information" includes arrangement of lines and circuits in the general design circuit boards.

(2) The processor may execute a process for controlling the general design circuit board producing section to produce general design component boards including at least lines and general design counter boards including color filters as the general design circuit boards and a process for controlling the frame processing section to process frames of the general design component boards and the general design counter boards. The production control system may include a board bonding section configured to bond the general design component boards and the respective design counter boards together with sealing members between frames of the general design component boards and the general design counter boards. The processor may execute a process for controlling the frame processing section to partially remove at least sections of the lines and the color filters overlapping the sealing members. Because the processor may execute the process for controlling the frame processing section to partially remove at least the sections of the lines on the general design component boards and the color filters overlapping the sealing members, the lines on the general design component boards inside the sealing members are less likely to be degraded due to erosion. Furthermore, because the processor may execute the process for controlling the frame processing section to partially remove at least the sections of the color filters on the general design counter boards overlapping the sealing members, the sealing members between the frames directly adhere to the general design counter boards without the color filters when the general design component boards and the respective general design counter boards together. Therefore, the bonding strength of the sealing members to the general design counter boards increases.

(3) The processor may execute a process for controlling the general design circuit board producing section to produce general design component boards including at least lines and general design counter boards including at least color filters as the general design circuit boards and a process for controlling the frame processing section to selectively process frames of the general design component boards. The production control system may include a board bonding section configured to bond the general design component boards and the respective design counter boards together with sealing members between frames of the general design component boards and the general design counter boards. The processor may execute a process for partially removing at least sections of the lines overlapping the sealing members. Because the processor may execute the process for controlling the frame processing section to partially remove the sections of the lines on the general design component boards overlapping at least the sealing members, the lines on the general design component boards inside the sealing members are less likely to be degraded due to erosion. Because the processor may control the frame processing section to selectively process the frames of the general design component boards and not to process the frames of the general design counter boards, the production cost can be reduced.

(4) The processor may execute a process for controlling the general design circuit board producing section to produce general design base boards including plate surfaces within which multiple general design circuit boards are arranged. The production control system may include a memory configured to store a number of the general design circuit boards arranged within the plate surfaces of the respective general design base boards and order quantities of different types of the display panels if outlines and the order quantities regarding the different types of the display panels having different outlines are entered into the customer terminal. The processor may execute a process for calculating percentages of the order quantities of the different types of the display panels based on the order quantities of the different types of the display panels stored in the memory and controlling the frame processing section to process the frames of the general design circuit boards with the plate surface of the general design circuit boards within the plate surfaces of the general design base boards with the calculated percentages of the order quantities reflected to the process. The processor may execute the process for controlling the frame processing section to process the frames of the general design circuit boards arranged within the plate surfaces of the general design base boards. Therefore, the outlines in different types of display panels with outlies in different types can be efficiently prepared. The processor may calculate the percentages of the order quantities of the different types of display panels based on the order quantities stored in the memory. Furthermore, the processor may control the frame processing section to process the frames of the general design circuit boards with the percentages of the order quantities reflected to the process. Therefore, the different types of display panels can be produced and shipped at the same time. Various types of display panels can be efficiently produced and thus the delivery time can be shortened.

(5) The production control system may include a memory configured to store a production quantity of the general design circuit boards produced by the general design circuit board producing section, the order quantity of display panels entered in the customer terminal, an upper limit of stock of the general design circuit boards, and a lower limit of the stock of the general design circuit boards. The processor may calculate the stock of the general design circuit boards by subtracting the order quantity of the display panels from the production quantity of the general design circuit boards. The processor may execute a process for controlling the general design circuit board producing section to halt production of the general design circuit boards if the stock of the general design circuit boards has reached the upper limit of the stock of the general design circuit boards. The processor may execute a process for controlling the general design circuit board producing section to start the production of the general design circuit boards if the stock of the general design circuit boards has reached the lower limit of the stock of the general design circuit boards. According to the configuration, the stock of the general design circuit boards is less likely to be excessive. Because the stock of the general design circuit boards is less likely to be short, the period between the acceptance of the order of the display panels and the shipment can be shorten.

(6) The production control system may include a memory configured to store an expected shipping date of the display panels in the order from the customer. The processor may execute a process for controlling the frame processing section to process the frames of the general design circuit boards. According to the configuration, the production of the display panels is more likely to be completed by the expected shipping date of the display panels in the order.

(7) The general design circuit board producing section may include at least a film forming device and a general exposure device. The film forming device may be configured to form films on the general design circuit boards. The general exposure device may be configured to expose general patterns on the films using a general photomask based on the general design. The frame processing section may include at least a laser lithography device configured to apply a laser beam to the films on which the general patterns are formed through patterning to scan along the specified outlines of the display panels in the order. According to the configuration, the general patterns are exposed on the films formed on the general design circuit boards by the film forming device by the general exposure device using the general photomask. The laser beam is applied to the films on which the general patterns are formed through patterning by the laser lithography device to scan along the outlines of the ordered display panels to process the frames of the general design circuit boards. Therefore, high flexibility can be achieved in outline design of the display panels.

(8) The processor may execute a process for controlling the general design circuit board producing section to produce multiple types of the general design circuit boards including at least display pixels, terminals, and scan drivers. The display pixels are for displaying images. The terminals are disposed at first ends of the general design circuit boards at which the display pixels are not disposed to extend along the first ends for supplying data signals to the display pixels. The scan drivers are disposed within areas in which the display pixels are disposed to extend in a direction that crosses an extending direction of the terminals for supplying scan signals to the display pixels. At least lengths of the terminals or at least lengths of the scan drivers may be different from each other. The production control system may include a memory configured to store the lengths of the terminals and the lengths of the scan drivers of the general design circuit boards and the lengths of the terminals and the lengths of the scan drivers of the display panels entered in the customer terminal as ordered design information. The processor may execute a process for checking the ordered design information stored in the memory against pieces of the general design information and controlling the frame processing section to process the frame of the general design circuit boards that match the piece of the general design information the closest to the ordered design information. According to the configuration, the different types of the general design circuit boards including the terminals and the scan drivers having different lengths can be produced in advance by the general board producing section. Even if orders of display panels with outlines in various types are made, the display panels can be easily produced. Furthermore, the processor may execute the process for checking the ordered design information stored in the memory against the pieces of the general design information and controlling the frame processing section to process the frames of the general design circuit boards that match the piece of the general design information the closest to the ordered design information. Therefore, high yield can be achieved.

(9) The processor may execute a process for checking integral multiples of the lengths of the terminals in the display panels included in the ordered design information when checking the ordered design information stored in the memory against the pieces of the general design information and for controlling the frame processing section to process the frames of the general design circuit boards that match the piece of the general design information the closest to the integral multiples so that the display panels are arranged in the extending direction of the terminals. Because multiple display panels are produced from a single general design circuit board, high yield can be achieved.

A second production control system according to the present invention is for outsourcing production of general design circuit boards in general design including at least one estimated maximum outline of display panels in an expected order from a customer to a single or multiple general design circuit board manufacturers and for producing display panels with an outline specified in an order from a single customer or with outlines specified in orders from multiple customers by processing frames of the general design circuit boards. The production control system includes at least one general board manufacturer terminal, at least one customer terminal, a frame processing section, a memory, a processor, and information and communication lines. Prices of the general design circuit boards are entered into the general design circuit board manufacturer terminal. The outline of the display panels and an order quantity are entered by the customer. The frame processing section is configured to process frames of the general design circuit boards based on the specified outline of the display panels in the order from the customer. The memory is configured to store information on prices of the display panels linked to the prices of the general design circuit boards. The processor is configured to execute a first process, a second process, a third process, a fourth process, and a fifth process. The first process is for checking the price of the general design circuit boards entered in the general design circuit board manufacturer terminal by the general design circuit board manufacturer against information on the prices of the display panels stored in the memory, for extracting the price of the display panels linked to the price of the general design circuit boards, and for outputting the price of the display panels to the customer terminal. The second process is for calculating a delivery quantity of the general design circuit boards based on the outline of the display panels and the order quantity entered into the customer terminal by the customer who accepted the price of the display panels output on the customer terminal. The third process is for checking a revised price of the general design circuit boards entered into the general design circuit board manufacturer terminal by the general design circuit board manufacturer based on specification of the general design circuit boards and a delivery quantity output on the general design circuit board manufacturer terminal against the information on the prices of the display panels stored in the memory, for extracting the price of the display panel linked to the price of the general design circuit boards as a revised price, and for outputting to the customer terminal. The fourth process is, if one of an original orderer of the customer who made an order in the second process and a new orderer of the customer who did not make the order in the second process accepts the revised price output on the customer terminal and enters an outline of the display panels and an order quantity into the customer terminal, for calculating a revised delivery quantity of the general design circuit boards based on the entered outline of the display panels and the entered order quantity and for outputting the revised delivery quantity to the general design circuit board manufacturer terminal. The fifth process is for controlling the frame processing section to process the frames of the general design circuit boards produced by the general design circuit board manufacturer based on the revised delivery quantity of the general design circuit boards output on the general design circuit board manufacturer terminal based on the outline of the display panels and the order quantity entered in the customer terminal. The information and communication lines connect the general design circuit board manufacturer terminal, the customer terminal, the frame processing section, and the memory to the processor for interactive information communication.

When the price of the general design circuit board is entered into the general design circuit board manufacturer terminal by the general design circuit board manufacturer, the processor executes the first process for checking the entered price of the general design circuit boards against the information on the prices of the display panels stored in the memory, for extracting the price of the display panels linked to the price of the general design circuit boards, and for outputting the price of the display panels to the customer terminal to prompt the customer for to make an order. When the price of the display panels output on the customer terminal is accepted by the customer and the outline of the display panels and the order quantity are entered into the customer terminal by the customer, the processor executes the second process for calculating the delivery quantity of the general design circuit boards based on the outline of the display panels and the order quantity and for outputting the delivery quantity of the general design circuit boards to the general design circuit board manufacturer terminal. When the revised price of the general design circuit boards is entered into the general design circuit board manufacturer terminal by the general design circuit board manufacturer based on specification of the general design circuit boards and the delivery quantity output on the general design circuit board manufacturer terminal, the processor executes the third process for checking the revised price against the information on the prices of the display panels stored in the memory, for extracting the price of the display panel linked to the price of the general design circuit boards as a revised price, and for outputting to the customer terminal to prompt the customer to make the additional order. If the revised price output on the customer terminal is accepted by at least one of the original orderer of the customer who made the order in the second process and the new orderer of the customer who did not make the order in the second process and the outline of the display panels and the order quantity are input into the customer terminal as an additional order, the processor executes the fourth process for calculating the revised delivery quantity of the general design circuit boards based on the entered outline of the display panels and the entered order quantity and for outputting the revised delivery quantity to the general design circuit board manufacturer terminal to outsource the production of the general design circuit boards to the general design circuit board manufacturer. When the general design circuit boards produced by the general design circuit board manufacturer based on the revised delivery quantity of the general design circuit boards output on the general design circuit board manufacturer terminal are delivered, the processor executes the fifth process for controlling the frame processing section to process the frames of the general design circuit boards based on the outline of the display panels and the order quantity entered in the customer terminal.

The frames of the general design circuit boards are processed based on the specified outline of the display panels in the order. Therefore, the display panels with outlines in different types can be produced at low cost. Furthermore, the prices of the general design circuit boards based on the order from the customer and display panels are revised when an additional order is made by the customer. Namely, the production of the general design circuit boards can be outsourced to the general design circuit board manufacturer after the orders from the customer are combined. Economies of scale can be achieved, that is, the production cost of the general design base boards can be further reduced.

Preferable embodiments of the second display panel production control system according to the present invention may have the following configuration.

(1) The at least one general design circuit board manufacturer terminal may include general design circuit board manufacturer terminals. The processor may perform a comparison between the prices of the general design circuit boards entered into the general design circuit board manufacturer terminals by the general design circuit board manufactures, extract the lowest price, check the lowest price against the information on the prices of the display panels store in the memory, extract the price of display panels linked to the lowest price, and output the price of the display panels to the at least one customer terminal in the first and the third process. The prices of the display panels extracted based on the lowest price of the general design circuit boards among the prices provided by the general design circuit board manufacturers through bidding is provided to the customer. This is advantageous in competition against other companies.

(2) The memory may store the number of the general design circuit boards arranged within plate surfaces of general design base boards when production of the general design base boards including the plate surfaces within which the general design circuit boards are arranged is outsourced to the general design circuit board manufacturer. When an outline of the display panels and the order quantity are entered into the at least one customer terminal by the customer, the processor may calculate a delivery quantity of the general design base boards by dividing an order quantity of the display panels by the number of the general design circuit boards per general design base board stored in the memory and output the delivery quantity to the at least one general design circuit board manufacturer in the second and the fourth processes. The production of the general design base boards, each of which includes the plate surface within which the general design circuit boards are arranged based on the order quantity of the display panels in the order from the customer can be outsourced after calculating the deliver quantity of the general design base boards. Therefore, the production cost of the display panels can be reduced.

A first display panel production control method according to the present invention is for producing display panels with outlines specified in an order from a customer. The method includes a general design circuit board producing step and a frame producing step. The general design circuit board producing step is for producing general design circuit boards in general design including at least an estimated maximum outline of the display panels in an expected order. The frame processing step is for processing frames of the general design circuit board for an order quantity based on the specified outline of the display panels and the order quantity in the order from the customer.

Prior to the order from the customer, the general design circuit boards in general design including at least the estimated maximum outline of the display panels in the expected order can be produced in the general design circuit board producing step. When the order is made by the customer, the frames of the general design circuit boards are processed in the frame processing step for the order quantity based on the specified outline of the display panels out of the general design circuit boards produced in advance to produce the display panels with the outlines specified in the order. According to the method, a period between an acceptance of the order of the display panels and a shipment (a lead time) can be reduced. Furthermore, the frames of the general design bards are processed based on the specified outlines of the display panels in the order. Therefore, the display panels with various outlines can be produced at low cost.

A second display panel production control method according to the present invention is for producing display panels with at least one type of outlines specified in an order from a single or multiple customers by outsourcing production of general design circuit boards in general design including at least an estimated maximum outline of the display panels in an expected order to a single or multiple general design circuit board manufacturers and for processing frames of the general design circuit boards produced through outsourcing. The method includes a first step, a second step, a third step, a fourth step, and a fifth step. The first step is for providing the single or the multiple customers with a price of the display panels calculated based on a price of the general design circuit boards provided by the single or the multiple general design circuit board manufacturers. The second step is for providing the single or the multiple general design circuit board manufacturers with at least one delivery quantity calculated based on the outline of the display panels and order quantity in an order from the single or the multiple customers who accepted the provided price of the display panels. The third step is for providing the single or the multiple customers with a price of the display panels calculated based on a revised price of the general design circuit boards provided by the single or the multiple general design circuit board manufacturers based on the provided delivery quantity of the general design circuit boards as a revised price of the display panels. The fourth step is for calculating a revised delivery quantity of the general design circuit boards based on an outline of the display panels and an order quantity in an additional order if at least one of an original orderer of the customer who made the order in the second step and a new orderer of the customer who did not make the order in the second step accepted the provided revised price of the display panels and made the additional order and providing the single or the multiple general design circuit board manufactures with the revised delivery quantity of the general design circuit boards. The fifth step is for controlling a frame processing section to process frames of the general design circuit boards produced by the single or the multiple general design circuit board manufacturers based on the provided revised delivery quantity of the general design circuit boards based on the specified outline of the display panels and the order quantity in the order from the single or the multiple customers.

When the price of the general design circuit boards is provided by the general design circuit board manufacturer, the price of the display panel is calculated based on the entered price of the general design circuit boards to prompt the customer to make an order by provide the customer with the price of the display panels in the first step. When the provided price of the display panels is accepted by the customer and the order of the display panels is made by the customer, the delivery quantity of the general design circuit boards is calculated based on the specified outline of the display panels and the order quantity in the order and the delivery quantity of the general design circuit boards is provided to the general design circuit board manufacturer in the second step. When the revised price of the general design circuit boards is provided by the general design circuit board manufacturer based on the delivery quantity of the general design circuit boards proved to the general design circuit board manufacturer, the revised price of the display panels is calculated based on the revised price of the general design circuit boards and provided to the customer to prompt the customer to make an additional order of the display panels in the third step. When at least one of the original orderer of the customer who made the order in the second step and the new orderer of the customer who did not make the order in the second step accepted the provided revised price of the display panels and made the additional order, the revised delivery quantity of the general design circuit boards is calculated based on the specified outline of the display panels and the order quantity in the additional order and provided to the general design circuit board manufacturer in the fourth step. When the general design circuit boards are produced by the general design circuit board manufacturer based on the revised delivery quantity of the general design circuit boards provided to the general design circuit board manufacturer, the frame processing section is controlled to process the frames of the produced general design circuit boards based on the specified outline of the display panels and the order quantity in the order from the customer.

Because the frames of the general design circuit boards are processed based on the specified outline of the display panels in the order, the display panels with outlines in various types can be produced at low cost. Furthermore, the price of the design boards and the price of the display panels provided based on the order from the customer are revised when an additional order is made by the customer. Namely, the production of the general design circuit boards can be outsourced to the general design circuit board manufacturer after the orders from the customer are combined. Economies of scale can be achieved, that is, the production cost of the general design base boards can be further reduced.

Advantageous Effect of the Invention

According to the present invention, first, the period between an acceptance of order and a shipment can be reduced and the production cost of the display panel can be reduced. Secondly, the production cost of a general design circuit board can be reduced.

MODE FOR CARRYING OUT THE INVENTION

First Embodiment

Figure 1:
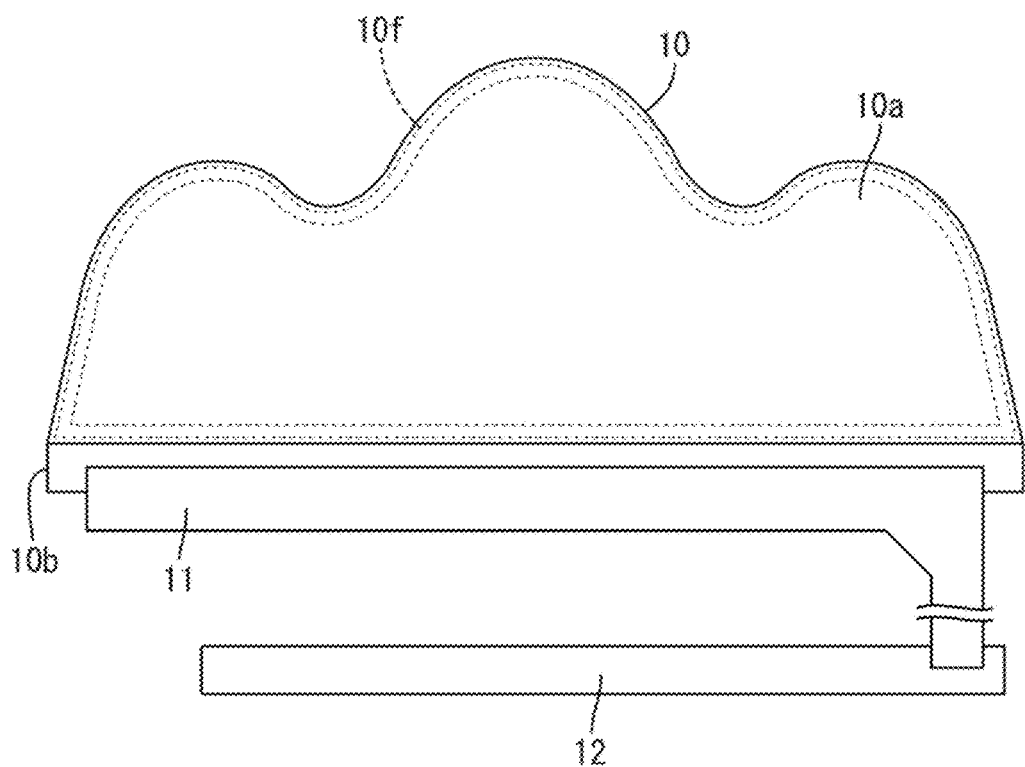
FIG. 1 is a schematic plan view illustrating connections among a liquid crystal panel, a flexible circuit board, and a control circuit board according to a first embodiment of the present invention.

The first embodiment of the present invention will be described with reference to FIGS. 1 to 26. In this section, a production control system 30 and a method of controlling production for producing liquid crystal panels 10 with at least one type of outlines specified in an order from a customer will be described. X-axes, Y-axes, and Z-axes may be provided in the drawings. The axes in each drawing correspond to the respective axes in other drawings to indicate the respective directions. An upper side and a lower side in FIGS. 2 and 3 correspond to a front side and a rear side of each liquid crystal panel 10, respectively.

Outlines of the liquid crystal panels 10 produced by the production control system 30 and the method of controlling the production are semi-customized based on the specified outline in the order from the customer. An example of the specified outline is illustrated in FIG. 1. In a plan view, the specified outline is not rectangular and includes a linear section and a winding section. Specifically, the winding section of the liquid crystal panel 10 illustrated in FIG. 1 is defined by a wavy line with three peaks in the plan view. The peak in the middle has the largest height (a distance from the linear section). The winding section is bilaterally symmetric. The liquid crystal panel 10 includes terminals 14 arranged along the linear section, which will be described later. The customer can design sections of the outline of each liquid crystal panel 10 other than the linear section with a certain level of flexibility under some conditions.

The liquid crystal panels 10 in this embodiment may be used for electronic devices (not illustrated), for example, an onboard display device (such as a meter in an instrument panel and an onboard display device for displaying various warning icons, car navigation map images, and images captured by an onboard camera), a mobile phone (such as a smartphone), a notebook personal computer (such as a tablet personal computer), a portable information terminal (such as an electronic book reader and a PDA), a digital photo frame, and a portable video game player. The application of the liquid crystal panel 10 is not limited to the above. A screen size of the liquid crystal panel 10 may be in a range from some inches to ten and some inches, that is, generally in a small or small to a small-to-medium category. The screen size is not limited to the above.

Figure 2:
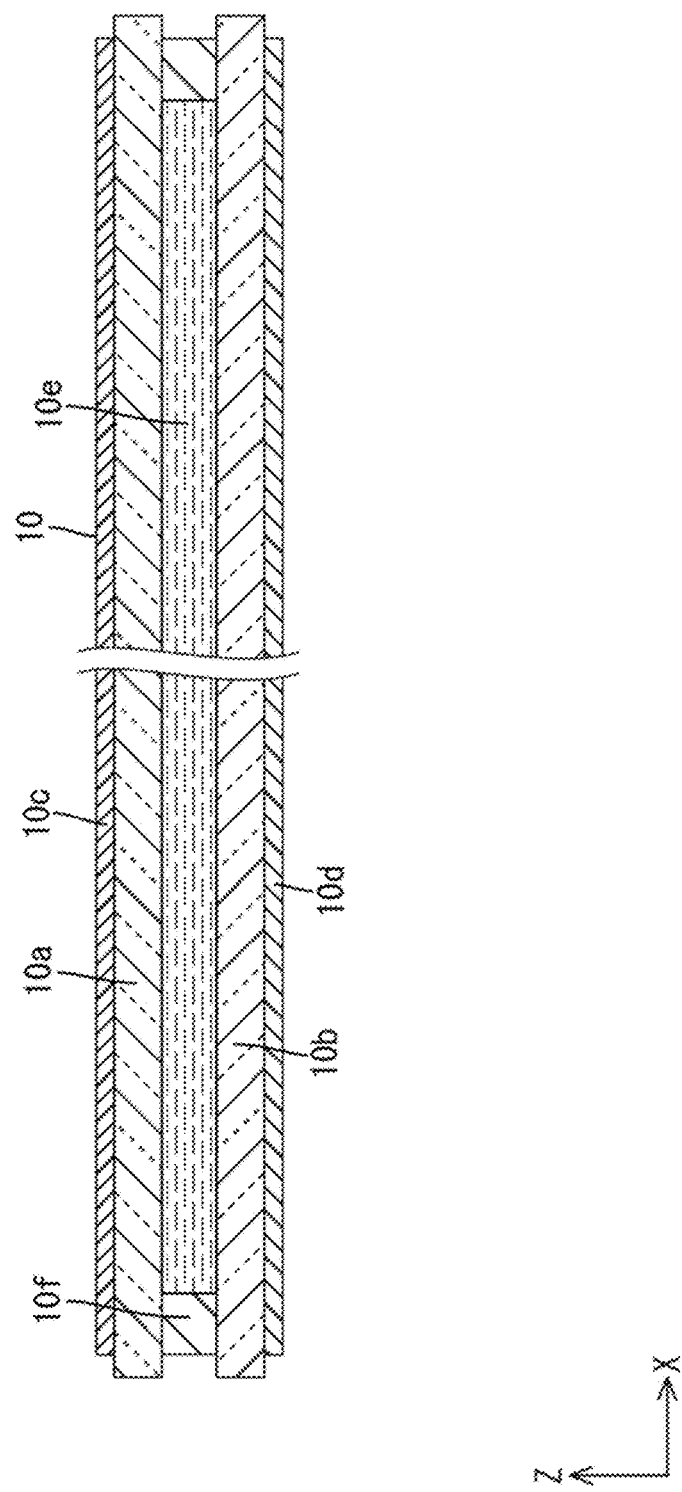
FIG. 2 is a schematic cross-sectional view illustrating an overall cross-sectional configuration of the liquid crystal panel.

As illustrated in FIG. 2, each liquid crystal panel 10 includes at least a pair of boards 10a and 10b, a liquid crystal layer 10e, and a sealing member 10f. The boards 10a and 10b are substantially transparent glass boards having high light transmissivity. The liquid crystal layer 10e includes liquid crystals (a liquid crystal material) which are substances having optical characteristics that changes according to application of an electric field. The sealing member 10*f* extends around the liquid crystal layer 10*e* to seal the liquid crystal layer 10*e* and to bond the boards 10*a* and 10*b* together with a gap corresponding to the thickness of the liquid crystal layer 10*e* therebetween. The liquid crystal layer 10*e* of the liquid crystal panel 10 is formed between the boards 10*a* and 10*b* by a drop-fill method. The liquid crystal panel 10 includes a display area (an active area) AA and a non-display area (anon-active area) NAA. The display area AA is in a middle section of the screen inside the sealing member 10*f* in which images are displayed (display pixels are arranged). The non-display area NAA is in a peripheral edge section of the screen outside the sealing member in a form of a closed loop to surround the display area AA in which the images are not displayed (the display pixels are not arranged). In the liquid crystal panel 10 in this embodiment, the sealing member 10*f* disposed at a boundary between the display area AA and the non-display area NAA to extend along the outline of the liquid crystal panel 10. Therefore, outlines of the display area AA and the non-display area NAA in the plan view are similar to the outline of the liquid crystal panel 10 and the planar shape of the sealing member 10*f*. The liquid crystal panel 10 is configured to display images in the display area AA using light supplied by a backlight unit that is not illustrated. The front side of the liquid crystal panel 10 is a light exiting side. Polarizing plates 10*c* and 10*d* are bonded to outer surfaces of the boards 10*a* and 10*b*.

Figure 3:
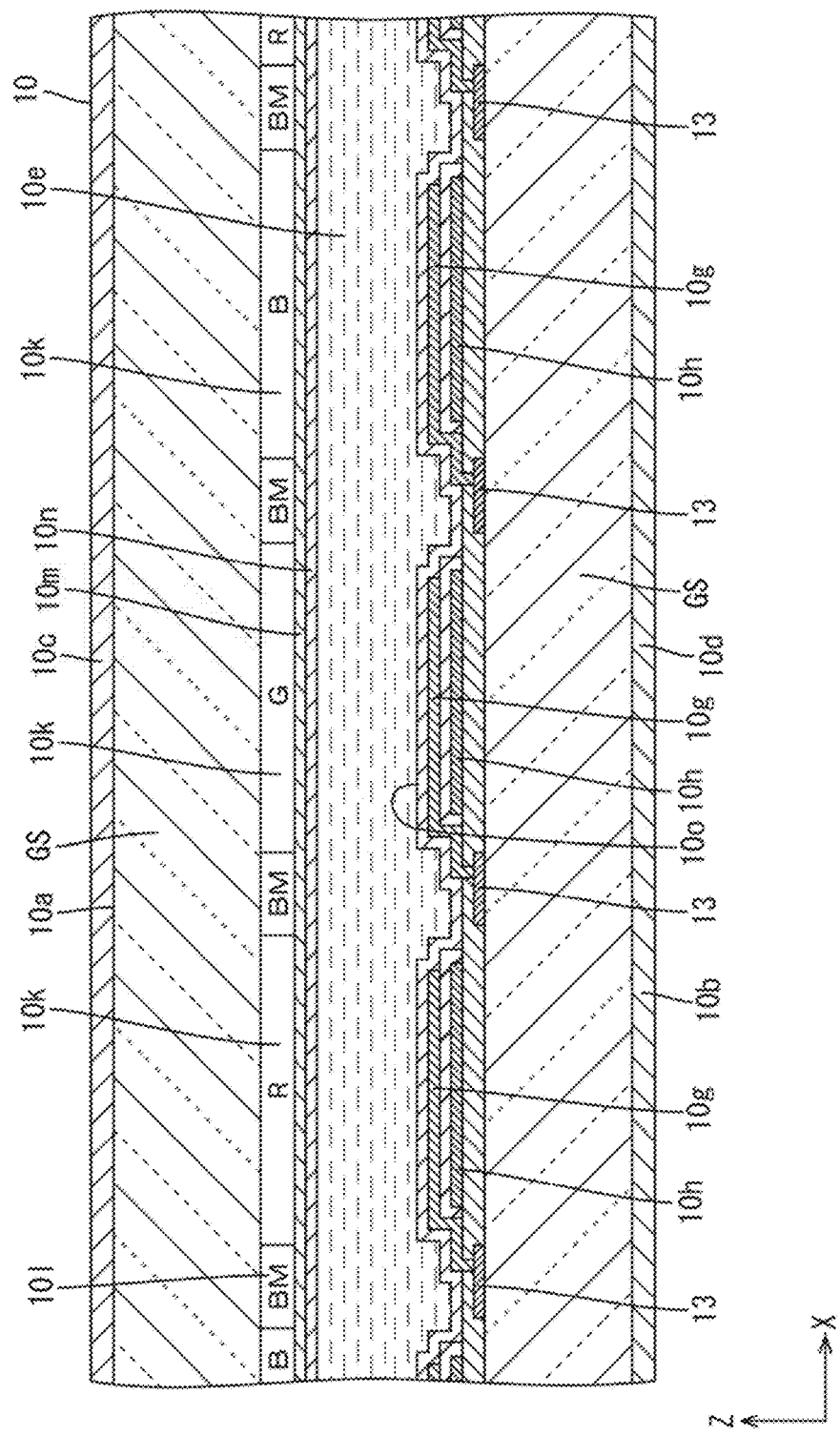
FIG. 3 is a schematic cross-sectional view illustrating a cross-sectional configuration of a display area of the liquid crystal panel.
Figure 4:
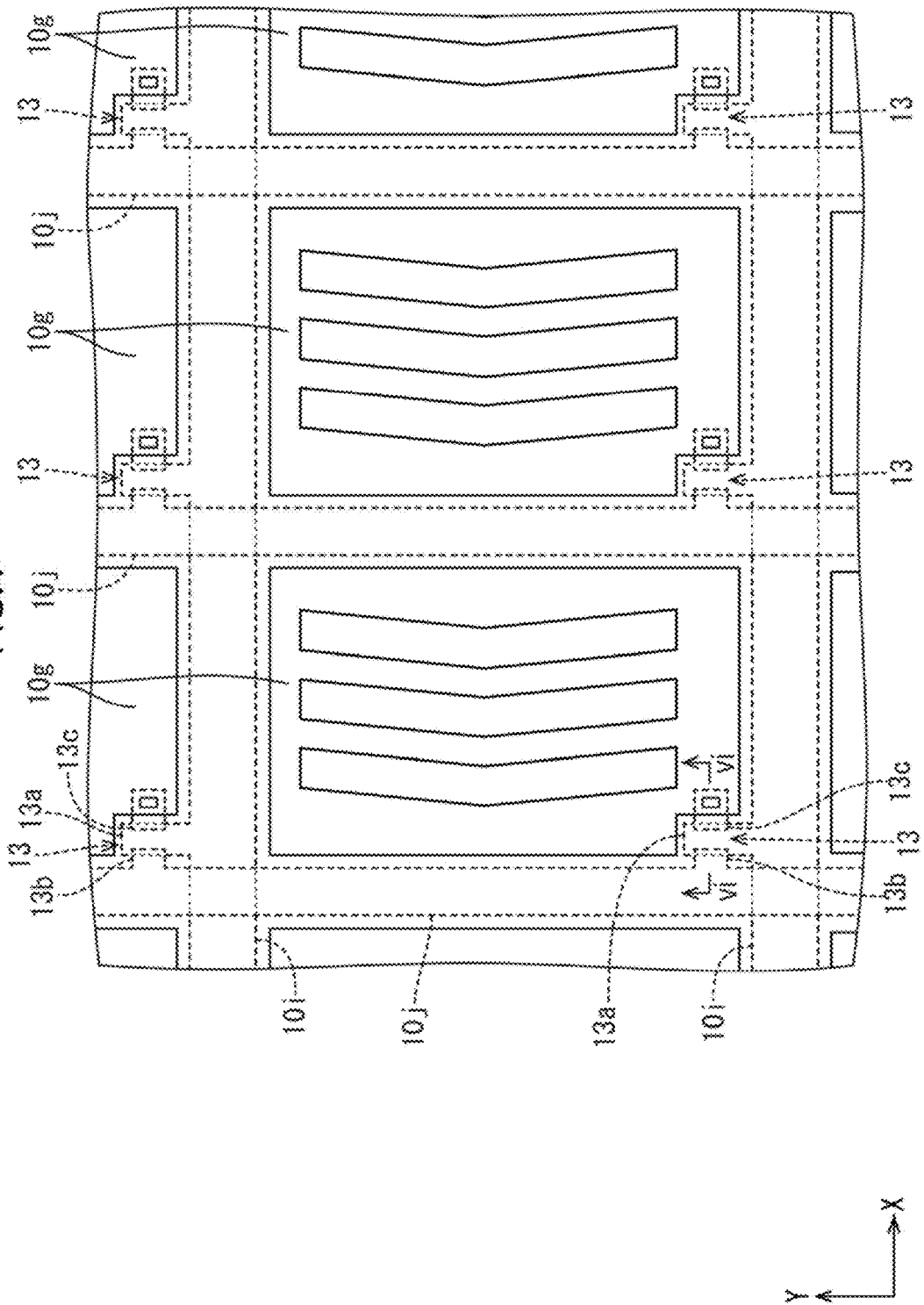
FIG. 4 is a plan view schematically illustrating wiring patterns on an array board in the display area of the liquid crystal panel.

One of the boards 10*a* and 10*b* on the front side in the liquid crystal panel 10 is a CF board 10*a* and the other on the rear side (the back side) is an array board 10*b*. As illustrated in FIGS. 3 and 4, a number of thin film transistors (TFTs: display components) 13 which are switching components and a number of pixel electrodes 10*g* are arranged in a matrix on an inner surface of the array board 10*b* on a liquid crystal layer 10*e* side, an opposed surface side opposed to the CF board 10*a*) in the display area AA. Furthermore, gate lines 10*i* (scanning lines) and source lines 10*j* (datelines, signal lines) are routed in a grid to surround the TFTs 13 and the pixel electrodes 10*g*. The gate lines 10*i* and the source lines 10*j* are connected to gate electrodes 13*a* and source electrodes 13*b* of the respective TFTs 13. The TFTs 13 are driven based on various signals supplied to the gate lines 10*i* and the source lines 10*j*. Application of voltages to the pixel electrodes 10*g* is controlled according to the driving of the TFTs 13. The TFTs 13 include channels 13*d* that connect drain electrodes 13*c* to the source electrodes 13*b*. An oxide semiconductor material is used for a semiconductor film to form the channels 13*d*. The oxide semiconductor material for forming the channels 13*d* has electron mobility 20 to 50 times greater than that of an amorphous silicon material. Therefore, it is easy to reduce the size of the TFTs 13 and to maximize an amount of light passing through the pixel electrodes 10*g* (an aperture ratio of the display pixels). This configuration is preferable for increasing definition and reducing power consumption. The pixel electrodes 10*g* are disposed in areas defined by the gate lines 10*i* and the source lines 10*j*. The pixel electrodes 10*g* are formed from a transparent electrode film (a second transparent electrode film 28, which will be described later) made of indium tin oxide (ITO) or zinc oxide (ZnO). Common electrodes 10*h* are formed on an inner surface of the array boards 10*b* in the display area AA between the pixel electrodes 10*g* and the array boards 10*b* via an insulating film (a second inter layer insulating film 27, which will be described later). The common electrodes 10*h* are formed from transparent electrode films (first transparent electrode films 26) similar to the pixel electrodes 10*g*. The common electrodes 10*h* are formed in substantially solid patterns. In this embodiment, a direction in which the gate lines 10*i* extend and a direction in which the source lines 10*j* extend correspond with the X-axis direction and the Y-axis direction in the drawings, respectively.

Figure 5:
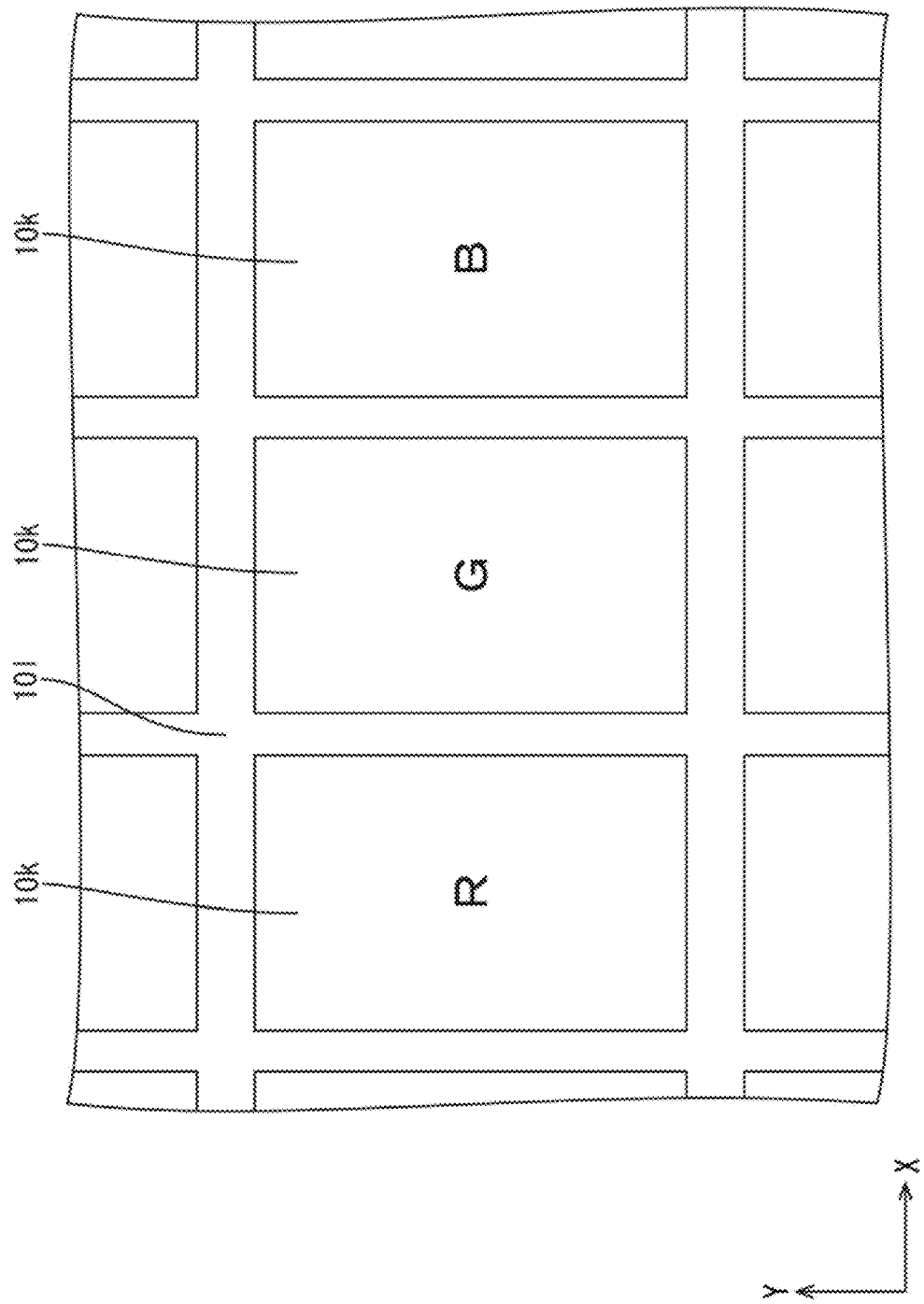
FIG. 5 is a magnified plan view illustrating a planar configuration of a CF board in the display area of the liquid crystal panel.

As illustrated in FIGS. 3 and 5, a number of color filters 10*k* are formed on an inner surface of the CF board 10*a* in the display area AA. The color filters 10*k* are arranged in a matrix at positions opposed to the pixel electrodes 10*g* on the array board 10*b*. The color filters 10*k* include color films (first to third color films) in three colors of red (R), green (G), and blue (B) repeatedly arranged in predefined sequence. A light blocking film 10*l* (a black matrix) in a grid shape is formed among the color filters 10*k* for restricting color mixture. The light blocking film 10*l* is arranged to overlap the gate lines 10*i* and the source lines 10*j*. An overcoat film 10*m* is formed on surfaces of the color filters 10*k* and the light blocking film 10*l*. Photo spacers, which are not illustrated, are disposed on a surface of the overcoat film 10*m*. Alignment films 10*n*, 10*o* for orienting the liquid crystals in the liquid crystal layer 10*e* are formed on inner surfaces of the boards 10*a* and 10*b*, respectively. In the liquid crystal panel 10, a group of three color films in three colors of R, G and B of color filters 10K and three pixel electrodes 10*g* opposed to the color films forms one display pixel, which is a unit of display. Each display pixel includes a red pixel, a green pixel, and a blue pixel. The red pixel includes the R color filter 10*k*. The green pixel includes the G color filter 10*k*. The blue pixel includes the B color filter 10*k*. The display pixels in the respective colors are repeatedly arranged in a row direction (the X-axis direction) on a plate surface of the liquid crystal panel 10 to form display pixel lines. A number of the display pixel lines are arranged in a column direction (the Y-axis direction).

Figure 7:
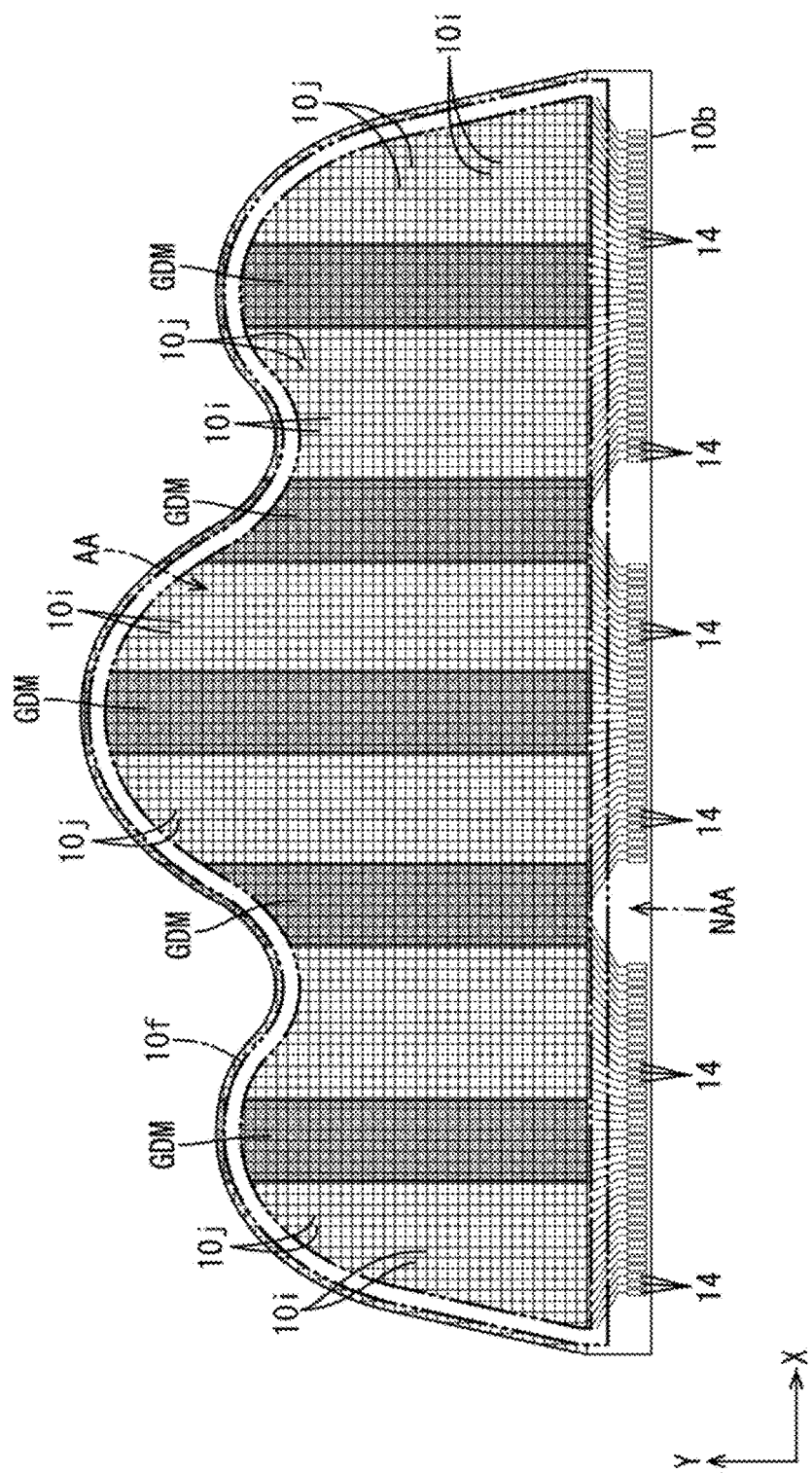
FIG. 7 is a plan view illustrating a planar configuration of the array board of the liquid crystal panel.

As illustrated in FIG. 7, gate drivers GDM (scan drivers) for scanning the TFTs 13 in sequence and selectively driving the TFTs 13 by supplying gate signals (scan signals) to the gate lines 10*i* are disposed on the array board 10*b* in the display area AA. Specifically, the gate drivers GDM supply the gate signals to the gate lines 10*i* in sequence from the upper most gate line 10*i* in the Y-axis direction in FIG. 7 to the lower most gate line 10*i*. As a result, the gate lines 10*i* arranged in the Y-axis direction (the column direction) are scanned in sequence and lines of the TFTs 13 connected to the respective gate lines 10*i* are selected and driven in sequence. A direction in which the TFTs 13 are scanned by the gate drivers GDM corresponds with the Y-axis direction (the direction in which the source lines 10*j* extend). The gate drivers GDM are monolithically formed on the array board 10*b* with semiconductor films (oxide semiconductor materials) the same as the TFTs 13 as bases. The gate drivers GDM include control circuits for controlling the supply of output signals (the gate signals) to the TFTs 13. Each control circuit includes a circuit for outputting the gate signal at predefined timing and a buffer circuit for amplifying the gate signals. Circuit components in the control circuits include circuit TFTs (circuit switching components), which are not illustrated, as channels using semiconductor films. The control circuits include circuit traces, which are not illustrated, using metal films the same as the gate lines 10*i* and the source lines 10*j*. The gate drivers GDM include the control circuits (the circuit TFTs and the circuit traces) are dispersed for the respective display pixels disposed in areas in band shapes and at intervals in the X-axis direction in the display area AA. The gate drivers GDM extend in the Y-axis direction (a scan direction). Five gate drivers GDM are arranged at about equal intervals in the X-axis direction. In FIG. 7, vertically-long band shaped areas defined by chain lines and shaded are forming areas of the gate drivers GDM. Specifically, the control circuits in the gate drivers GDM are arranged in the respective display pixels defined by the gate lines 10$i$ and the source lines 10$j$, that is, dispersed in the band shaped areas in the display area AA. Because the gate drivers GDM are arranged in the display area AA, high flexibility is achieved at least in design of the winding section of the outline of the liquid crystal panel 10. In comparison to a configuration in which the gate circuits are arranged in the non-display area NAA, a width of frame in the non-display area can be reduced and thus a frame size of the liquid crystal panel can be reduced.

As illustrated in FIG. 1, in the liquid crystal panel 10, the linear section of the outline of the array board 10$b$ is located outer than the linear section of the outline of the CF board 10$a$. As illustrated in FIGS. 1 and 7, a flexible circuit board 11 (a mounting component) for supplying various kinds of signals related to image display is mounted to the linear section of the array board 10$b$ outer than the CF board 10$a$. Furthermore, the terminals 14 connected to the flexible circuit board 11 are disposed in the linear section of the array board 10$b$. The terminals 14 are disposed to extend in the direction in which the linear section of the outline of the array board 10$b$ extends (the X-axis direction). The terminals 14 include unit terminals that are linearly arranged ate intervals in the direction in which the terminals 14 extend. Source connecting lines connected to the source lines 10$j$ in the display area AA and gate connecting lines connected to the gate drivers GDM in the display area AA are connected to the unit terminals of the terminals 14. In FIG. 7, only the unit terminals connected to the source lines 10$j$ are illustrated. As illustrated in FIG. 1, one of ends of the flexible circuit board 11 is connected to the liquid crystal panel 10 and the other end is connected to a control circuit board 12 (a display control circuit board, a signal source). Various kinds of signals related to the image display supplied by the control circuit board 12 are transmitted to the liquid crystal panel 10.

An operation mode of the liquid crystal panel 10 in this embodiment is a fringe field switching (FFS) mode that is an advanced mode from an in-plane switching (IPS) mode. As illustrated in FIG. 3, the pixel electrodes 10$g$ and the common electrodes 10$h$, which will be described later, are formed on the array board 10$b$ in the pair of the boards 10$a$ and 10$b$. Furthermore, the pixel electrodes 10$g$ and the common electrodes 10$h$ are formed in different layers. The CF board 10$a$ and the array board 10$b$ include substantially transparent glass substrates GS (having high light transmissivity). The various kinds of films are formed in layers on the glass substrates GS.

Figure 6:
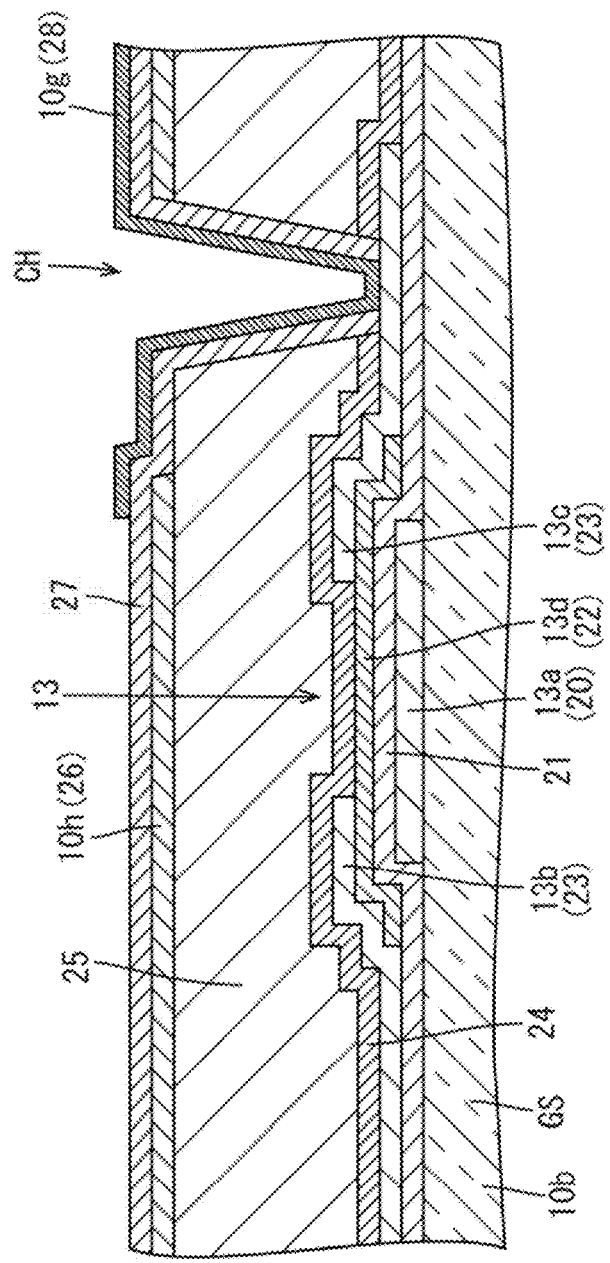
FIG. 6 is a cross-sectional view along line vi-vi in FIG. 4.

Various kinds of films formed in layers on the inner surface of the array board 10$b$ with a known photo lithography will be described. As illustrated in FIG. 6, a first metal film 20 (a gate metal film), a gate insulating film 21 (an insulating film), a semiconductor film 22, a second metal film 23 (a source metal film), a first interlayer insulating film 24, an organic insulating film 25, a first transparent electrode film 26, a second interlayer insulating film 27, a second transparent electrode film 28, and the alignment film 10$o$ are formed in layers in this sequence from the lower layer side (a glass substrate GS side) on the array board 10$b$.

The first metal film 20 is formed from a laminated film of titanium (Ti) and copper (Cu). In comparison to a laminated film of titanium and aluminum (Al), the first metal film has a lower wiring resistance and thus higher conductivity. The gate insulating film 21 is formed in a layer at least above the first metal film 20. The gate insulating film 21 is made of silicon oxide ($SiO_2$), which is an inorganic material. The semiconductor film 22 is formed in a layer above the gate insulating film 21. The semiconductor film 22 is made from a thin film using an oxide semiconductor. The oxide semiconductor used for the semiconductor film 22 is an indium gallium zinc oxide (In—Ga—Zn—O) based semiconductor containing indium (In), gallium (Ga), zinc (Zn), and oxygen (O). The In—Ga—Zn—O base semiconductor is a ternary oxide of indium (In), gallium (Ga), and zinc (Zn). Percentages of In, Ga and Zn (a composition ratio) are not limited to specific percentages. For example, the ratio may be as follows: In:Ga:Zn=2:2:1; In:Ga:Zn=1:1:1; and In:Ga:Zn=1:1:2. In this embodiment, an In—Ga—Zn—O base semiconductor that contains In, Ga and Zn with a ratio of 1:1:1 is used. Such an oxide semiconductor (an In—Ga—Zn—O based semiconductor) may be an amorphous semiconductor but preferably crystalline semiconductor including a crystalline portion. A preferable crystalline semiconductor is a crystalline In—Ga—Zn—O based semiconductor with a c-axis oriented substantially perpendicular to a layer surface. A crystalline structure of such a oxide semiconductor (the In—Ga—Zn—O base semiconductor) is disclosed in unexamined Japanese patent application publication No. 2012-134475. The entire contents of the unexamined Japanese patent application publication No. 2012-134475 are incorporated herein by reference.

The second metal film 23 is formed in a layer at least above the semiconductor film 22. The second metal film 23 is formed from a laminated film of titanium (Ti) and copper (Cu) similar to the first metal film 20. In comparison to a laminated film of titanium and aluminum (Al), the second metal film has a lower wiring resistance and thus higher conductivity. The first interlayer insulating film 24 is formed in a layer at least above the second metal film 23. The first interlayer insulating film 24 is made of silicon oxide ($SiO_2$), which is an inorganic material. The organic insulating film 25 is formed in a layer above the first interlayer insulating film 24. The organic insulating film 25 is made of acrylic resin material (e.g., polymethylmethacrylate resin (PMMA)), which is an organic resin material. The first transparent electrode film 26 is formed in a layer above the organic insulating film 25. The first transparent electrode film 26 is made of transparent electrode material such as indium tin oxide (ITO) and zinc oxide (ZnO). The second interlayer insulating film 27 is formed in a layer above at least the first transparent electrode film 26. The second interlayer insulating film 27 is made of silicon nitride (SiNx), which is an inorganic material. The second transparent electrode film 28 is formed in a layer above the second interlayer insulating film 27. The second transparent electrode film 28 is made of transparent electrode material such as indium tin oxide (ITO) and zinc oxide (ZnO) similar to the first transparent electrode film 26. The alignment film 10$o$ is formed in a layer at least above the second transparent electrode film 28 to face the liquid crystal layer 10$e$. Among the insulating films 21, 24, 25 and 27, the organic insulating film 25 has a thickness larger in comparison to other insulating films 21, 24 and 27. The organic insulating film 25 functions as a planarization film. Among the insulating films 21, 24, 25 and 27, the gate insulating film 21, the first interlayer insulating film 24, and the second interlayer insulating film 27 are inorganic insulating films made of inorganic materials except for the organic insulating film 25.

The thicknesses of the insulating films 21, 24 and 27 are thinner than that of the organic insulating film 25.

Next, the TFTs 13, the pixel electrodes 10g, and the common electrodes 10h formed from the films will be described in sequence in detail. As illustrated in FIG. 6, each TFT 13 includes the gate electrode 13a, the channel 13d, the source electrode 13b, and the drain electrode 13c. The gate electrode 13a is formed from the first metal film 20. The channel 13d is formed from the semiconductor film 22 and overlaps the gate electrode 13a in the plan view. The source electrode 13b is formed from the second metal film 23 and connected to a first end of the channel 13d. The drain electrode 13c is formed from the second metal film 23 and connected to a second end of the channel 13d. The channel 13d extends in the X-axis direction and connects the source electrode 13b to the drain electrode 13c so that electrons can flow between the electrodes 13b and 13c. The source electrode 13b and the drain electrode 13c are opposed to each other with a predefined gap that separates them in a direction in which the channel 13d extends (the X-axis direction).

The pixel electrodes 10g are formed from the second transparent electrode film 28. As illustrated in FIG. 3, the pixel electrodes 10g are disposed in areas defined by the gate lines 10i and the source lines 10j. Each pixel electrode 10 has a vertically-long rectangular shape in a plan view. Each pixel electrode 10g includes vertically-long slits, which are not illustrated, to form a comb shape. The pixel electrode 10g formed on the second interlayer insulating film 27 and thus the second interlayer insulating film 27 is between the pixel electrode 10g and the common electrode 10h, which will be describe next. The first interlayer insulating film 24, the organic insulating film 25, and the second interlayer insulating film 27 in the layers below the pixel electrode 10g include contact holes CH at a position corresponding to the drain electrode 13c in the plan view. The contact holes are through holes that open in the top-bottom direction. The pixel electrode 10g is connected to the drain electrode 13c via the contact holes CH. When a voltage is applied to the gate electrode 13a of the TFT 13, a current flows between the source electrode 13b and the drain electrode 13c via the channel 13d and a predefined voltage is applied to the pixel electrode 10g. The contact holes CH are at the position that does not overlap the gate electrode 13a and the channel 13d formed from the semiconductor film 22 in the plan view.

The common electrodes 10h are formed from the first transparent electrode film 26. As illustrated in FIG. 6, each common electrode 10h is sandwiched between the organic insulating film 25 and the second interlayer insulating film 27. A common voltage (a reference voltage) is applied to the common electrode 10h via a common line that is not illustrated. Therefore, a predefined voltage differences can be created between the electrodes 10g and 10h by controlling the voltage applied to the pixel electrode 10g by the TFT 13. When the voltage difference is created between the electrodes 10g and 10h, a fringe electric field (a diagonal electric field) including a component parallel to the plate surface of the array board 10b and a component in a direction normal to the plate surface of the array board 10b is applied to the liquid crystal layer 10e through the slits of the pixel electrode 10g. Regarding the liquid crystal molecules in the slits and the liquid crystal molecules on the pixel electrode 10g among liquid crystal molecules in the liquid crystal layer 10e, orientation thereof can be properly controlled. According to the configuration, the liquid crystal panel 10 has a high aperture rate and thus a sufficient amount of transmitting light and a high viewing angle performance can be achieved.

Figure 8:
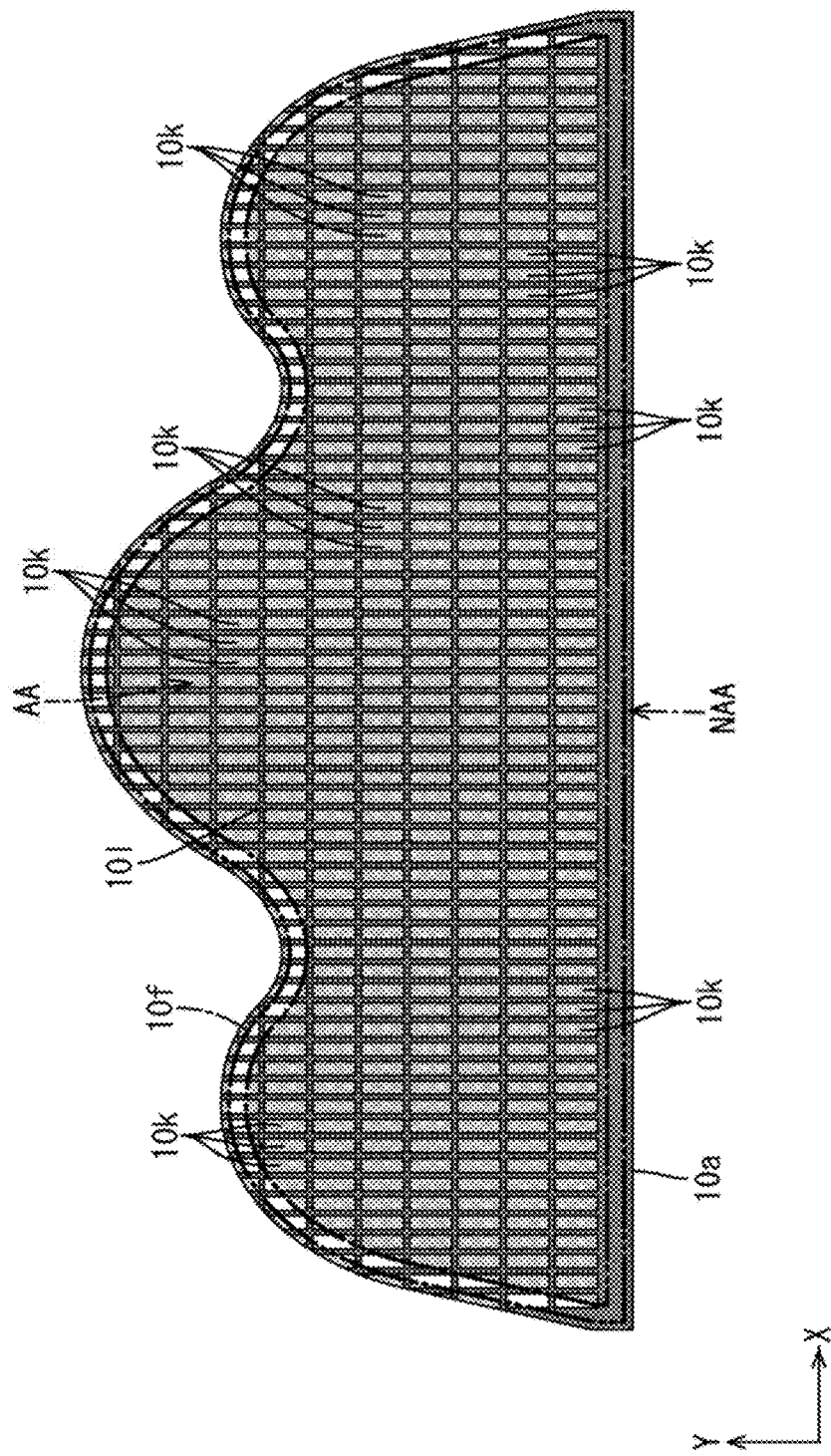
FIG. 8 is a plan view illustrating a planar configuration of the CF board of the liquid crystal panel.

The liquid crystal panel 10 in this embodiment is produced using the production control system 30, which will be described next. With the production control system 30, the winding section of the outline of each liquid crystal panel 10 other than the linear section is formed in a shape based on the specified outline in the order from the customer. With the production control system 30 according to this embodiment, general design circuit boards 40 in general design including at least an estimated maximum outline of the liquid crystal panels 10 are produced in advance and then frames of the general design circuit boards 40 are processed to correspond with the specified outline of the liquid crystal panels in the order from the customer to produce the liquid crystal panels 10 with the outlines based on the specified outline in the order from the customer. As illustrated in FIG. 7, the gate lines 10i, the source lines 10j, and the gate drives GDM are not provided in a section of the array board 10b in the liquid crystal panel 10 including the processed frame overlapping a winding section of the sealing member 10f. In the liquid crystal pane, the gate lines 10i, the source lines 10j, and the gate drivers GDM in the display area inside the winding section of the sealing member 10f are isolated from the gate lines 10i, the source lines 10j, and the gate drivers GDM in the area outside the winding section of the sealing member 10f. Even if the gate lines 10i, the source lines 10j, and the gate drives GDM in the area outside the winding section of the sealing member 10f corrode, the corrosion does not affect the gate lines 10i, the source lines 10j, and the gate drives GDM in the display area AA that is the area inside the winding section of the sealing member 10f and thus deterioration of those is less likely to occur. As illustrated in FIG. 8, the color filters 10k are not provided in an area of the CF board 10a in the liquid crystal panel 10 including the processes frame overlapping the winding section of the sealing member 10f. According to the configuration, the winding section of the sealing member 10f is directly bonded to the glass substrate GS of the CF board 10a without the color filters 10k therebetween. The sealing member 10f is bonded to the CF board 10a with higher strength. In FIGS. 7 and 8, an outline of the sealing member 10f is indicated with two-dot chain lines. In FIG. 8, the areas in which the color films of the color filters 10k remain are shaded and the area in which the color films do not exist is in white.

Figure 9:
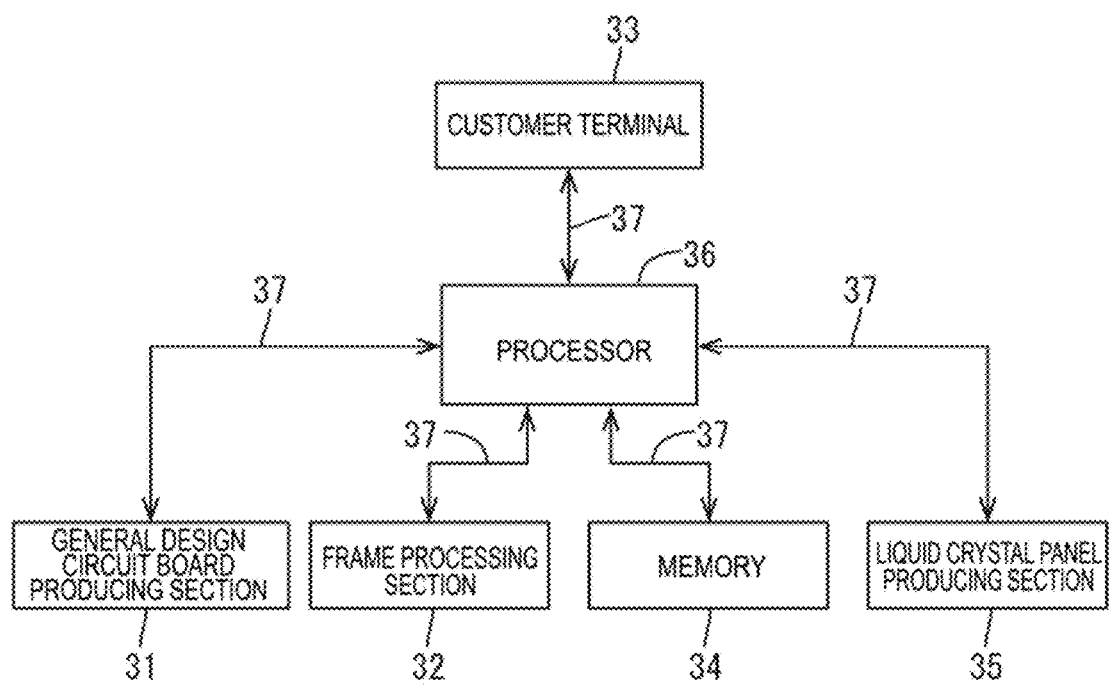
FIG. 9 is a block diagram illustrating a liquid crystal panel production control system.

As illustrated in FIG. 9, the production control system 30 for the liquid crystal panels 10 includes a general design circuit board producing section 31, a frame processing section 32, a customer terminal 33, a memory 34 (a database), a liquid crystal panel producing section 35, a processor 36, and an information and communication lines 37. The general design circuit board producing section 31 is configured to produce the general design circuit boards 40 in general design including at least the estimated maximum outline of the liquid crystal panels 10. The frame processing section 32 is configured to process the frames of the general design circuit boards 40 based on the specified outline of the liquid crystal panels 10 in the order from the customer. The customer can enter at least the outline of the liquid crystal panels 10 and an order quantity into the customer terminal 33. The memory 34 stores order design information on the outline of the liquid crystal panels 10 in the order from the customer and general design information on the general design circuit board 40. The liquid crystal panel producing section 35 is configured to produce the liquid crystal panels 10 using the general design circuit boards 40 on which the frame processing is performed by the frame processing section 32. The processor 36 is configured to control the general design circuit board producing section 31, the frame processing section 32, and the liquid crystal panel producing section 35 to perform predefined processes. The information and communication lines 37 connect the general design circuit board producing section 31, the frame processing section 32, the customer terminal 33, the memory 34, and the liquid crystal panel producing section 35 to the processor 36 for interactive information communication.

Figure 22:
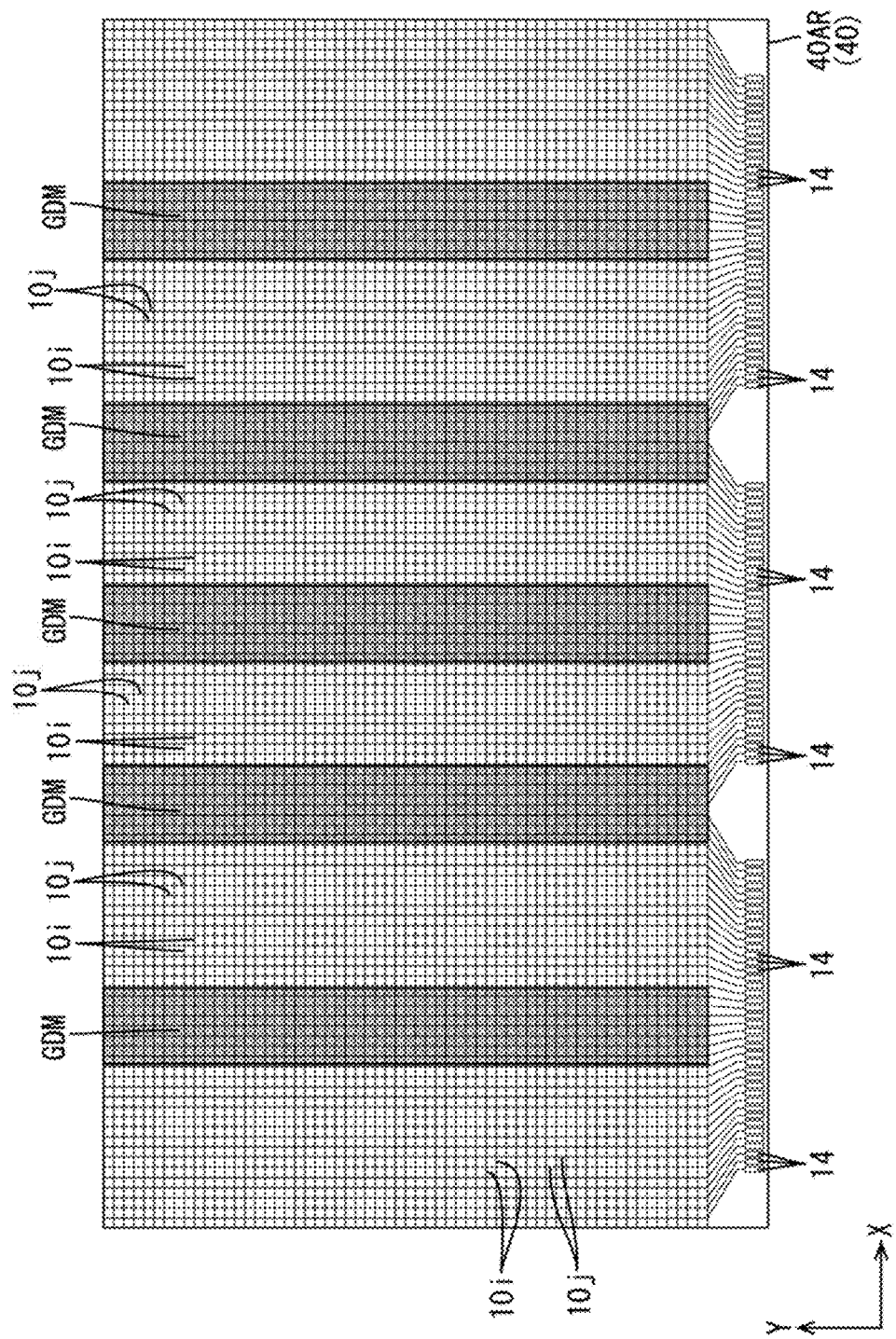
FIG. 22 is a plan view of a general design array board.
Figure 24:
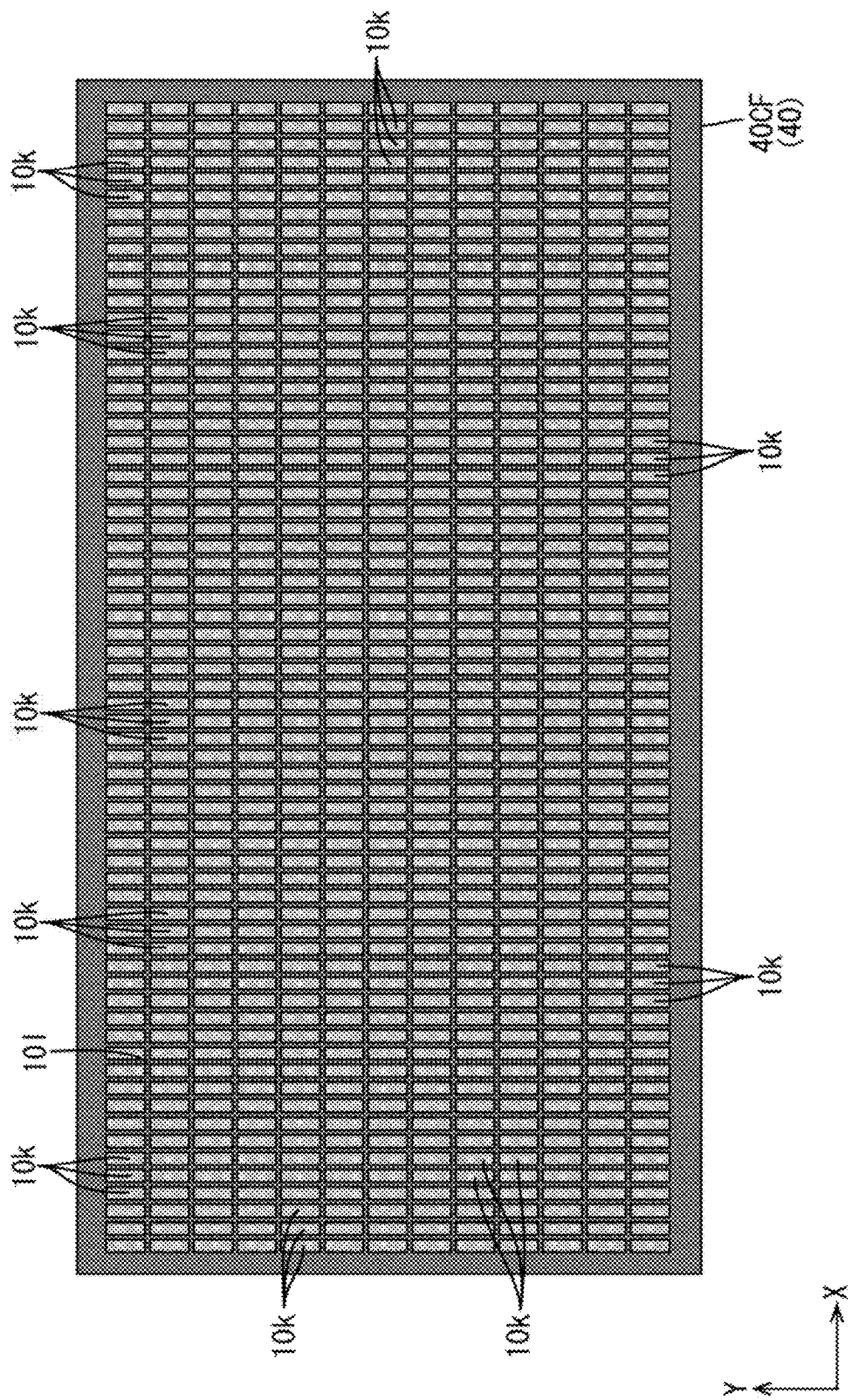
FIG. 24 is a plan view of a general design CF board.
Figure 25:
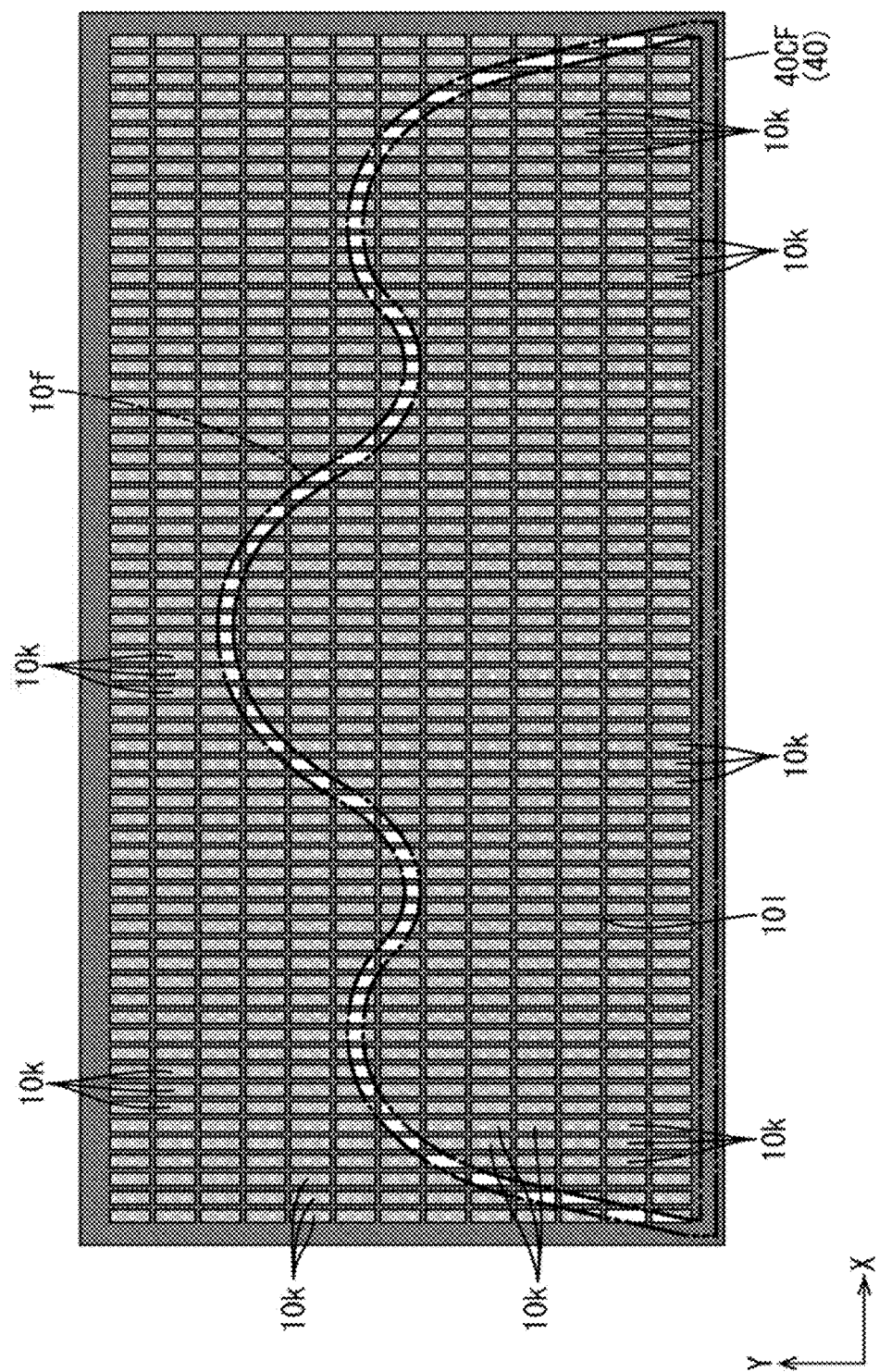
FIG. 25 is a plan view illustrating the general design CF board on which the frame processing is performed.

As illustrated in FIGS. 22 and 24, each general design circuit board 40 produced by the general design circuit board producing section 31 has a horizontally-long rectangular overall shape. The long dimension (a dimension in the X-axis direction) of the general design circuit board 40 corresponds with an estimated maximum length of the terminals 14 of the liquid crystal panel 10. The short dimension (a dimension in the Y-axis direction) of the general design circuit board 40 corresponds with an estimated maximum length of the gate drivers GDM of the liquid crystal panel 10. The general design circuit board 40 includes a general design array board 40AR (a general design component board) and a general design CF board 40CF (a general design counter board). The general design array boards 40AR are in general design including at least an estimated maximum outline of the array boards 10b in the liquid crystal panels 10. The general design CF boards 40CF are in general design including at least an estimated maximum outline of the CF board 10a. As illustrated in FIG. 22, the films included in each array board 10b are formed within the plate surface of the general design array board 40AR to cover about the entire area of the plate surface. Specifically, the terminals 14 and the gate lines 10i extend in the long direction (the X-axis direction) of the plate surface of the general design array board 40AR for about the entire long dimension of the plate surface within the plate surface. The gate drivers GDM and the source lines 10j extend in the short direction (the Y-axis direction of the plate surface for about the entire short dimension of the plate surface within the plate surface. The pixel electrodes 10g are arranged in the matrix in the areas defined by the gate lines 10i and the source lines 10j. As illustrated in FIG. 24, the films included in the CF board 10a are formed within a plate surface of the general design CF board 40CF to cover about the entire area of the plate surface. Specifically, the frame section of the light blocking film 10l is disposed in a peripheral edge portion of the plate surface of the general design CF board 40CF having a horizontally-long frame shape. Furthermore, the grid section of the light blocking film 10l and the color filters 10k arranged in the matrix in the grid section are disposed in an inner portion of the plate surface of the general design CF board 40CF having a horizontally-long rectangular shape and surrounded by the peripheral edge portion.

The general design circuit board producing section 31 produces a general design base board 40M (a general design mother board) based on processing instructions from the processor 36 connected via the information and communication line 37. The general design base board 40M include general design circuit boards 40 illustrated in FIG. 12 and arrange within a plate surface thereof. The general design base board 40M includes a general design array base board 40ARM (a general design component board) and a general design CF base board 40CFM (a general design counter base board). The general design array base board 40ARM includes the general design array boards 40AR arranged within a plate surface thereof. The general design CF base board 40CFM includes the general design CF boards 40CF arranged within a plate surface thereof. The general design circuit board producing section 31 produces the general design array base board 40ARM and the general design CF base board 40CFM by forming and patterning the films on glass base boards included in the general design array base board 40ARM and the general design CF base board 40CFM with the known photo lithography. More specifically, the general design circuit board producing section 31 includes a film forming unit, a resist film forming unit, an exposing unit, a developing unit, an etching unit, and a removing unit. The film forming unit forms the films. The resist film forming unit forms resist films on the films. The exposing unit exposes the resist films using general design photo masks prepared based on the general design. The developing unit develops the exposed resist films. The etching unit etches the developed resist films. The removing unit removes the etched resist films. The general design photo masks used in the exposing unit includes general photo patterns on which the general design of the general design array boards 40AR and the general design CF boards 40CF is reflected. Therefore, the general patterns on which the general design is reflected are transferred to the films that are patterned using the general photo masks.

The frame processing section 32 processes the frame of the general design circuit board 40 based on the specified outline of the liquid crystal panel 10 in the order from the customer based on the processing instructions from the processor 36 connected via the information and communication line 37. The frame processing section 32 includes a laser lithography unit that is configured to apply a laser beam for the frame processing. The laser lithography unit is configured to apply the laser beam to the films of the general design circuit board 40 with the general patterns patterned by the general design circuit board producing section 31 to scan along the specified outline of the liquid crystal panel 10 in the order. Specifically, the laser lithography unit is configured to process frames of the general design circuit boards 40 disposed within the plate surface of the general design base board 40M in sequence. The laser lithography unit is configured to apply the laser beam to an area of each general design circuit board 40 overlapping the winding section of the sealing member 10f. The laser lithography unit is configured to apply the laser beam with an output of 355 nm wavelength and 5 µJ pulse energy to the target area of the general design circuit board 40 for several times. In the target area of the general design circuit board 40 to which the laser beam is applied, the films are removed through evaporation. Specifically, in the target area of the general design array board 40AR to which the laser beam is applied, at least the metal films 20 and 23 (the gate lines 10i and the source lines 10j) are removed through evaporation. In the target area of the general design array board 40AR to which the laser beam is applied, the insulating films 21, 24, 25 and 27 and the transparent electrode films 26 and 28 are removed. In the target area of the general design CF board 40CF to which the laser beam is applied, at least the color filters 10k are removed through evaporation. In the target area of the general design CF board 40CF to which the laser beam is applied, the overcoat film 10m is removed. The output of the laser beam in the laser lithography unit can be altered as appropriate.

The customer terminal 33 includes a personal computer and a display at the customer site. The customer terminal 33 is connected to the processor 36 via the information and communication line 37. The outline of the liquid crystal panels 10 and the order quantity in the order from the customer are entered into the customer terminal 33. The processor 36 connected to the customer terminal 33 via the information and communication line 37 writes the information entered in the customer terminal 33 in the memory 34, which will be described next.

The memory 34 is a recording medium configured to store various kinds of information such as a hard disk and a solid state drive (SSD). The memory 34 can read and write the various kinds of information based on processing instructions from the processor 36 that is connected to the memory 34 via the information and communication line 37. The information stored in the memory 34 includes at least order design information (the specified outline and the order quantity) on the specified outline of the liquid crystal panels 10 in the order from the customer, an expected shipping date of the liquid crystal panels 10 ordered by the customer, general design information on the general design circuit boards 40 (the length of the terminals 14, the length of the gate drives GDM, and so on), the number of the general design circuit boards 40 arranged within the plate surface of the general design base board 40M, the number of the general design base boards 40M (the general design circuit boards 40) produced by the general design circuit board producing section 31, an upper limit of stock of the general design base boards 40M, and a lower limit of the stock of the general design base boards 40M. If different outlines and quantities are entered into the customer terminal 33 by the customer for different types of the liquid crystal panels 10 having different types of outlines, the respective quantities of the different types of the liquid crystal panels 10 are stored in the memory 34.

The liquid crystal panel producing section 35 is configured to produce the ordered liquid crystal panel 10 using the general design circuit board 40 produced by the frame processing section 32 based on processing instructions from the processor 36 connected to the liquid crystal panel producing section 35 via the information and communication line 37. The liquid crystal panel producing section 35 includes an alignment firm forming unit, a sealing member lithography unit, a liquid crystal dropping unit, a board bonding section, a sealing member curing unit, and a cutting unit. The alignment film forming unit is configured to form the alignment films 10$n$ and 10$o$ on the general design array board 40AR and the general design CF board 40CF included in the general design circuit board 40. The sealing member lithography unit is configured to form the sealing member 10$f$ on the general design CF board 40CF. The liquid crystal dropping unit is configured to drop the liquid crystal material on the general design CF board 40CF. The board bonding section is configured to bond the general design array board 40AR and the general design CF board 40CF together with a sealing member 10$f$ and the liquid crystal layer 10$e$ between the frames of the general design array board 40AR and the general design CF board 40CF. The sealing member curing unit is configured to cure the sealing member 10$f$. The cutting unit is configured to cut the general design array board 40AR and the general design CF board 40CF that are bonded together to prepare the liquid crystal panels 10. The alignment film forming unit includes an alignment film forming unit for forming the alignment films 10$n$ and 10$o$ and a rubbing unit for rubbing the baked alignment films 10$n$ and 10$o$.

The processor 36 includes a central processing unit (CPU). The processor 36 is configured to control the general design circuit board producing section 31, the frame processing section 32, and the liquid crystal panel producing section 35 connected via the information and communication lines 37 to perform the production and the processing. The processor 36 is configured to read and write the various kinds of information from and into the memory 34. The processor 36 is configured to store the information entered in the customer terminal 33 connected via the information and communication line 37 in the memory 34. Specifically, the processor 36 is configured to perform at least the following processes: a process for controlling the general design circuit board producing section 31 to produce the general design circuit boards 40; a process for controlling the frame processing section 32 to process the frames of the general design circuit boards 40 for the order quantity based on the specified outline of the liquid crystal panels 10 and the order quantity; and a process for controlling the liquid crystal panel producing section 35 to produce the ordered liquid crystal panels 10 using the general design circuit boards 40 on which the frame processing is performed. Upon the incoming order, the processor 36 checks the ordered design information entered in the customer terminal 33 by the customer and stored in the memory 34 against the general design information stored in the memory in advance. If the ordered design information is incompatible with the general design information, the processor 36 outputs a notification to prompt the customer to modify the design of the outline of the liquid crystal panels 10 on the customer terminal 33. In the process for producing the general design circuit board 40, the processor 36 calculates the stock of the general design base boards 40M by subtracting the order quantity for the liquid crystal panels 10 from the production quantity of the general design base boards 40M (the general design circuit boards 40) stored in the memory. If the stock of the general design base boards 40M reaches the upper limit of the stock of the general design base boards 40M, the processor 36 controls the general design circuit board producing section 31 to halt the production of the general design base boards 40M. If the stock of the general design base boards 40M reaches the lower limit of the stock of the general design base boards 40M, the processor 36 controls the general design circuit board producing section 31 to produce the general design circuit boards 40M. Before processing the frames of the general design circuit boards 40, the processor 36 calculates a start date of the frame processing based on the expected shipping date stored in the memory 34. On the start date of the frame processing, the processor 36 controls the frame processing section 32 to process the frames of the general design circuit boards 40. If outlines and order quantities for different types of the liquid crystal panels 10 having different outlines regarding different types of the liquid crystal panels 10 with different types of outlines are entered into the customer terminal 33 by the customer, the processor 36 calculates percentages of the order quantities of the different types of the liquid crystal panels 10 based on the order quantities stored in the memory 34 for the frame processing of the general design circuit boards 40. The processor 36 controls the frame processing section 32 to process the frames of the general design circuit boards 40 within the plate surface of the general design base board 40M with the calculated percentages of the order quantities reflected to the process.

Figure 10:
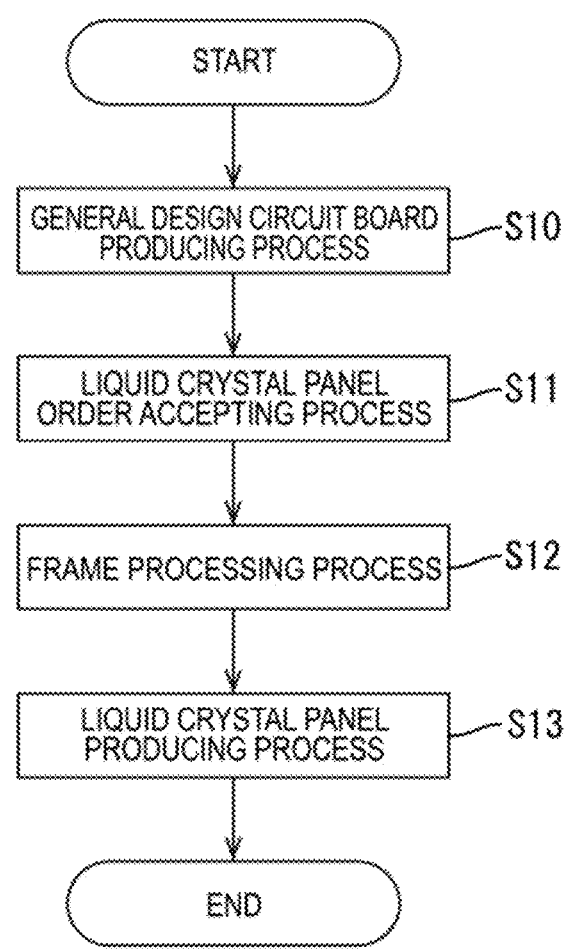
FIG. 10 is a flowchart illustrating a method of controlling production of the liquid crystal panel.

Next, the method of controlling the production of the liquid crystal panels 10 using the production control system for the liquid crystal panels 10 described above will be described. As illustrated in FIG. 10, the method of controlling the production of the liquid crystal panels 10 according to this embodiment includes at least a general design circuit board producing step (step S10), a liquid crystal panel order accepting step (step S11), a frame processing step (step S12), and a liquid crystal panel producing step (step S13). The general design circuit board producing step is for producing the general design circuit boards 40 is in general design including the estimated maximum outline of the liquid crystal panel 10 in an expected order in advance. The liquid crystal panel order accepting step is for accepting the order made by the customer. The frame processing step is for processing the frames of the general design circuit boards 40 for the order quantity based on an outline of the liquid crystal panels 10 and the order quantity in the order made by the customer. The liquid crystal panel producing step is for producing the liquid crystal panels 10 with the outlines corresponding to the specified outline in the order from the customer. Steps S10 to S13 are processing procedures for volume production of the liquid crystal panels 10. Simultaneous execution of steps S10 to S13 may be possible.

Figure 11:
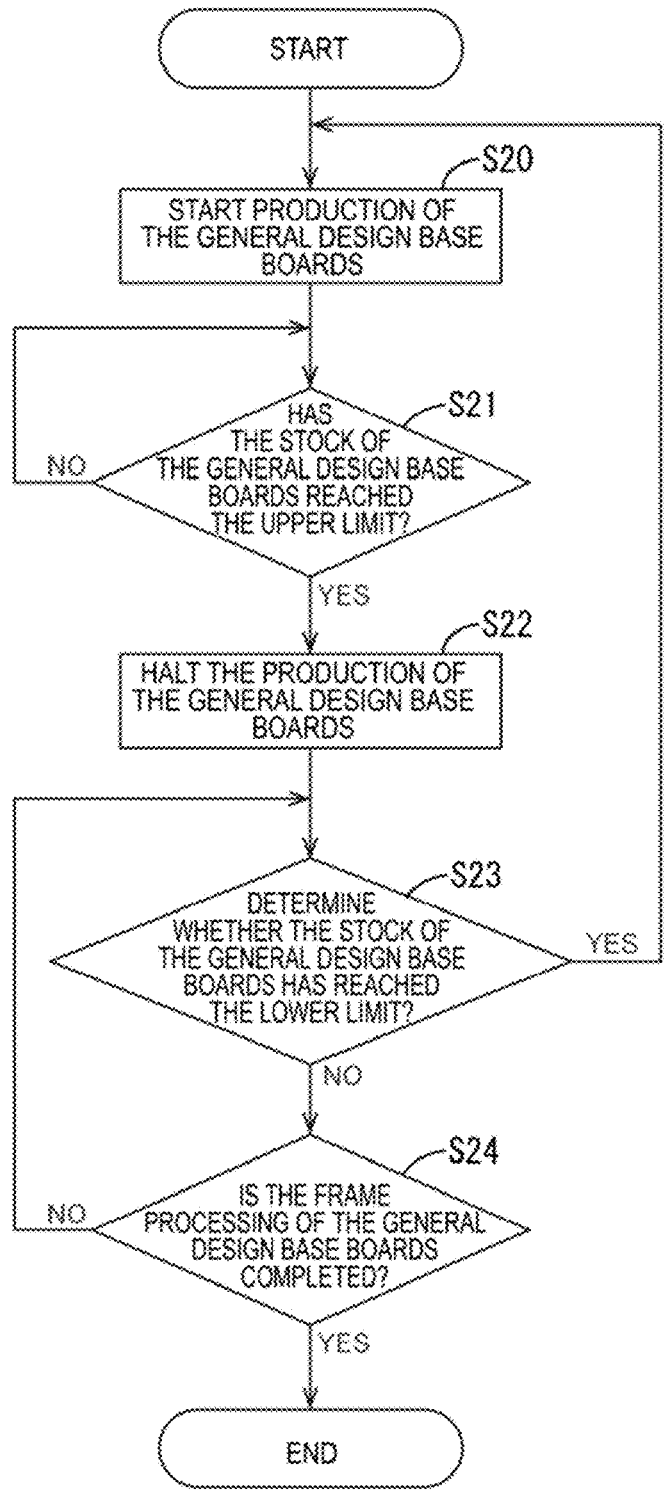
FIG. 11 is a flowchart illustrating a general design circuit board production process.
Figure 12:
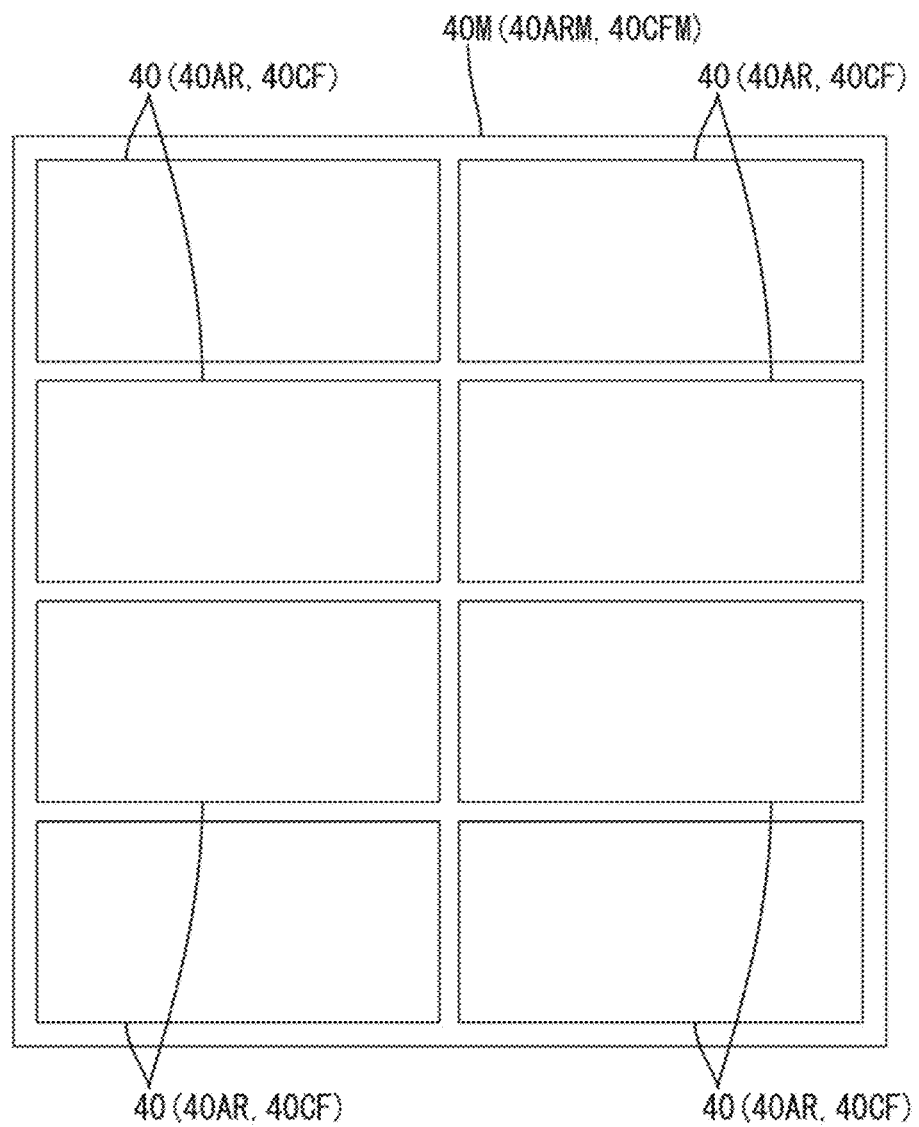
FIG. 12 is a plan view illustrating a general design base board.

As illustrated in FIG. 11, the general design circuit board producing process includes: a step for starting production of the general design base boards 40M including the plate surfaces on which the general design circuit boards 40 are arranged (step S20); a step for determining whether the stock of the general design base boards 40M has reached the upper limit (step S21); a step for halting the production of the general design base boards 40M (step S22); a step for determining whether the stock of the general design base boards 40M has reached the lower limit (step S23); and a step for determining whether the frame processing step (step S12) for processing the frames of the general design base boards 40M which is performed simultaneously is completed (step S24). Specifically, when step S20 is completed, the general design circuit board producing section 31 starts the production of the general design base boards 40M including the plate surfaces on which the general design circuit boards 40 are arranged according to the instructions from the processor 36 as illustrated in FIG. 2. If it is determined that the stock of the general design base boards 40M has not reached the upper limit in step S21, the production of the general design base boards 40M continues. If the stock of the general design base boards 40M has reached the upper limit, the process proceeds to step S22 and the general design circuit board producing section 31 halts the production of the general design base boards 40M. If it is determined that the stock of the general design base boards 40M has reached the lower limit in step S23, the process returns to step S20 and the general design circuit board producing section 31 starts the production of the general design base boards 40M according to the instructions from the processor 36. If the stock of the general design base boards 40M has not reached the lower limit, the process proceeds to step S24. If it is determined that the frame processing of the general design base boards 40M performed simultaneously is not completed in step S24, the process returns to step S23. If the frame processing of the general design base boards 40M is completed, the general design circuit board producing process ends. According to the general design producing process, the stock of the general design base boards 40M is less likely to become excessive or short, that is, the proper stock is maintained. Because the stock is less likely to become excessive, the production cost can be reduced. Furthermore, because the stock is less likely to become short, this is preferable for reducing the lead time.

Figure 13:
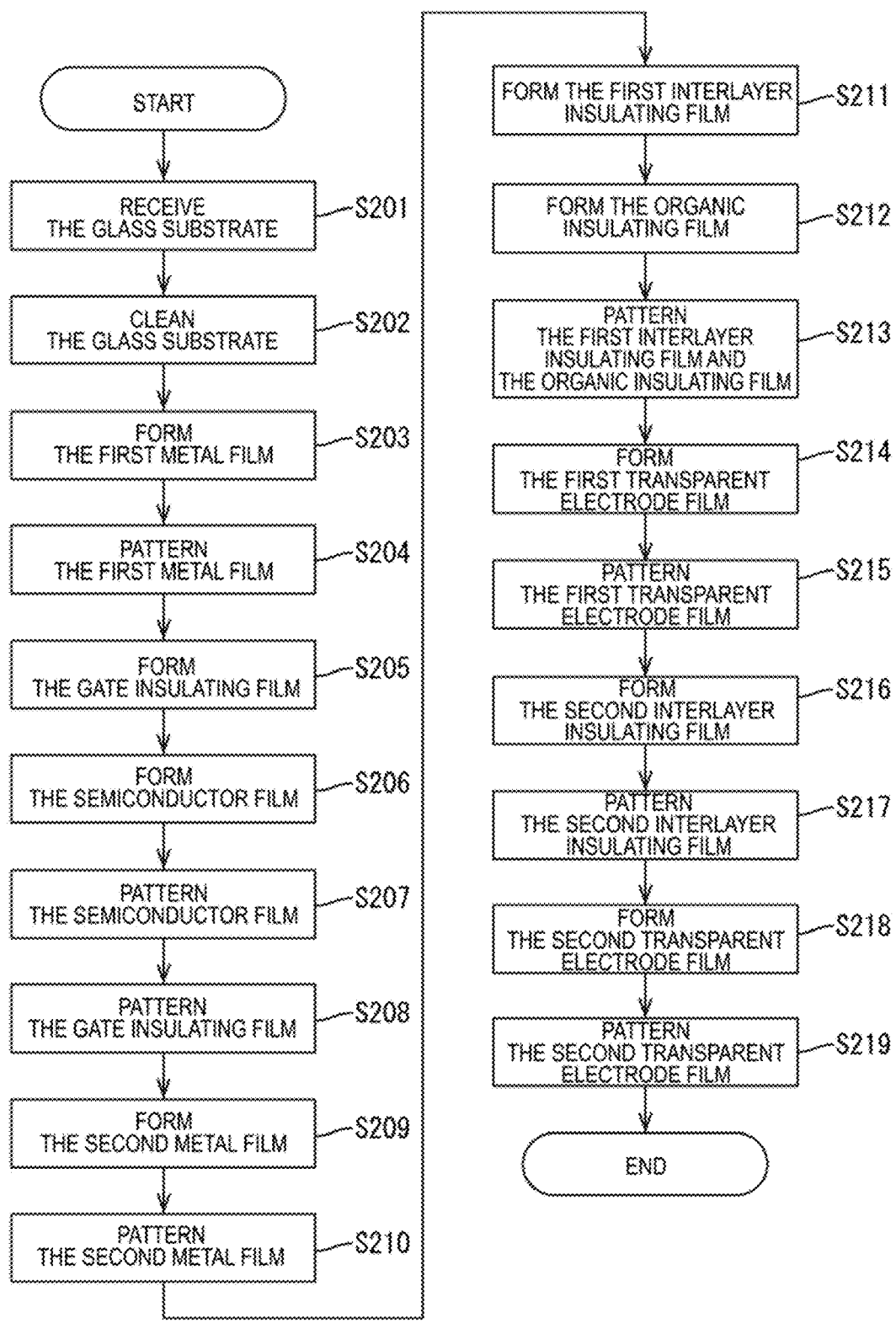
FIG. 13 is a flowchart illustrating the general design circuit board production process regarding a general design array board.

In the general design circuit board producing process, the general design circuit board producing section 31 produces the general design array base boards 40ARM and the general design CF base boards 40CFM in the general design base boards 40M according to the following flowchart. The procedures of producing the general design array boards 40AR in the general design array base boards 40ARM will be described. As illustrated in FIG. 13, each general design array board 40AR is produced through the following steps: a step for receiving the glass substrate GS in the general design circuit board producing section 31 (step S201); a step for cleaning the glass substrate GS (step S202); a step for forming the first metal film 20 on the glass substrate (step S203); a step for patterning the first metal film 20 (step S204); a step for forming the gate insulating film 21 (step S205); a step for forming the semiconductor film 22 (step S206); a step for patterning the semiconductor film 22 (step S207); a step for patterning the gate insulating film 21 (step S208); a step for forming the second metal film 23 (step S209); a step for patterning the second metal film 23 (step S210); a step for forming the first interlayer insulating film 24 (step S211); a step for forming the organic insulating film 25 (step S212); a step for patterning the first interlayer insulating film 24 and the organic insulating film 25 (step S213); a step for forming the first transparent electrode film 26 (step S214); a step for patterning the first transparent electrode film 26 (step S215); a step for forming the second interlayer insulating film 27 (step S216); a step for patterning the second interlayer insulating film 27 (step S217); a step for forming the second transparent electrode film 28 (step S218); and a step for patterning the second transparent electrode film 28 (step S219).

Figure 14:
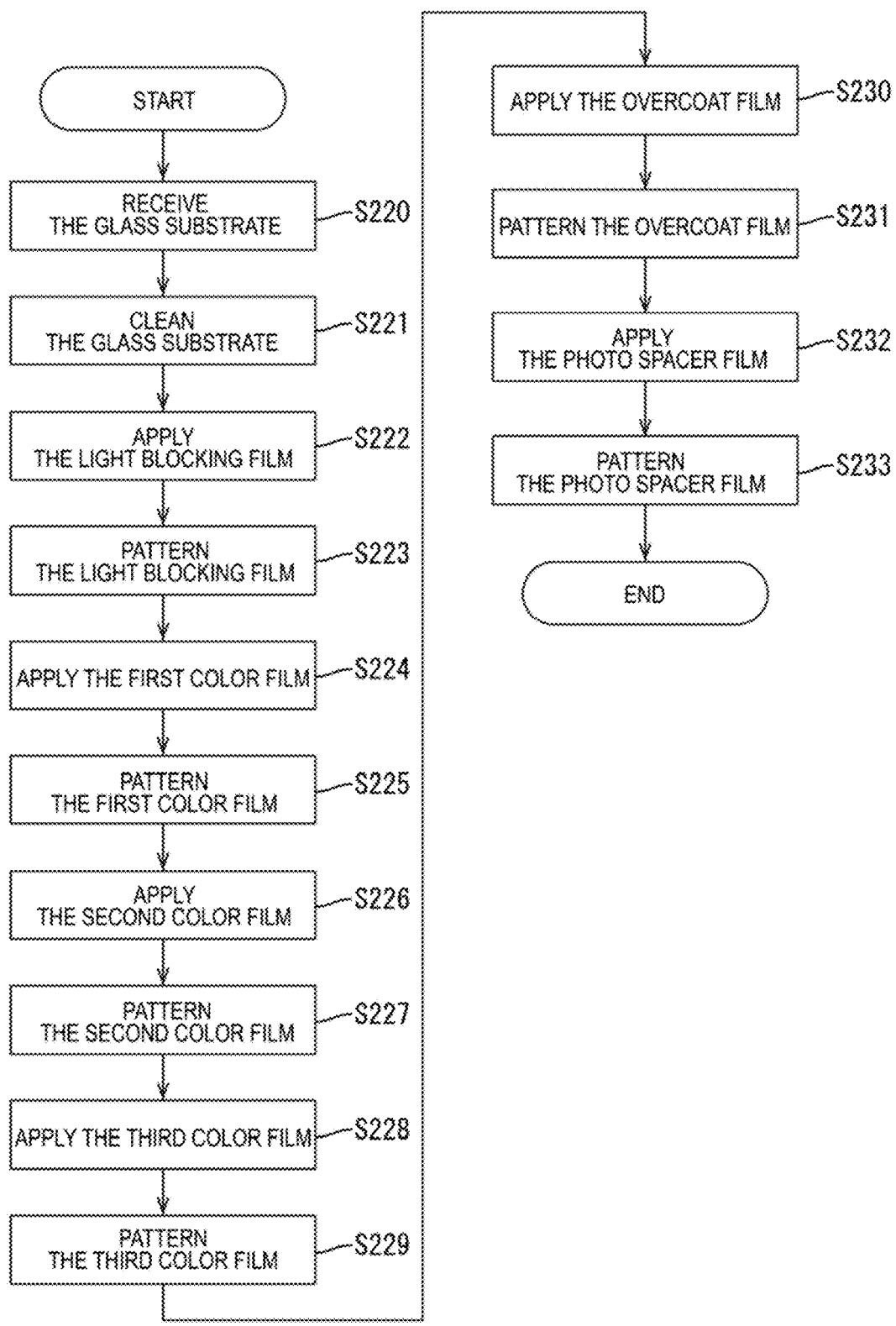
FIG. 14 is a flowchart illustrating the general design circuit board production process regarding a general design CF board.

The procedures of producing the general design CF boards 40CF in the general design CF base boards 40CFM will be described. As illustrated in FIG. 14, each general design CF board 40CF is produced through the following steps: a step for receiving the glass substrate GS in the general design circuit board producing section 31 (step S220); a step for cleaning the glass substrate GS (step S221); a step for applying a light blocking film 10*l* (step S222); a step for patterning the light blocking film 10*l* (step S223); a step for applying the first color films of the color filters 10*k* (step S224); a step for patterning the first color films of the color filters 10*k* (step S225); a step for applying the second color films of the color filters 10*k* (step S226); a step for patterning the second color films of the color filters 10*k* (step S227); a step for applying the third color films of the color filters 10*k* (step S228); a step for patterning the third color films of the color filters 10*k* (step S229); a step for applying the overcoat film 10*m* (step S230); a step for patterning the overcoat film 10*m* (step S231); a step for applying the photo spacer films (step S232); and a step for patterning the photo spacer films (step S233). The first color films to the third color films in the color filters 10*k* exhibit R, G and B colors, respectively. The sequence of forming the color films can be arbitrarily set.

Figure 15:
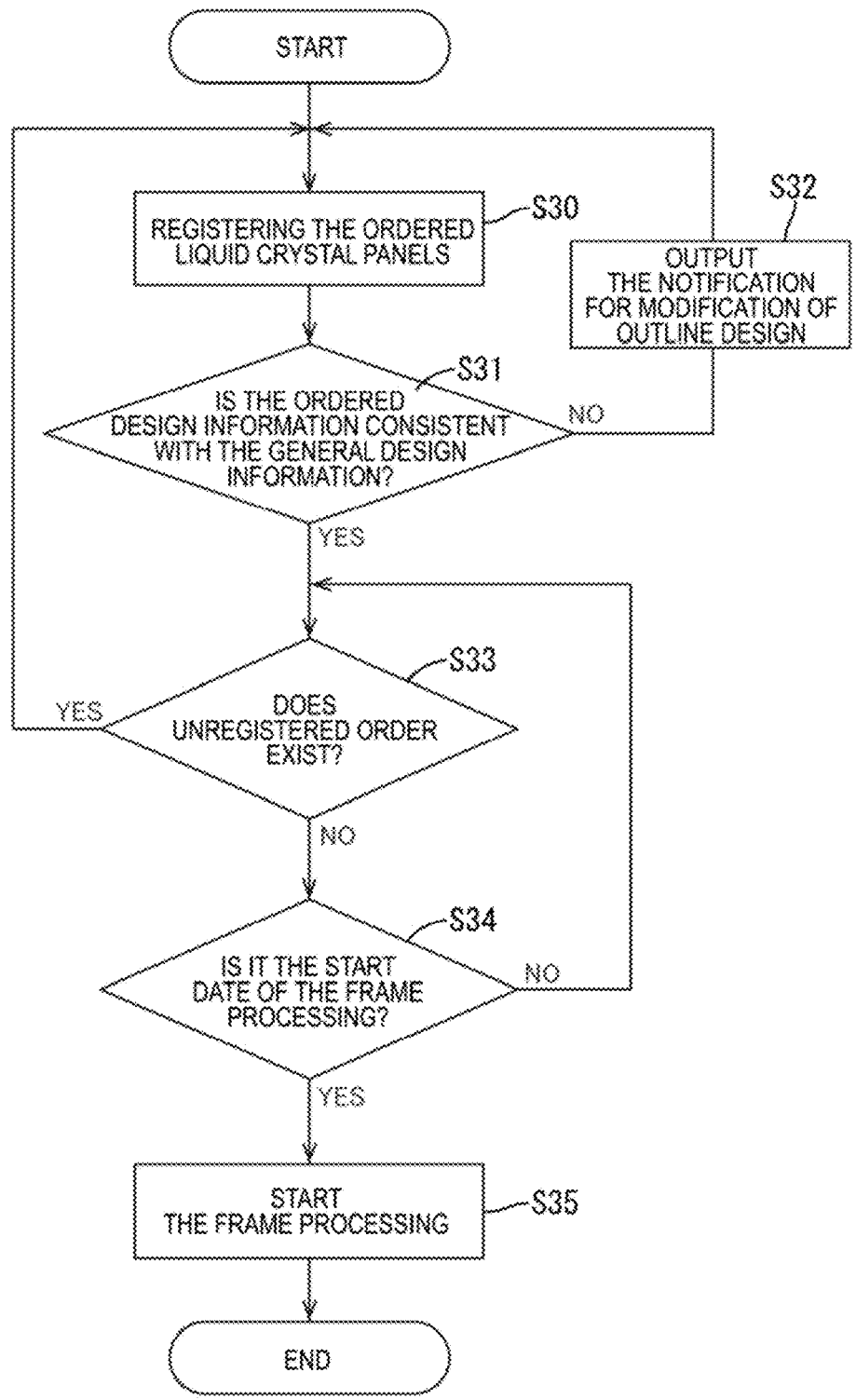
FIG. 15 is a flowchart illustrating a liquid crystal panel order accepting process.

In the liquid crystal panel order accepting process, as illustrated in FIG. 15, the processor 36 executes the following steps: a step for registering the ordered liquid crystal panels 10 (step S30); a step for determining whether the ordered design information is consistent with the general design information (step S31); a step for outputting the notification for modification of outline design of the liquid crystal panels 10 if it is determined that the ordered design information is not consistent with the general design information in step 31 (step S32); a step for determining whether unregistered order exists if it is determined that the ordered design information is consistent with the general design information in step S31 (step S33); a step for determining whether it is the start date of the frame processing if it is determined that the unregistered order does not exist in step S33 (step S34); and a step for starting the frame processing if it is determined that it is the start date of the frame processing in step S34 (step S35). Specifically, when the outline of the liquid crystal panels, and the order quantity, the deadline (the expected shipping date) are entered into the customer terminal 33 by the customer, the processor 36 writes (or registers) the ordered design information on the specified outline of the liquid crystal panels 10, the order quantity, and the deadline in the order in the memory 34 in step S30. The general design information including the lengths of the terminals 14 and the gate drivers GDM of the general design circuit boards 40 are stored in the memory 34 in advance. In step S31, the processor 36 checks the ordered design information against the general design information and determines the consistency based on whether the ordered design information matches the general design information.

Figure 16:
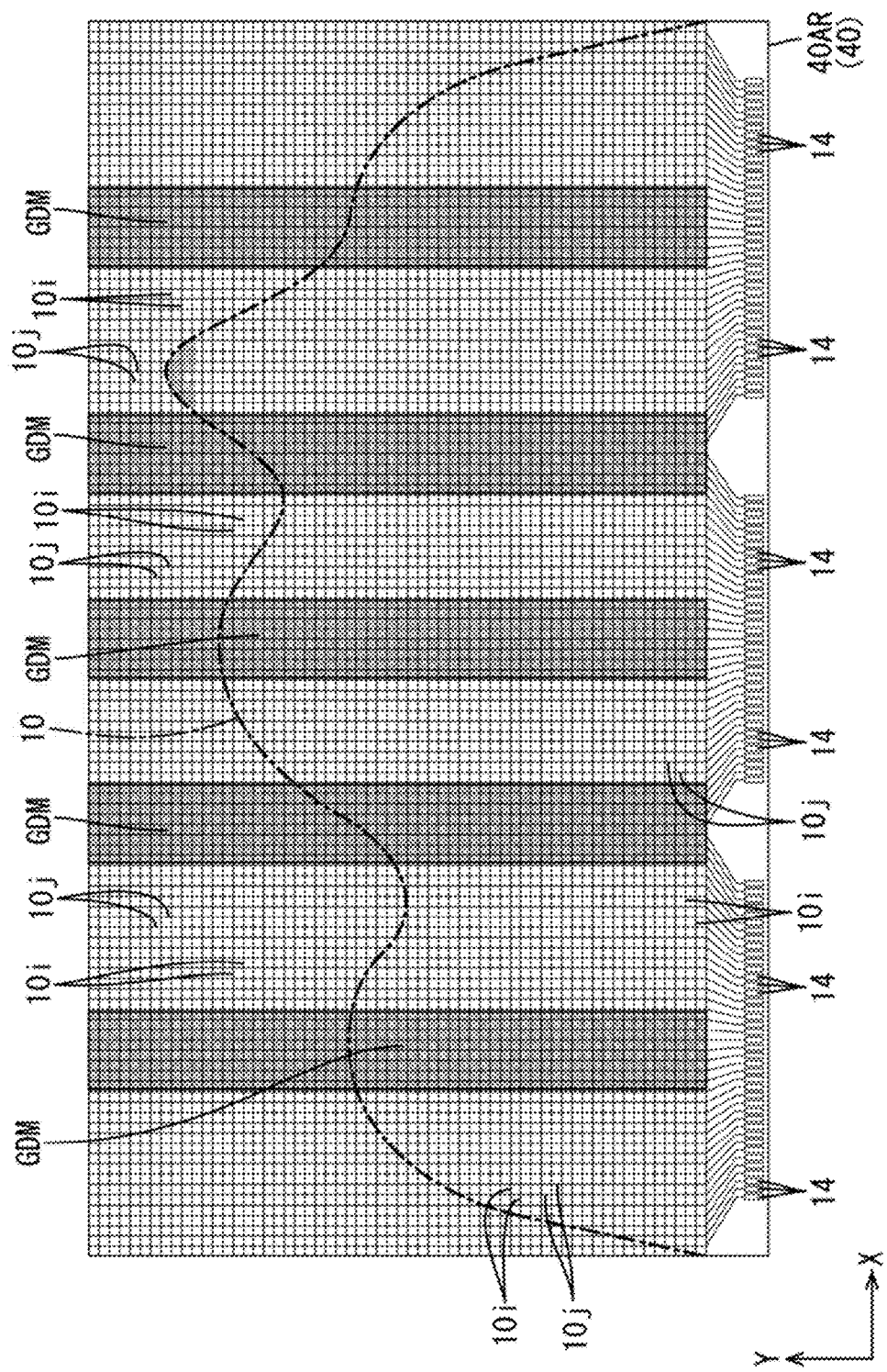
FIG. 16 is a plan view illustrating an outline of the liquid crystal panel, ordered design information of which is determined inconsistent with general design information in the liquid crystal panel order accepting process.
Figure 18:
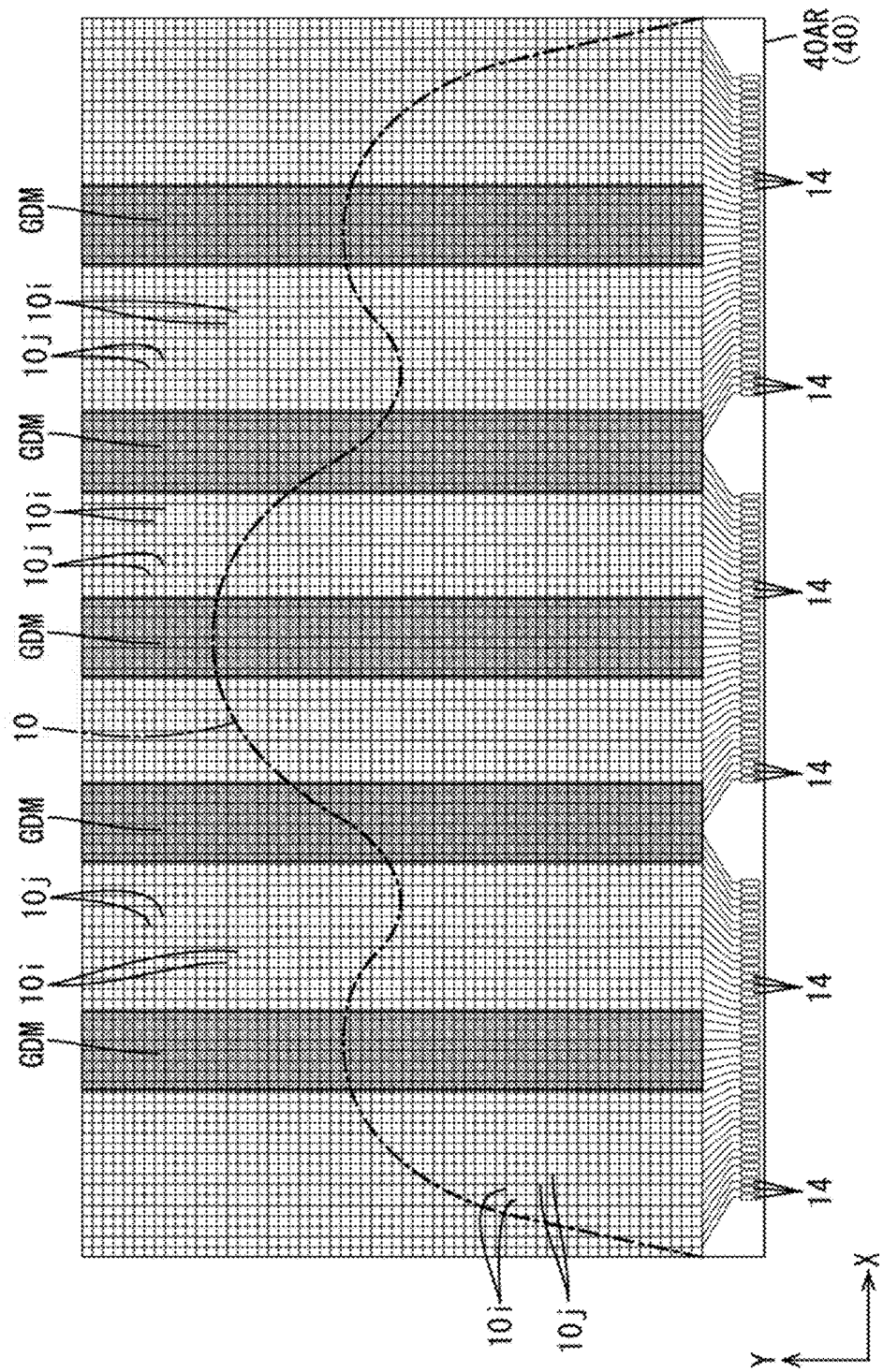
FIG. 18 is a plan view illustrating an outline of the liquid crystal panel, ordered design information of which is determined consistent with the general design information in the liquid crystal panel order accepting process.

The "determination of consistency" will be described in detail. To determine the consistency, the processor 36 first divides the winding section of the specified outline into gate overlapping portions that overlap the gate drivers GDM and gage non-overlapping portions that do not overlap the gate drivers GDM and compares the gate overlapping portions with the adjacent gate non-overlapping portions in the X-axis direction. Specifically, if the specified outline of the liquid crystal panels 10 in the ordered design information is one that is illustrated in FIG. 16 and the gate overlapping portions are compared with the gate non-overlapping portions that are adjacent in the X-axis direction, a distance between a section of the specific gate non-overlapping portion (the second gate non-overlapping portion from the right in FIG. 16) and the terminal 14 in the Y-axis direction is larger than a distance between the adjacent gate overlapping portion and the terminal 14. In FIG. 16, the specified outline of the liquid crystal panels 10 in the order is indicated with the chain line. In comparison between the gate non-overlapping portions and the adjacent gate overlapping portions, if such a larger distance from the terminal in the Y-axis direction exits, the gate signals from the gate driver GDM may not be supplied to an area of the liquid crystal panel 10 (the shaded area with patterns different from the pattern of the gate driver GDM in FIG. 16). Namely, images cannot be displayed in the area. Therefore, the processor 36 determines that the order for the liquid crystal panels 10 with such outline design is not consistent with the general design information. The process proceeds to step S32 to output the notification for prompting modification of the outline design to the customer terminal 33. When the customer makes an order for the liquid crystal panels 10 with new outline design, the registration of the ordered liquid crystal panel 10 is performed in step S30. If the specified outline of the liquid crystal panels 10 in the ordered design information is one that is illustrated in FIG. 18 and the gate overlapping portions are compared with the gate non-overlapping portions that are adjacent in the X-axis direction, no area with a larger distance from the terminal 14 in the Y-axis direction exists. In such a case, an area to which the gate signals from the gate driver GDM cannot be supplied does not exist. Therefore, the processor 36 determines that the order is consistent with the general design information. The process proceeds to step S33.

Figure 17:
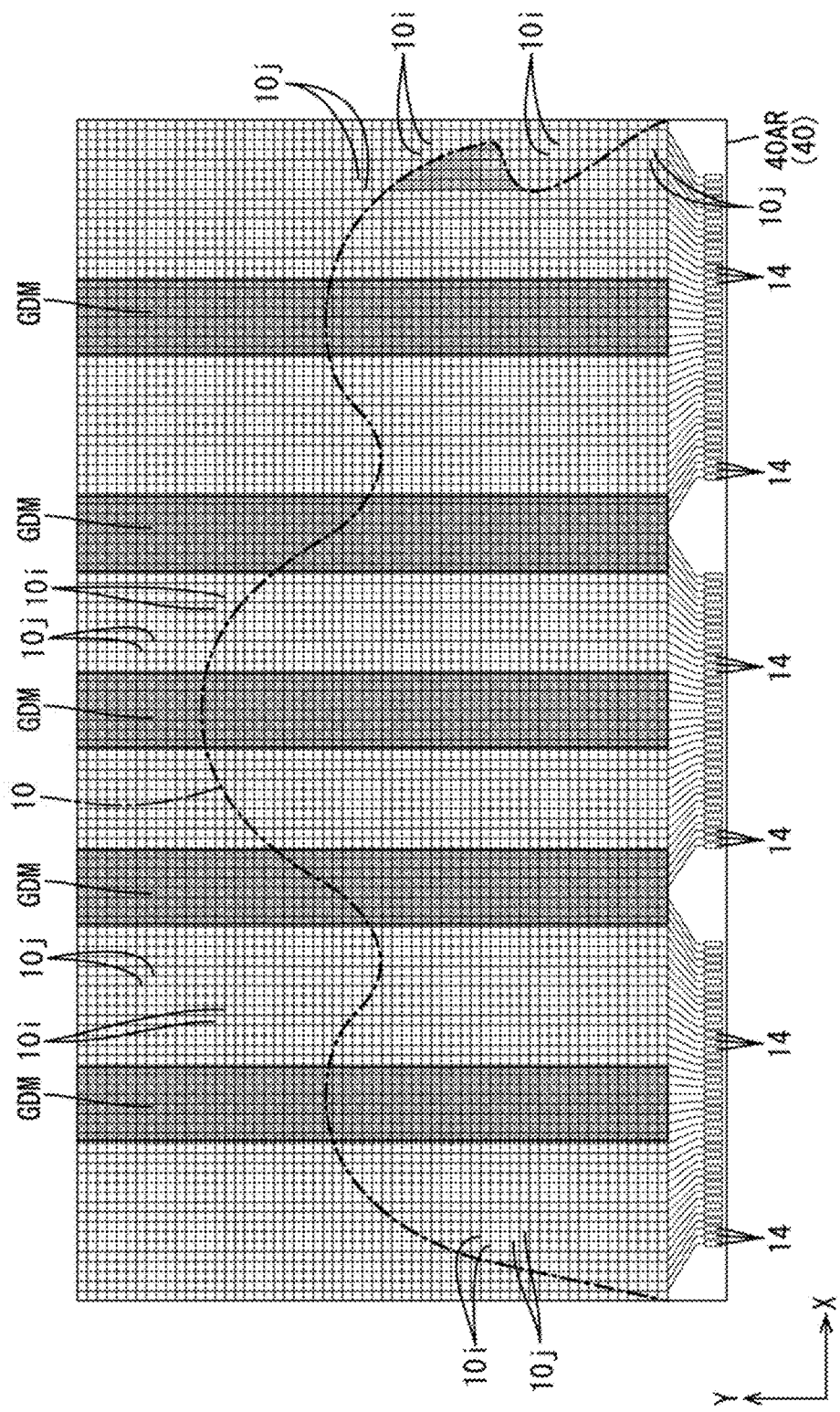
FIG. 17 is a plan view illustrating an outline of the liquid crystal panel, ordered design information of which is determined inconsistent with the general design information in the liquid crystal panel order accepting process.

In the determination of the compatibility, the processor 36 secondary moves a line along the Y-axis direction in the X-axis direction of the entire length in each liquid crystal panel 10 and calculates every intersection of the line with the winding section of the outline of the liquid crystal panel 10. Specifically, if the specified outline of the liquid crystal panel in the ordered design information is one that is illustrated in FIG. 17, the number of intersections of the line along the Y-axis direction with the winding section of the outline is two or larger in the gate non-overlapping portion at the right end in FIG. 17. Namely, multiple intersections exist. In FIG. 17, the specified outline of the liquid crystal panel 10 in the order is indicated with the chain line in FIG. 17. In such a case, the source signals from the terminal 14 may not be supplied to an area of the liquid crystal panel 10 (the shaped area with patterns different from the pattern of the gate driver GDM in FIG. 17). Namely, images cannot be displayed in the area. Therefore, the processor 36 determines that the order for the liquid crystal panels 10 with such outline design is not consistent with the general design information. The process proceeds to step S32 to output the notification for prompting modification of the outline design to the customer terminal 33. If the specified outline of the liquid crystal panel 10 in the ordered design information is one that is illustrated in FIG. 18, the number of intersection of line along the Y-axis direction with the winding section of the outline for the entire area of the liquid crystal panel 10 is one. Namely, the intersection is not plural. In such a case, the liquid crystal panel 10 does not include an area to which the source signals from the terminal 14 cannot be supplied. Therefore, the processor 36 determines that the order for the liquid crystal panels 10 with such outline design is consistent with the general design information. The process proceeds to step S33.

In step S33, the processor 36 determines whether an unregistered order exists. If the unregistered order exits, the process returns to step S30 to register the unregistered liquid crystal panels 10. If an unregistered order does not exist, the process proceeds to step S34. In step S34, the processor 36 calculates the start date of the frame processing based on the expected shipping date included in the ordered design information stored in the memory 34. If it is the start date of the frame processing, the process proceeds to step S35 to control the frame processing section 32 to start the frame processing of the general design circuit boards 40. If it is determined that it is not the start date of the frame processing in step S34, the process returns to the step S33 and the processor 36 determines whether an unregistered order exists.

Figure 19:
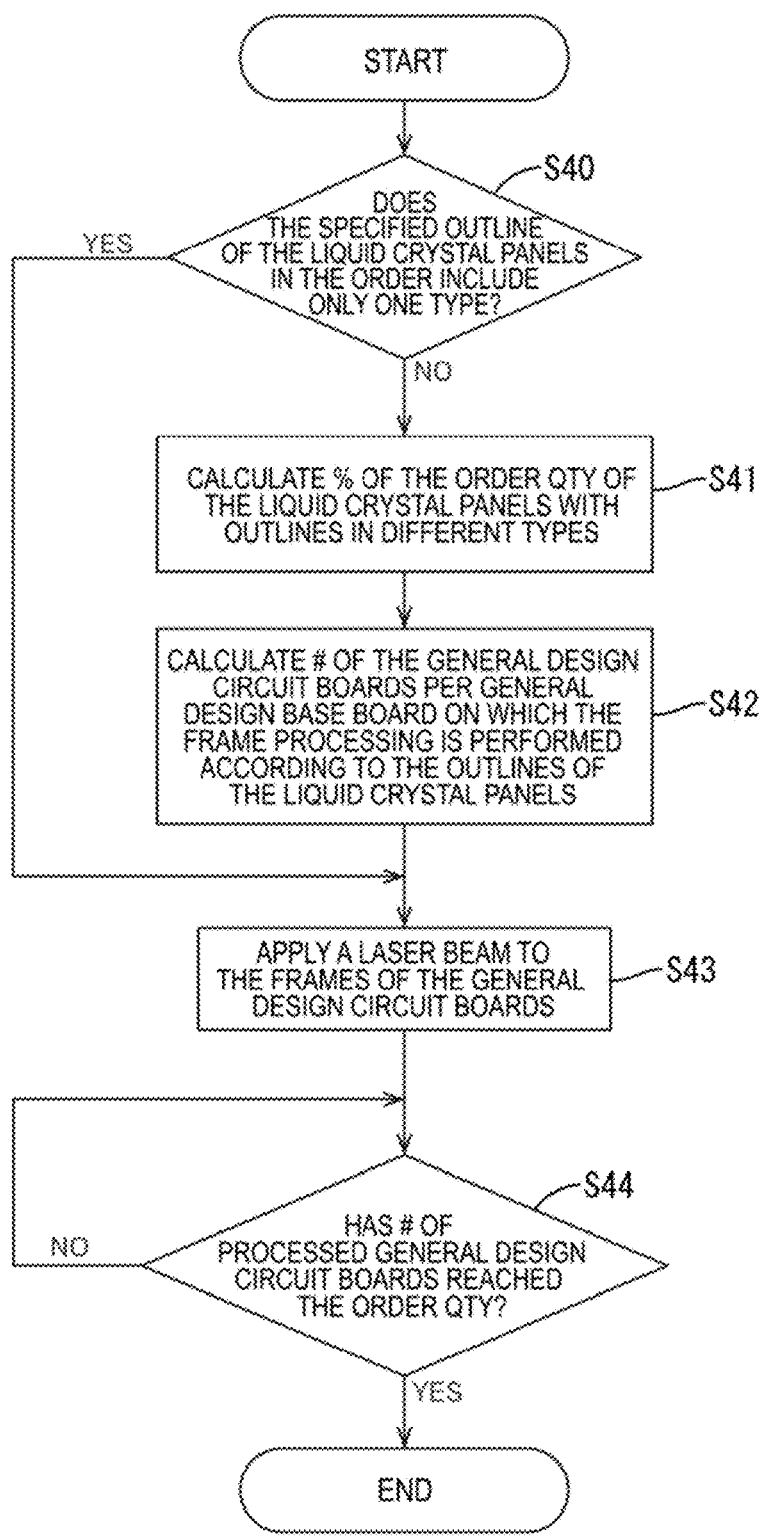
FIG. 19 is a flowchart illustrating a frame processing process.
Figure 20:
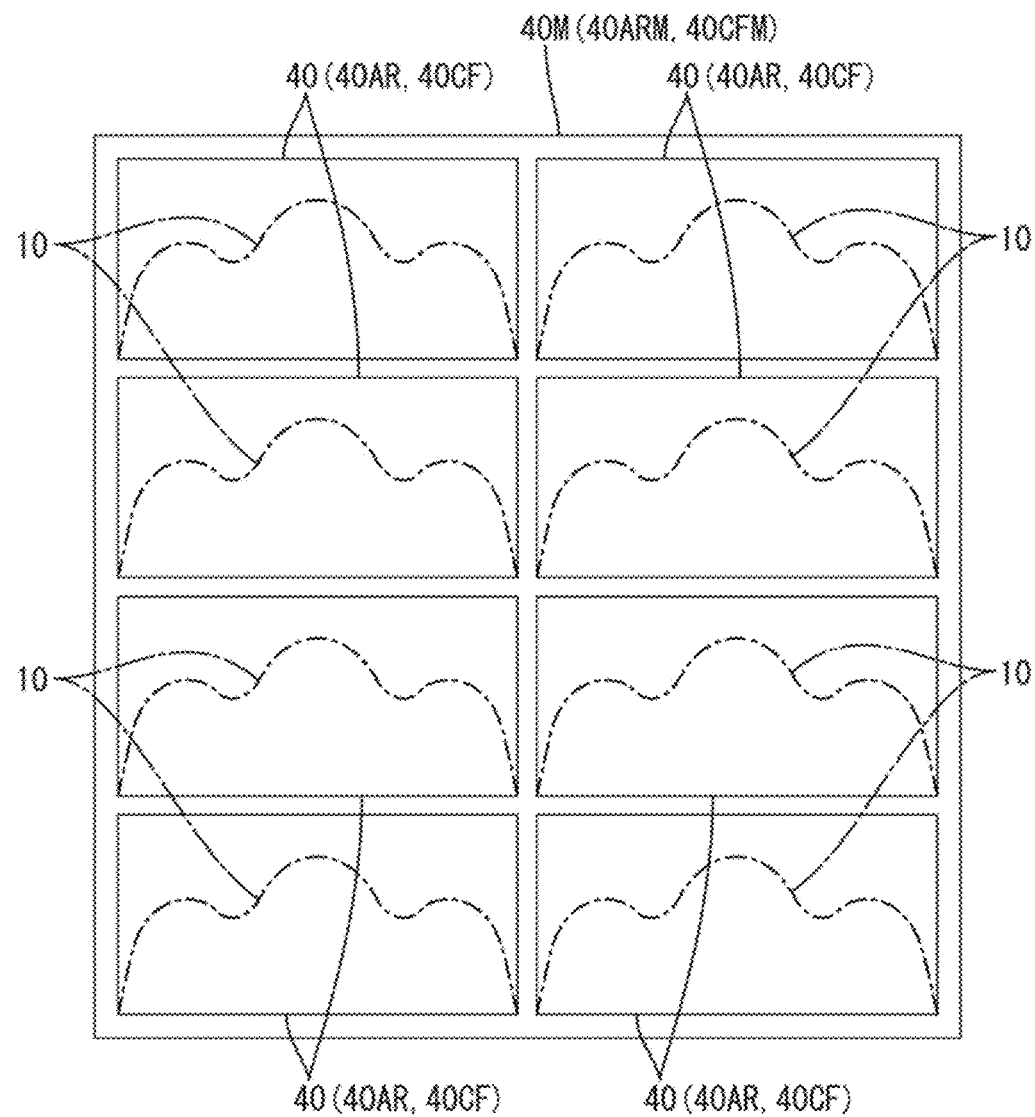
FIG. 20 is a plan view of a general design base board for the liquid crystal panels with outlines in one type.
Figure 21:
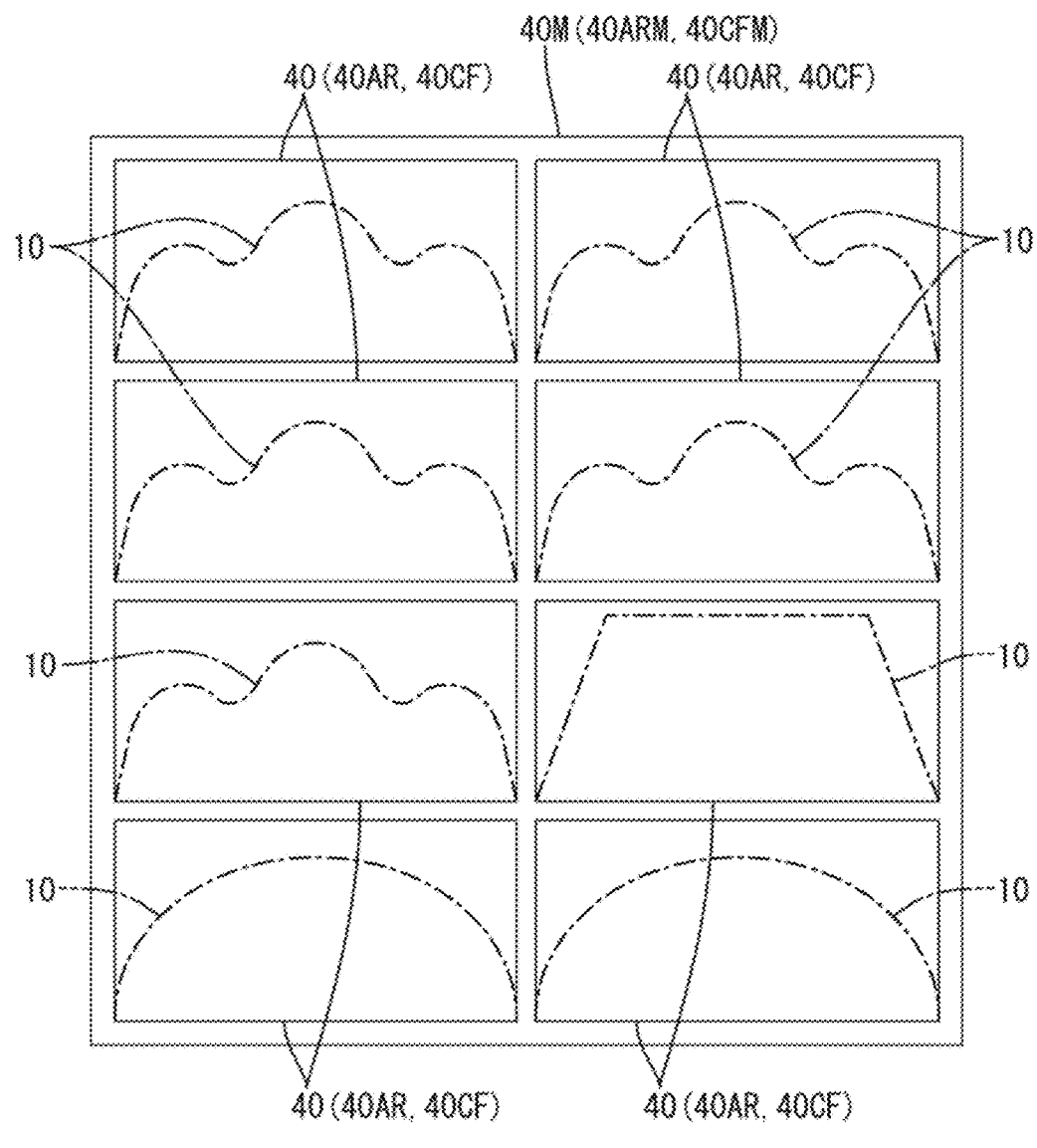
FIG. 21 is a plan view of a general design base board for the liquid crystal panels with outlines in three types.

In the frame processing process, as illustrated in FIG. 19, the processor 36 executes the following steps: a step for determining whether the specified outline of the liquid crystal panels 10 in the order includes only one type (step S40); a step for calculating percentages of the order quantities of the liquid crystal panels 10 with outlines in different types if the specified outline is not only one type (step S41); a step for calculating the number of the general design circuit boards 40 per the general design base board 40M on which the frame processing is performed according to the outlines of the liquid crystal panels 10 (step S42); a step for applying a laser beam to the frames of the general design circuit boards 40 (step S43); and a step for determining whether the number of processed general design circuit boards 40 has reached the order quantity (step S44). Specifically, if it is determined that the specified outline of the liquid crystal panels 10 in the order includes only one type based on the ordered design information stored in the memory in step S40, the process proceeds to step S43 and the processor 36 controls the frame processing section 32 to process the frames of all general design circuit boards 40 arranged within the plate surface of the general design base board 40M to have the same outline as illustrated in FIG. 10. If it is determined that specified outline of the liquid crystal panels 10 in the order includes two or more types (multiple types) in step S40, the process proceeds to step S4 and the processor 36 calculates the percentages by dividing the order quantities of the liquid crystal panels 10 with the outlines in different types by the total based on the ordered design information stored in the memory 34. In this embodiment, it is supposed that the lengths of the terminals 14 and the lengths of the gate drivers GDM of the different types of liquid crystal panels 10 in the order are about equal. In step S42, the processor 36 calculates the number of general design circuit boards 40 on which the frame processing are performed along the outlines of the liquid crystal panels 10 in the general design base board 40M by multiplying the percentages of the order quantities of the liquid crystal panels 10 with the outlines in different types calculated in step S41 by the total number of the general design circuit boards 40 arranged on the plate surface of one general design base board 40M. In step S43, as illustrated in FIG. 21, the processor 36 controls the frame processing section 32 to process the frames of the general design circuit boards 40 arranged on the plate surface of the general design base board 40M based on the number of the general design circuit boards 40 on which the frame processing are performed along the outline of each type of the liquid crystal panels 10 in the general design base board 40M calculated in step S42. With the same general design base board 40M, the different types of the liquid crystal panels 10 with the outline indifferent types can be produced and shipped at the same time. Therefore, the different types of the liquid crystal panels 10 can be efficiently produced and thus the delivery time can be reduced.

Figure 23:
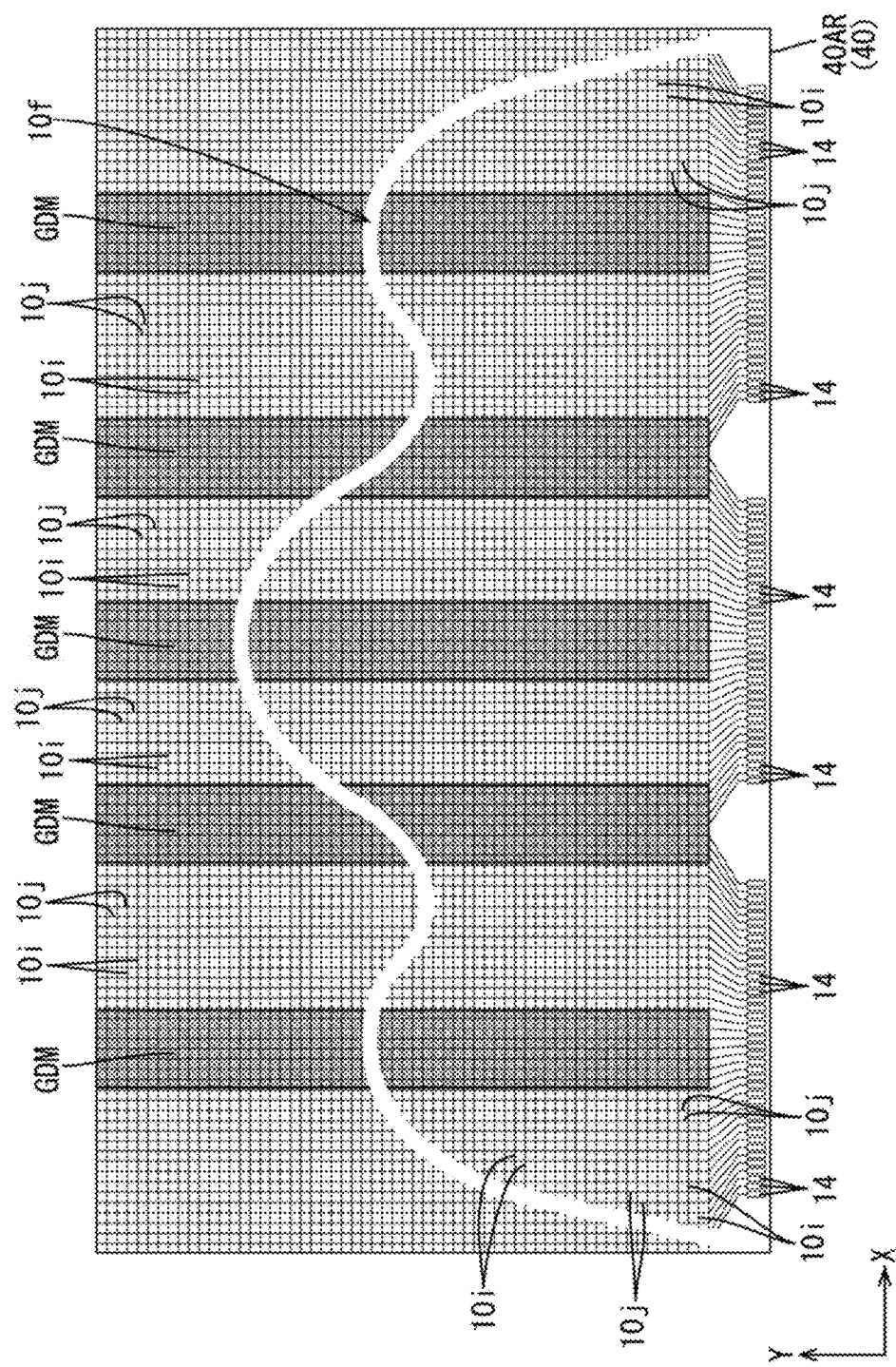
FIG. 23 is a plan view illustrating the general design array board on which frame processing is performed.

The application of the laser beam to the frame of each general design circuit board 40 in step S43 of the frame processing process will be described in detail. The laser lithography unit used in the frame processing process is for processing the frames of the general design circuit boards 40 that are arranged within the plate surface of the general design base board 40M in sequence. The laser lithography unit applies the laser beam with the output of the 355 nm wavelength and the 5 μJ pulse energy to a section of each general design circuit board 40 overlapping the winding section of the sealing member 10f for multiple times. To process the frame of the general design array board 40AR before the process illustrated in FIG. 22, the laser beam is applied to a section of the general design array board 40AR overlapping the winding section of the sealing member 10f by the laser lithography unit. As illustrated in FIG. 23, the gate lines 10i formed from the first metal film 20, the source lines 10j formed from the second metal film 23, the gate driver GDM formed from at least the first metal film 20 and the second metal film 23, the insulating films 21, 24, 25 and 17, and the transparent electrode films 26 and 28 in the target area of the laser beam are removed through evaporation. Within the plate surface of the general design array board 40AR illustrated in FIG. 23, a winding white area is the target area of the laser beam. To process the frame of the general design CF board 40CF before the process illustrated in FIG. 24, the laser beam is applied to a section of the general design CF board 40CF overlapping the winding section of the sealing member 10f by the laser lithography unit. The color filters 10k and the overcoat film 10m in the target area of the laser beam are removed through evaporation. Within the plate surface of the general design CF board 40CF illustrated in FIG. 25, the area indicated with winding two-dot chain lines is the target area of the laser beam.

Figure 26:
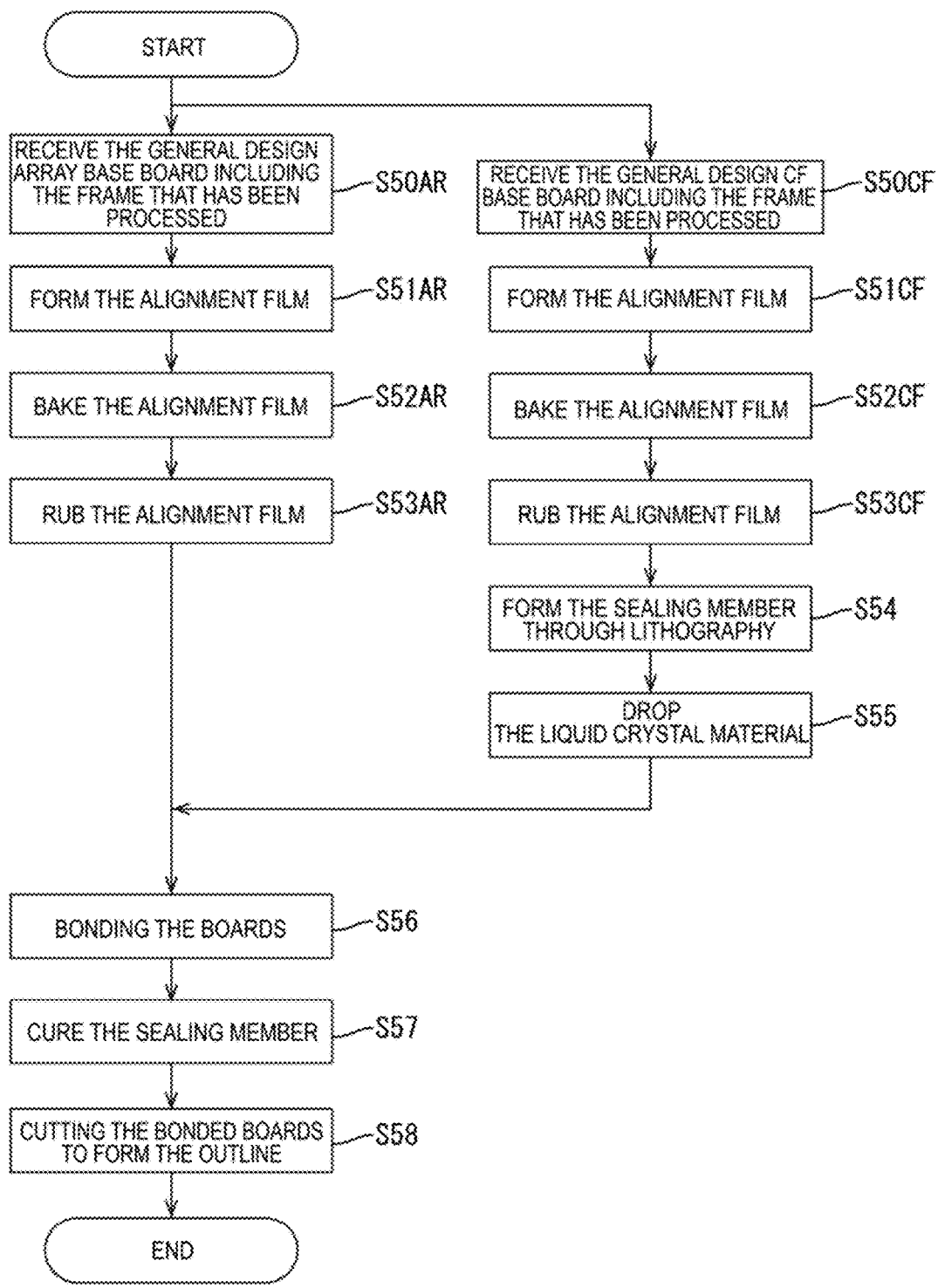
FIG. 26 is a flowchart illustrating a liquid crystal panel producing process.

In the liquid crystal panel producing process, as illustrated in FIG. 26, the processor 36 executes the following steps: steps for receiving the general design array base board 40ARM and the general design array base board 40ARM including the frames that have been processed (step S50AR, step S50CF); steps for forming the alignment films 10n and 10o (step S51AR, step S51CF), steps for baking the alignment films 10n and 10o (step S52AR, step S52CF); steps for rubbing the alignment films 10n and 10o (step S53AR, step S53CF; a step for forming the sealing member 10f on each general design circuit board CF through lithography (step S54); a step for dropping the liquid crystal material on each general design CF board 40CF (step S55); a step for bonding the general design array base board 40ARM and the general design CF base board 40CFM together (step S56); a step for curing the sealing member 10f (step S57); and a step for cutting each general design array base board 40ARM and each general design CF base board 40CFM that are bonded together to form the outline of the corresponding liquid crystal panel 10 (step S58). In step S58, the processor 36 controls a general glass cutting unit to cut the general design array base board 40ARM and the general design CF base board 40CFM that are bonded together in steps S56 and S57 to produce horizontally-long rectangular pieces larger than the specified outlines of the liquid crystal panel 10 in the order. The processor 36 controls a glass processing unit to finish edges of the pieces through cutting or polishing to produce the liquid crystal panels 10 with the specified outline in the order. According to the method, the liquid crystal panels 10 with the specified outline in the order can be produced and delivered by the deadline specified by the customer.

As described earlier, the production control system 30 for the liquid crystal panels 10 according to this embodiment is the production control system 30 for producing the liquid crystal panels 10 (display panels) with the specified outline in the order from the customer. The production control system 30 includes the general design circuit board producing section 31, the frame processing section 32, the customer terminal 33, the processor 36, and the information and communication lines 37. The general design circuit board producing section 31 is for producing the general design circuit boards 40 in general design including at least the estimated maximum outlines of the liquid crystal panels 10 in the expected order. The frame processing section 32 is for processing the frames of the general design circuit boards 40 based on the specified outline of the liquid crystal panels 10 in the order from the customer. The customer enters at least the outline of the liquid crystal panels 10 and the order quantity into the customer terminal 33. The processor 36 controls the general design circuit board producing section 31 to produce the general design circuit boards 40 and the frame processing section 32 to process the frames of the general design circuit boards 40 for the order quantity. The information and communication lines 37 connect the general design circuit board producing section 31, the frame processing section 32, and the customer terminal to the processor 36 for interactive communication.

According to the configuration, the processor 36 controls the general design circuit board producing section 31 to produce the general design circuit boards 40 in general design including at least the estimated maximum outline of the liquid crystal panels 10 in the expected order in advance to the order from the customer. When the outlines of the liquid crystal panels 10 and the order quantities are entered in the customer terminal 33 by the customer, the processor 36 controls the frame processing section 32 to process the frames of the produced general design circuit boards 40 in advance for the order quantities to produce the liquid crystal panels 10 with the specified outline in the order. Therefore, the period between the acceptance of the order of the liquid crystal panels 10 and the shipment (the lead time) can be reduced. Because the frames of the general design circuit boards 40 are processed by the frame processing section 32 based on the specified outline of the liquid crystal panels 10 in the order, the liquid crystal panels 10 with various types of outlines can be produced at low cost.

Furthermore, the memory 34 stores the ordered design information on the specified outline of the liquid crystal panels 10 in the order from the customer and the general design information on the general design circuit boards 40. The processor 36 checks the ordered design information against the general design information. If the ordered design information does not match the general design information, the processor 36 executes the step for outputting the notification to prompt modification of outline design of the liquid crystal panels 10 to the customer terminal 33. When the customer enters the outline of the liquid crystal panels 10 and the order quantity in the customer terminal 33, the ordered design information on the outline of the liquid crystal panels 10 is stored in the memory 34. The processor 36 checks the ordered design information on the outline of the liquid crystal panels 10 stored in the memory 34 against the general design information on the general design circuit boards 40. If the ordered design information does not match the general design information, the processor 36 executes the step for outputting the notification to prompt modification of outline design of the liquid crystal panels 10 to the customer terminal 33. The customer can modify the outline design of the liquid crystal panels 10 and make a new order. The "general design information" includes pieces of information on arrangement of lines and circuits included in the general design circuit boards 40.

The processor 36 executes the following steps: a step for controlling the general design circuit board producing section 31 to produce the general design array boards 40CF (the general design component boards) including at least the gate lines 10$i$ and the source lines 10$j$ (the lines) and the general design CF boards 40CF (the general design counter boards) including at least the color filters 10$k$ for the general design circuit boards 40; and a step for controlling the frame processing section 32 to process the frames of the general design array boards 40AR and the general design CF boards 40CF. The liquid crystal panel producing section 35 (the board bonding section) forms the sealing members 10$f$ between the frames of the general design array boards 40AR and the general design CF boards 40CF and bonds the general design array boards 40AR and the general design CF boards 40CF together. The processor 36 executes a step for removing the sections of the gate lines 10$i$, the source lines 10$j$, and the color filters 10$k$ on the general design array boards 40AR overlapping at least the sealing members 10$f$. Because the processor 36 executes a step for removing the sections of the gate lines 10$i$, the source lines 10$j$, and the color filters 10$k$ on the general design array boards 40AR overlapping at least the sealing members 10$f$, the gate lines 10$i$ and the source lines 10$j$ on the inner side of the general design array boards 40AR relative to the sealing members 10$f$ are less likely to be degraded due to erosion. Furthermore, because the processor executes the step for removing the section of the color filters 10$k$ on the general design CF boards 40CF overlapping at least the sealing members 10$f$, the sealing members 10$f$ between the frames are directly bonded to the general design CF boards 40CF without color filters 10$k$ when bonding the general design array board 40AR and the general design CF board 40CF together. Therefore, the bonding strength of the sealing members 10$f$ to the general design CF boards 40CF increases.

The processor 36 executes a step for controlling the general design circuit board producing section 31 to produce the general design base board 40M including the plate surface within which the general design circuit boards 40 are arranged. The memory 34 stores the number of the general design circuit boards 40 arranged within the plate surface of the general design base board 40M and the order quantities of the different types of the liquid crystal panels 10 when the outlines of the different types of the liquid crystal panels 10 having the different outlines and the order quantities thereof are entered in the customer terminal. The processor 36 calculates the percentages of the respective types of the liquid crystal panels 10 based on the order quantities stored in the memory 34. The processor 36 executes a step for controlling the frame processing section 32 to process the frames of the general design circuit boards 40 within the general design base board 40M with the calculated percentages of the order quantities reflected to the process. Through the processing of the frames of the general design circuit boards 40 arranged within the plate surface of the general design base board 40M by the frame processing section 32, the different outlines of the different types of the liquid crystal panels 10 are efficiently prepared. The processor 36 calculates the percentages of the order quantities based on the order quantities of the different types of the liquid crystal panels 10 stored in the memory 34, respectively. The processor 36 reflects the calculated percentages of the order quantities to the processing of the frames of the general design circuit boards 40 by the frame processing section 32. Therefore, the different types of the liquid crystal panels 10 can be produced and shipped at the same time. The different types of the liquid crystal panels 10 are efficiently produced and thus the delivery time can be reduced.

The memory 34 stores the number of the general design circuit boards 40 produced by the general design circuit board producing section 31, the order quantities of the liquid crystal panels 10 in the order entered in the customer terminal 33, the upper limit of the stock of the general design circuit boards 40, and the lower limit of the stock of the general design circuit boards 40. The processor 36 calculates the number of the general design circuit boards 40 in stock by subtracting the order quantity of the liquid crystal panels 10 from the number of the produced general design circuit boards 40. If the number of the general design circuit boards 40 in stock has reached the upper limit of the stock of the general design circuit boards 40, the processor 36 executes a step for controlling the general design circuit board producing section 31 to halt the production of the general design circuit boards 40. If the number of the general design circuit boards 40 in stock has reached the lower limit of the stock of the general design circuit boards 40, the processor 36 executes a step for controlling general design circuit board producing section 31 to produce the general design circuit boards 40. This restricts the excessive number of the general design circuit boards 40 in stock. Furthermore, the general design circuit boards 40 are less likely to be short and thus this is preferable for reducing the period from the acceptance of the order for the liquid crystal panels 10 to the shipment.

The memory 34 stores the expected shipping date of the liquid crystal panels 10 in the order from the customer. The processor 36 calculates the start date of the frame processing from the expected shipping date and executes a step for controlling the frame processing section 32 to process the frames of the general design circuit boards 40 on the start date of the frame processing. The production of the liquid crystal panels 10 is more likely to be completed by the expected shipping date of the liquid crystal panels 10 in the order.

The general design circuit board producing section 31 includes at least the film forming unit and the general exposing unit. The film forming unit forms the films on the general design circuit boards 40. The general exposing unit exposes the general patterns on the films using general photo masks prepared based on the general design. The developing unit develops the exposed resist films. The etching unit etches the developed resist films. The frame processing section 32 includes the laser lithography unit for applying the laser beam to the films with the general patterns to scan along the specified outlines of the liquid crystal panels 10 in the order. The general patterns are exposed on the films formed on the general design circuit boards 40 by the film forming unit using the general photo masks by the general exposing unit. The films with the general patterns are processed to form the frames of the general design circuit boards 40 by applying the laser beam by the laser lithography unit to scan along the outlines of the liquid crystal panels 10 in the order. According to the configuration, high flexibility is achieved in design of the outlines of the liquid crystal panels 10.

The method of controlling the production of the liquid crystal panels 10 according to this embodiment is a production control method of producing the liquid crystal panels 10 including the outlines specified in the order from the customer. The method includes a general design circuit board producing step and a frame processing step. The general design circuit board producing step is for producing the general design circuit boards 40 in general design to include at least the estimated maximum outline of the liquid crystal panels 10 in the expected order. The frame processing step is for processing the frames of the general design circuit boards 40 for the quantity in the order based on the specified outline of the liquid crystal panels 10 and the quantity in the order from the customer.

In the general design circuit board producing step, the general design circuit boards 40 in general design to include at least the estimated maximum outline of the liquid crystal panels 10 in the expected order prior to the order from the customer. When the order from the customer is accepted, the number of the general design circuit boards 40 corresponding to the order quantity are taken out from the general design circuit boards 40 produced in advance and the frames of the general design circuit boards 40 are processed in the frame processing step. The liquid crystal panels 10 with the specified outlines in the order are produced. According to the method, the period from the acceptance of the order of the liquid crystal panels 10 and the shipment (the lead time) can be reduced. Furthermore, the frame of the general design circuit boards 40 are processed based on the specified outlines of the liquid crystal panels 10 in the order, the liquid crystal panels 10 with various types of outlines can be produced at low cost.

Second Embodiment

Figure 27:
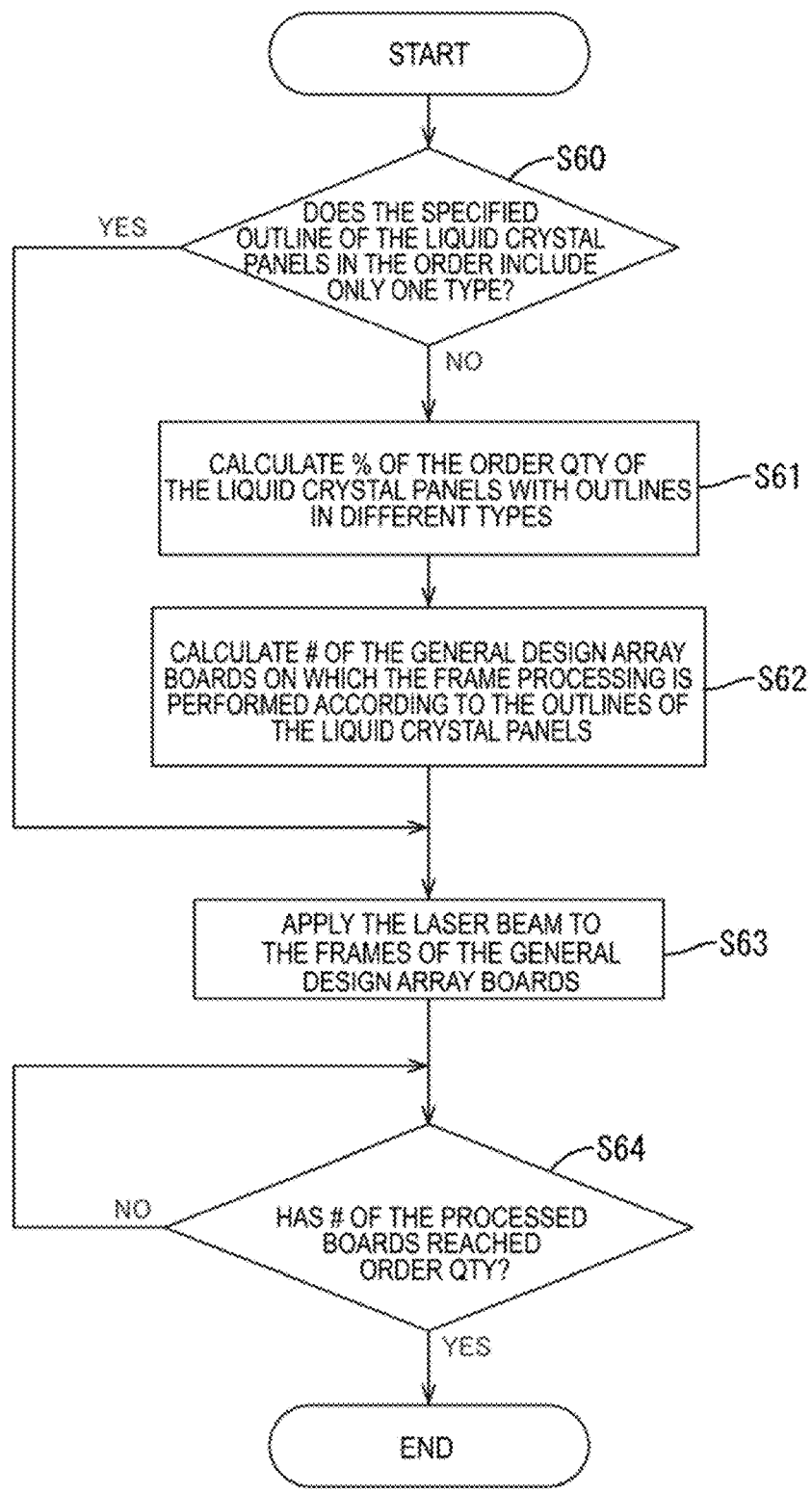
FIG. 27 is a flowchart illustrating a frame processing process included in a liquid crystal panel production control method according to a second embodiment of the present invention.

A second embodiment of the present invention will be described with reference to FIG. 27. In the second embodiment, the frame processing is performed only on the frame of the general design array boards. Configurations, functions, and effects similar to those of the first embodiment will not be described.

In this embodiment, in the frame processing process, the frames of the general design CF boards are not processed and only the frames of the general design array boards are processed. Specifically, as illustrated in FIG. 27, the processor executes the following steps in the frame processing process: a step for determining whether an outline of the liquid crystal panels in the order includes only one type (step S60); a step for calculating the percentages of the order quantities of the liquid crystal panels with outlines in different types if a result of the determination in step S60 is no (step S61); a step for calculating the number of the general design array boards on which the frame processing is performed according to the outlines of the liquid crystal panels on the general design array base board (step S62); a step for applying the laser beam to the frames of the general design array boards (step S63); and a step for determining whether the number of the processed boards has reached the quantity (step S64).

In the liquid crystal panels produced using the general design array boards on which the frame processing is performed, the gate lines, the source lines, and the gate drivers in the display area inside the winding section of the sealing member are isolated from the gate lines, the source lines, and the gate drivers in the area outside the winding section of the sealing member. Even if the gate lines, the source lines, and the gate drivers in the area outside the winding section of the sealing member are corroded, the corrosion is less likely to affect the gate lines, the source lines, and the gate drivers in the display area inside the winding section of the sealing member and thus the degradation is less likely to occur. Furthermore, the frame processing is not performed on the general design CF boards. The cost for the frame processing can be reduced and thus the production cost of the liquid crystal panels can be reduced.

As described above, in this embodiment, the processor executes the step for controlling the general design circuit board producing section to produce the general design array boards including at least the gate lines and the source lines and the general design CF boards including at least the color filters. Furthermore, the processor executes the step for controlling the frame processing section to selectively process the frames of the general design array boards. This embodiment includes the board bonding section for forming the sealing member between the frames of each general design array board and the corresponding general design CF board and bonding the general design array board and the corresponding general design CF board together. The processor executes the step for removing sections of the gate lines and the source lines overlapping at least the sealing member. Because the processor executes the step for controlling the frame processing section to remove the sections of the gate lines and the source lines of the general design array board overlapping at least the sealing member, the gate lines and the source lines of the general design array board inside the sealing member are less likely to be degraded due to corrosion. Furthermore, the processor controls the frame processing section to selectively process the frames of the general design array boards. The frames of the general design CF boards including at least the color filters are not processed. This is preferable for reducing the production cost.

Third Embodiment

A third embodiment will be described with reference to FIGS. 28 to 36. The third embodiment includes multiple types of general design base boards 240M that are different from the first embodiment. Configurations, functions, and effects similar to those of the first embodiment will not be described.

Figure 28:
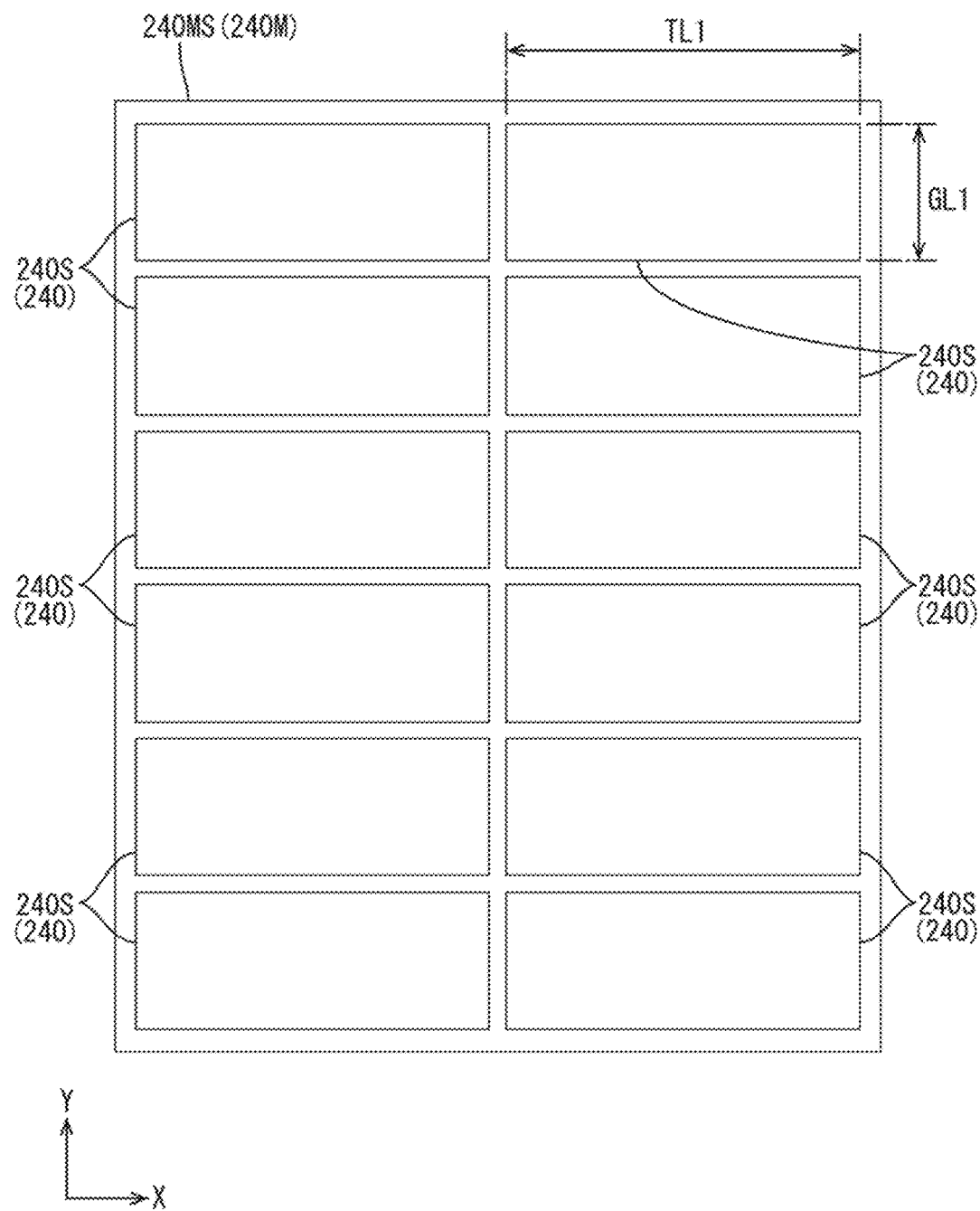
FIG. 28 is a plan view of a small general design circuit board base board according to a third embodiment of the present invention.
Figure 29:
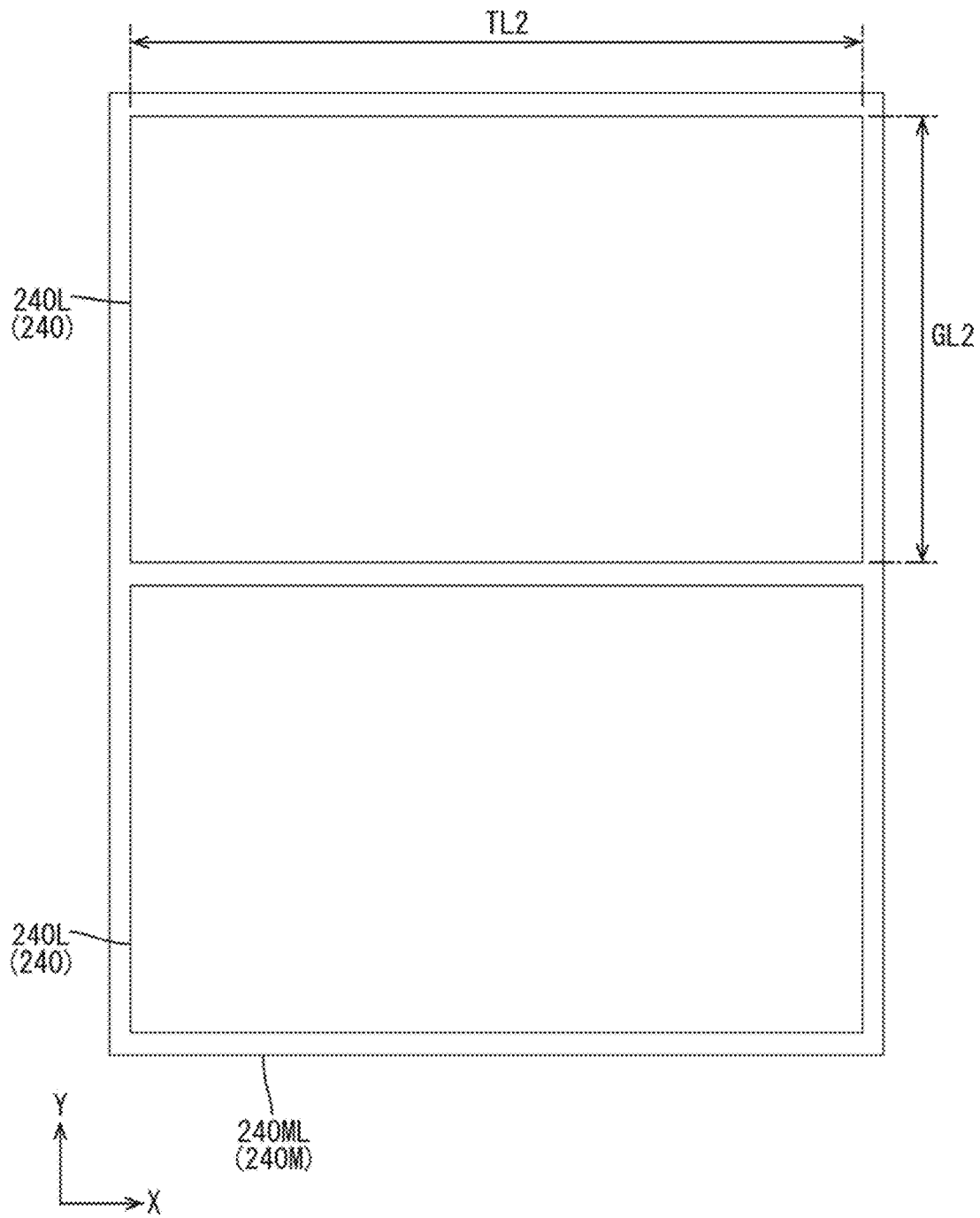
FIG. 29 is a plan view of a large general design circuit board base board.

In this embodiment, the different types of the general design base boards 240M are produced based on an assumption that an order of different types of liquid crystal panels 210 including terminals having different lengths (outer dimension in the Y-axis direction) an gate drivers having different lengths (outer dimension in the Y-axis direction) will be made. In the different types of the general design base boards 240M, at least either the lengths of the terminals of general design circuit boards 240 or the lengths of the gate drivers arranged on plate surfaces of the general design base boards 240M are different. Specifically, general design base boards 240M includes two types of boards that are small general design circuit board base boards 240MS and a large general design circuit board base board 240ML. As illustrated in FIG. 28, each small general design circuit board base board 240MS includes two in the X-axis direction and six in the Y-axis direction, that is, a total of twelve small general design circuit board base boards 240MS are arranged within the plate surface of the small general design circuit board base board 240MS. As illustrated in FIG. 29, each large general design circuit board base board 240ML includes two large general design circuit board base boards 240L arranged in the Y-axis direction. The length TL1 of the terminal of each small general design circuit board 240S (the outer dimension in the X-axis direction) is smaller than the length TL2 of the terminal of each large general design circuit board 240L. The length GL1 of the gate driver of each small general design circuit board 240S (the outer dimension in the Y-axis direction) is larger than the length GL2 of the gate driver of each large general design circuit board 240L. The outer dimensions of each small general design circuit board base board 240MS and the large general design circuit board base board 240ML are about equal to each other.

Figure 30:
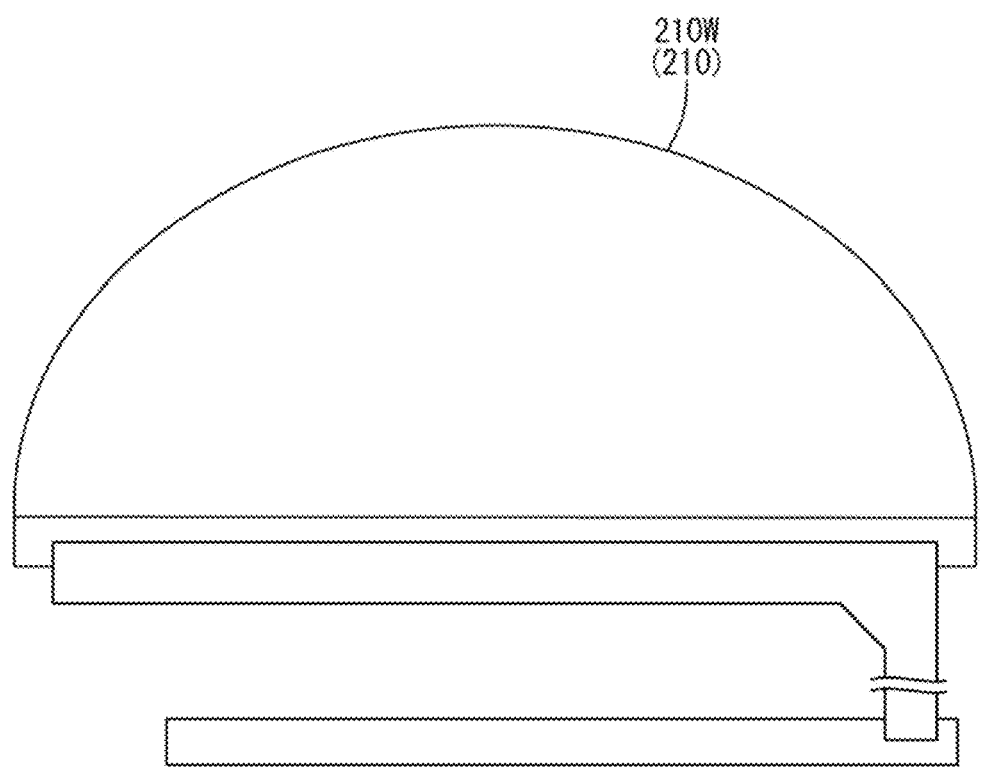
FIG. 30 is a plan view of a horizontally long liquid crystal panel.
Figure 31:
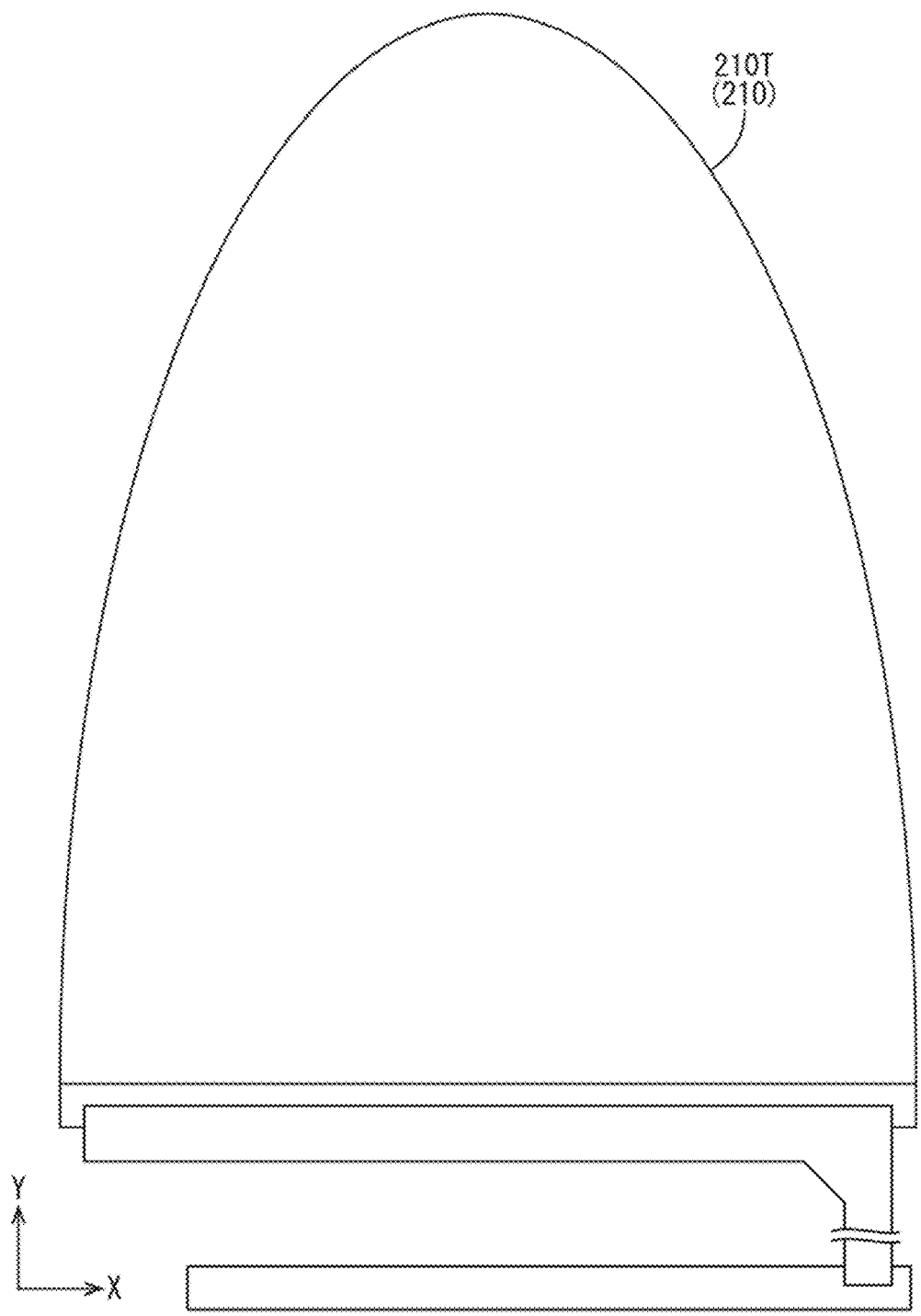
FIG. 31 is a plan view of a vertically long liquid crystal panel.
Figure 32:
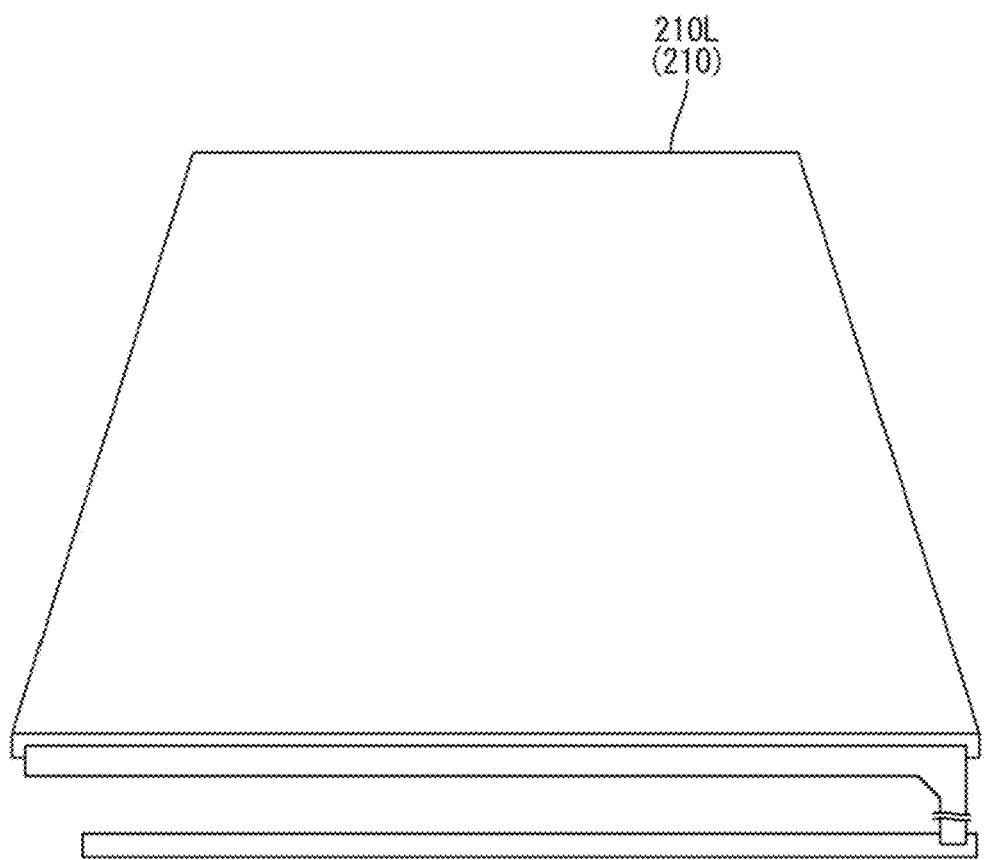
FIG. 32 is a plan view of a large liquid crystal panel.

As illustrated in FIGS. 30 to 32, the liquid crystal panels 210 according to this embodiment, which are expected to be ordered, include three types of panels that are wide liquid crystal panels 210W, tall liquid crystal panels 210T, and large liquid crystal panel 210L. As illustrated in FIG. 30, the length t11 of the terminal of each wide liquid crystal panel 210W is larger than the length t12 of the terminal of each tall liquid crystal panel 210T but smaller than the length t13 of the terminal of each large liquid crystal panel 210L. The length g11 of the gate driver of each wide liquid crystal panel 210W is smaller than the length g12 of the gate driver of each tall liquid crystal panel 210T and the length g13 of the gate driver of each large liquid crystal panel 210L (i.e., the smallest). The wide liquid crystal panel 210W illustrated in FIG. 30 includes an outline that includes a curved section in a form of a wide arc. As illustrated in FIG. 31, the length t12 of the terminal of each tall liquid crystal panel 210T is smaller than the length t11 of the terminal of each wide liquid crystal panel 210W and the length t13 of the terminal of each large liquid crystal panel 210L (the smallest). The length g12 of the gate driver of each tall liquid crystal panel 210T is larger than the length g11 of the gate driver of the wide liquid crystal panel 210W and about equal to the length g13 of the gate driver of the large liquid crystal panel 210L. The tall liquid crystal panel 210T illustrated in FIG. 31 includes an outline that includes a curved section in a form of a tall arc. As illustrated in FIG. 32, the length t13 of the terminal of the large liquid crystal panel 210L is larger than the length t11 of the terminal of the wide liquid crystal panel 210W and the length t12 of the terminal of the tall liquid crystal panel 210T (the largest). The length g13 of the gate driver of the large liquid crystal panel 210L is larger than the length g13 of the gate driver of the wide liquid crystal panel 210W and about equal to the length g12 of the gate driver of the tall liquid crystal panel 210T. The large liquid crystal panel 210L includes an outline having a trapezoid shape, that is, does not include a curved section.

Figure 33:
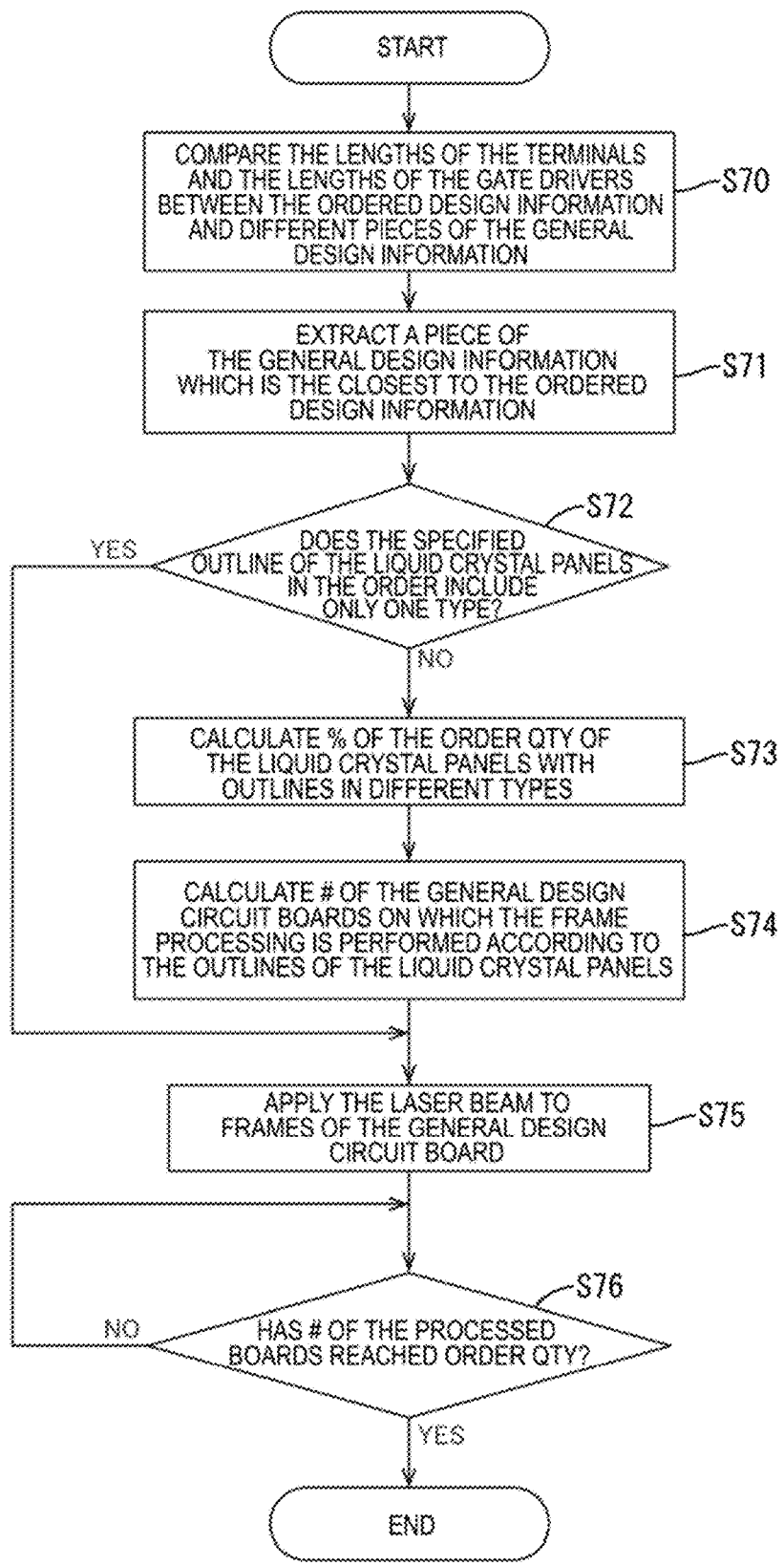
FIG. 33 is a flowchart illustrating a frame processing process included in a liquid crystal panel production control method.

Next, a frame processing process in the production control system for the liquid crystal panels 210 in this embodiment will be described in detail. As illustrated in FIG. 33, the frame processing process according to this embodiment includes the following steps: a step for comparing the lengths of the terminals and the lengths of the gate drivers between the ordered design information on the ordered liquid crystal panels 210 and different pieces of the general design information on the different types of the general design base boards 240M (step S70); a step for extracting a piece of the general design information which is the closest to the ordered design information (step S71); a step for determining whether the specified outline of the liquid crystal panels 210 in the order includes only one type (step S72); a step for calculating percentages of the order quantities of the liquid crystal panels 210 with outlines in different types if the result of step S72 is no (step S73); a step for calculating the number of the general design circuit boards 240 on which the frame processing along the specified outline of the liquid crystal panels 210 is performed (step S74); a step for applying the laser beam to frames of the general design circuit boards 240 (step S75); and a step for determining whether the number of the processed boards has reached the order quantity (step S76). Step S72 to step S76 are similar to step S40 to step S44 of the frame processing process in the first embodiment (see FIG. 19). Therefore, unnecessary details will be omitted.

Figure 34:
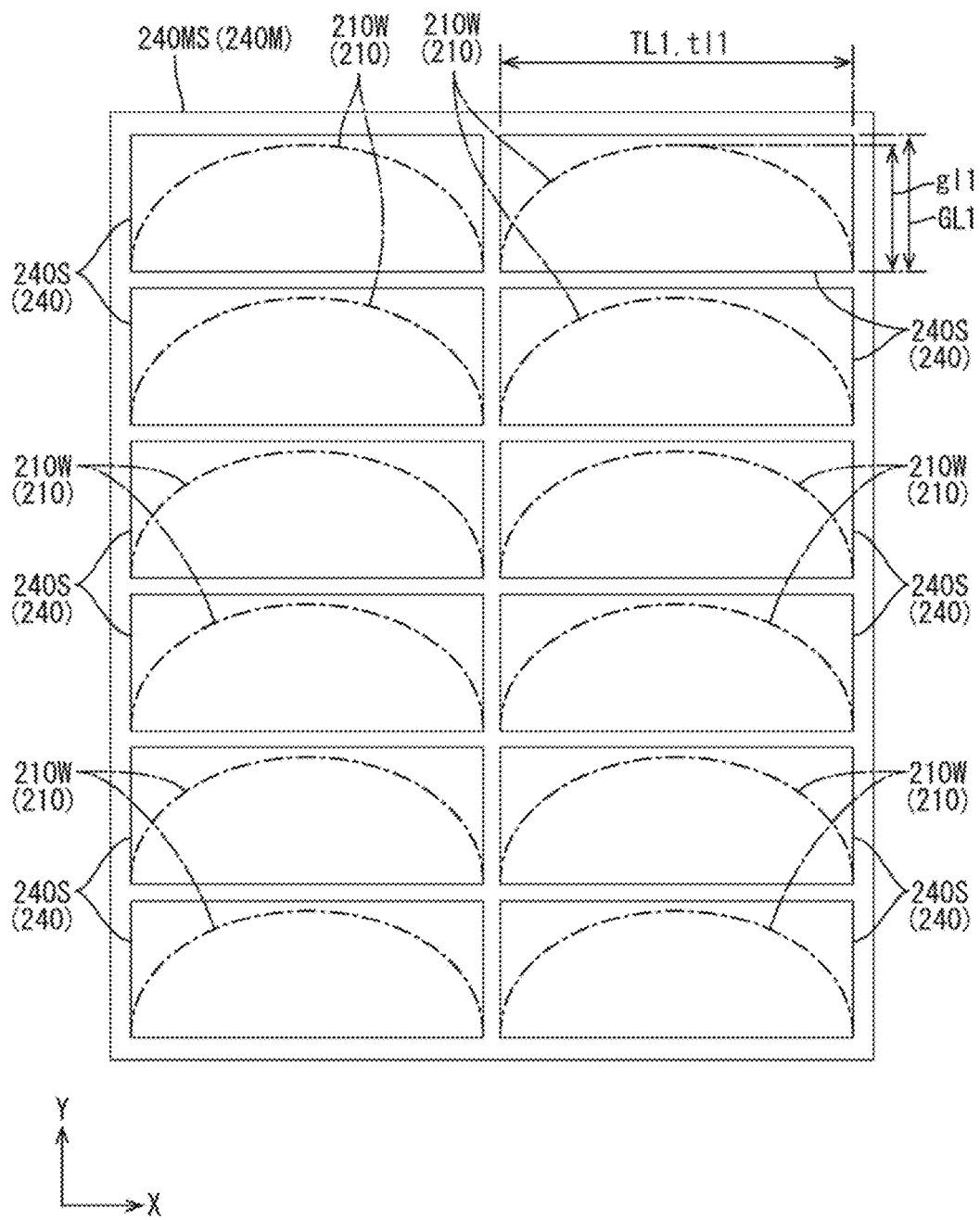
FIG. 34 is a plan view of a small general design circuit board base board used for producing horizontally long liquid crystal panels.

In this embodiment, two types of the general design base boards 240M are produced in advance as described above. Two kinds of general design information on two types of the general design base boards 240M are stored in the memory. In step S70, the processor compares the lengths of the terminals and the lengths of the gate drivers included in the two kinds of the general design information stored in the memory with the lengths of the terminals and the length of the gate drivers included in the ordered design information on the liquid crystal panels 210. In step S71, the processor extracts the piece of the general design information the closest to the ordered design information. Specifically, if the ordered liquid crystal panels 210 are the wide liquid crystal panels 210W illustrated in FIG. 30, the processor compares the length t11 of the terminal and the length g11 of the gate driver of the wide liquid crystal panels 210W with the length TL1 of the terminal and the length GL1 of the gate driver of the small general design circuit boards 240S of the smaller general design base board 240MS and with the length TL2 of the terminal and the length GL2 of the gate driver of the large general design circuit boards 240L of the large general design circuit board base board 240ML in step S70. As illustrated in FIG. 34, the length TL1 of the terminal of the small general design circuit boards 240S of the small general design circuit board base board 240MS are about equal to the length t11 of the terminals of the wide liquid crystal panels 210W. Furthermore, the length GL1 of the gate drivers of the small general design circuit boards 240S of the small general design circuit board base board 240MS is slightly larger than the length g11 of the gate drivers of the wide liquid crystal panels 210W. In step S71, the processor extracts a piece of general design information on the small general design circuit board base board 240MS as the information the closest to the ordered design information. Through the steps S72 to S76, the frames of the small general design circuit boards 240S arranged within the plate surface of the small general design circuit board base board 240MS are processed. In FIG. 34, the outlines of the ordered wide liquid crystal panels 210W are indicated with chain lines.

Figure 35:
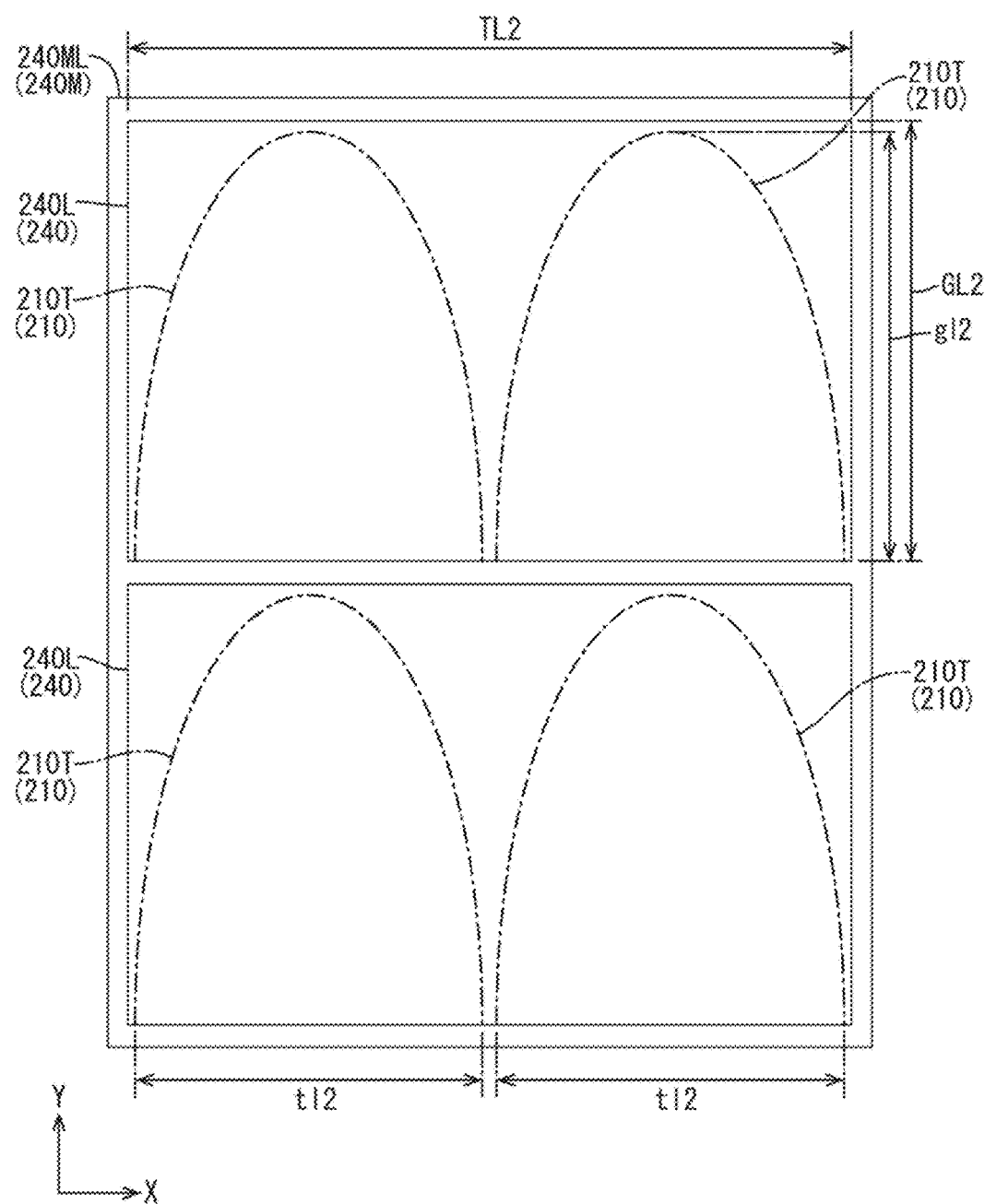
FIG. 35 is a plan view of a large general design circuit board base board used for producing vertically long liquid crystal panels.

If the ordered liquid crystal panels 210 are the tall liquid crystal panels 210T illustrated in FIG. 31, the processor compares the length t12 of the terminal and the length g12 of the gate driver of the tall liquid crystal panels 210T with the length TL1 of the terminal and the length GL1 of the gate driver of the small general design circuit boards 240S of the smaller general base board 240MS and with the length TL2 of the terminal and the length GL2 of the gate driver of the large general design circuit boards 240L of the large general design circuit board base board 240ML in step S70. As illustrated in FIG. 35, the length TL2 of the terminal of the large general design circuit boards 240L of the large general design circuit board base board 240ML are slightly larger than twice (the integral multiple of) the length t12 of the terminals of the tall liquid crystal panels 210T. Furthermore, the length GL2 of the gate drivers of the large general design circuit boards 240L of the large general design circuit board base board 240ML is slightly larger than the length g12 of the gate drivers of the tall liquid crystal panels 210T. In step S71, the processor extracts a piece of general design information on the large general design circuit board base board 240ML as the information the closest to the ordered design information. Namely, in step S70, the integral multiple of the length of the terminal of the tall liquid crystal panel 210T in the ordered design information is referred during checking of the ordered design information against two kinds of the general design information. In step S71, the piece of the general design information on the large general design circuit board base board 240ML, the information on which is the closest to the integral multiple is extracted. Through the steps S72 to S76, the frames of the large general design circuit boards 240L arranged within the plate surface of the large general design circuit board base board 240ML are processed. The frames of the large general design circuit boards 240L are processed such that two tall liquid crystal panels 210T are arranged in the X-axis direction that is an extending direction of the terminals. In FIG. 35, the outlines of the ordered tall liquid crystal panels 210T are indicated with chain lines.

Figure 36:
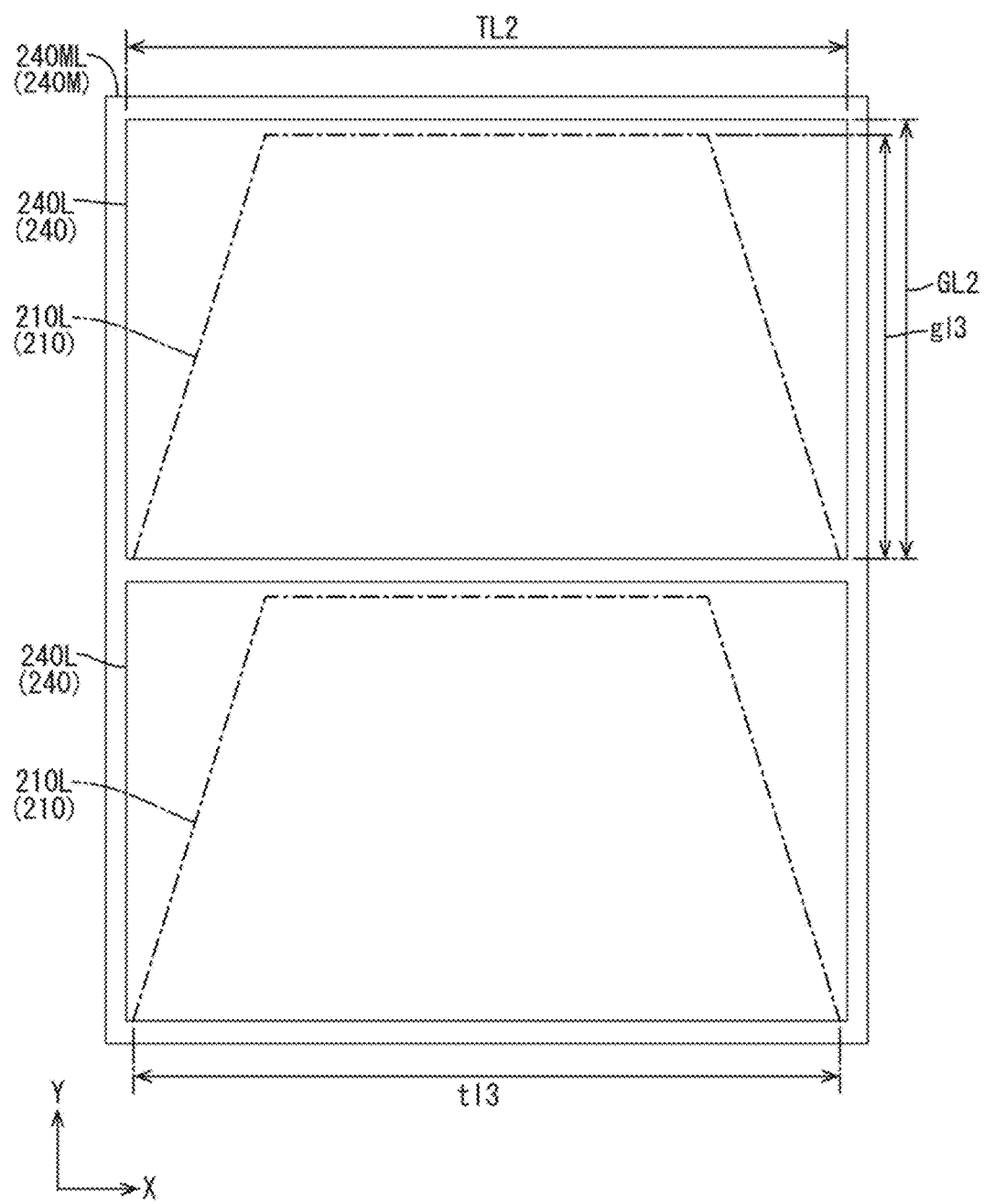
FIG. 36 is a plan view of a large general design circuit board base board used for producing large liquid crystal panels.

If the ordered liquid crystal panels 210 are the large liquid crystal panels 210L illustrated in FIG. 32, the processor compares the length t13 of the terminal and the length g13 of the gate driver of the large liquid crystal panels 210L with the length TL1 of the terminal and the length GL1 of the gate driver of the small general design circuit boards 240S of the smaller general base board 240MS and with the length TL2 of the terminal and the length GL2 of the gate driver of the large general design circuit boards 240L of the large general design circuit board base board 240ML in step S70. As illustrated in FIG. 36, the length TL2 of the terminal of the large general design circuit boards 240L of the large general design circuit board base board 240ML are slightly larger than the length t13 of the terminals of the large liquid crystal panels 210L. Furthermore, the length GL2 of the gate drivers of the large general design circuit boards 240L of the large general design circuit board base board 240ML is slightly larger than the length g13 of the gate drivers of the large liquid crystal panels 210L. In step S71, the processor extracts a piece of general design information on the large general design circuit board base board 240ML as the information the closest to the ordered design information. Through the steps S72 to S76, the frames of the small general design circuit boards 240S arranged within the plate surface of the large general design circuit board base board 240ML are processed. In FIG. 36, the outlines of the ordered wide liquid crystal panels 210L are indicated with chain lines.

In the frame processing process according to this embodiment, the best matched general design base board 240M is extracted from the two types of the general design base boards 240M that are produced in advance and the frames of the general design circuit boards 240 arranged thereon. The liquid crystal panels 210 are efficiently prepared from the general design base board 240M. This improves the yield.

As described above, according to this embodiment, the processor controls the general design circuit board producing section to produce multiple types of the general design circuit boards 240 including at least the display pixels for display images, the terminals for supplying the date signals to the display pixels, and the gate drivers for supplying the scan signals to the display pixels. The terminals are arranged on the first edge of each general design circuit board 240 in which the display pixels are not arranged to extend along the first edge. The gate drivers are arranged in the arrangement areas of the display pixels to extend in the direction that crosses the extending direction of the terminals. Either the lengths of the terminals or the lengths of the gate drivers of the general design circuit boards 240 are different. The lengths of the terminals and the lengths of the gate drivers of the multiple types of the general design circuit boards 240 are stored in the memory as the pieces of the general design information. The memory stores the lengths of the terminals and the lengths of the gate drivers of the multiple types of the general design circuit boards 240. Furthermore, the memory stores the lengths of the terminals and the lengths of the gate drivers of the liquid crystal panels 210 entered in the customer terminal as the ordered design information. The processor checks the ordered design information stored in the memory against the pieces of the general design information. The processor controls the frame processing section to process the frames of the general design circuit boards 240 that fits the piece of the general design information the closest to the ordered design information. By producing the multiple types of the general design circuit boards 240 including the terminals and the gate drivers with different lengths by the general design producing section, even if the ordered liquid crystal panels 210 include various types of outlines, the liquid crystal panels 210 can be easily produced. Furthermore, the processor checks the ordered design information stored in the memory against the pieces of the general design information and the controls the frame processing section to process the frames of the general design circuit boards 240 that matches the piece of the general design information the closest to the ordered design information. Therefore, high yield can be achieved.

Furthermore, when the ordered design information stored in the memory with the pieces of the general design information, the processor refers the integral multiple of the length of the terminals of the liquid crystal panels 210 in the ordered design information. The processor controls the frame processing section to process the frames of the general design circuit boards 240 that fit the piece of the general design information the closest to the integral multiple such that the liquid crystal panels 210 are arranged along the extending direction of the terminals. According to the configuration, the multiple types of the liquid crystal panels 210 can be produced from a single general design circuit board 240. Therefore, high yield can be achieved.

Fourth Embodiment

Figure 37:
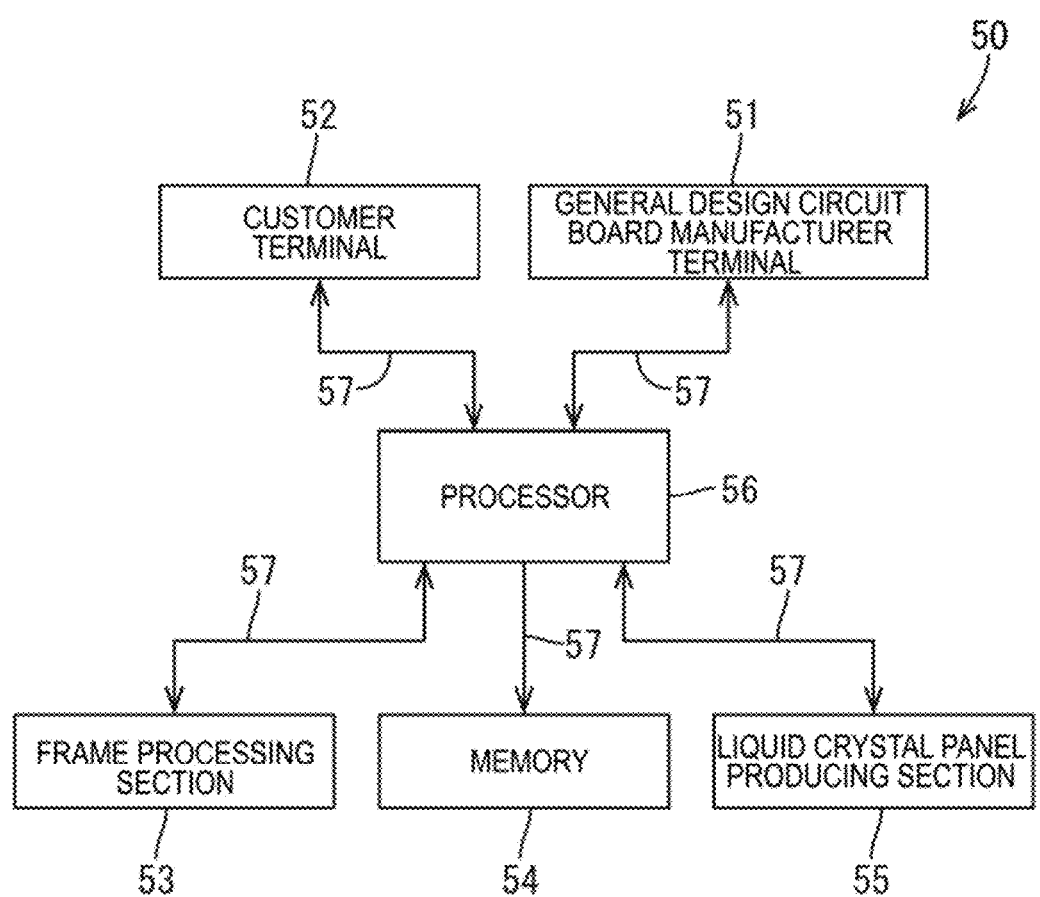
FIG. 37 is a block diagram illustrating a liquid crystal panel production control system according to a fourth embodiment of the present invention.
Figure 38:
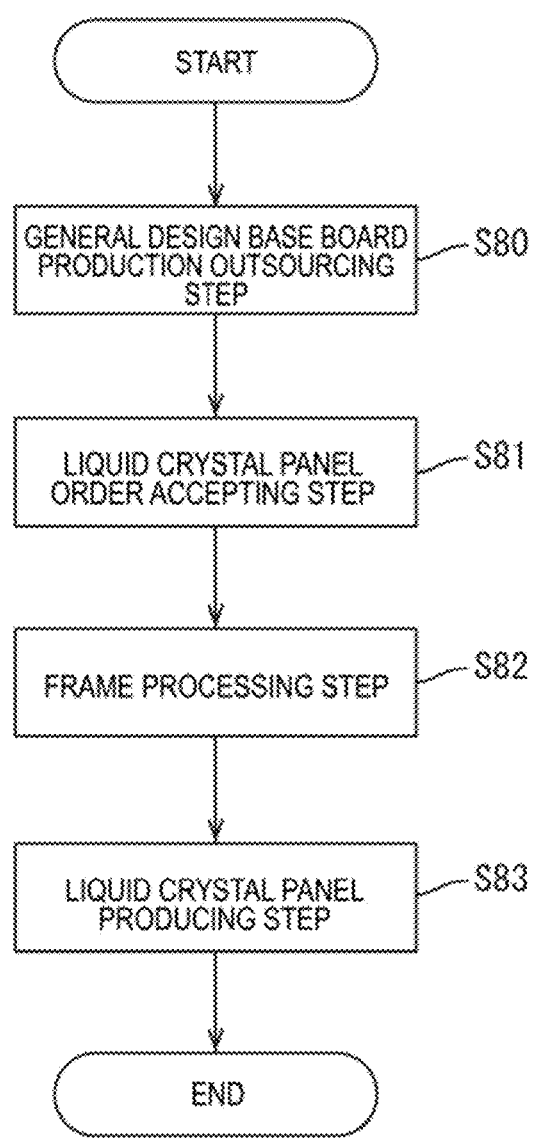
FIG. 38 is a flowchart illustrating a liquid crystal panel production control method.
Figure 39:
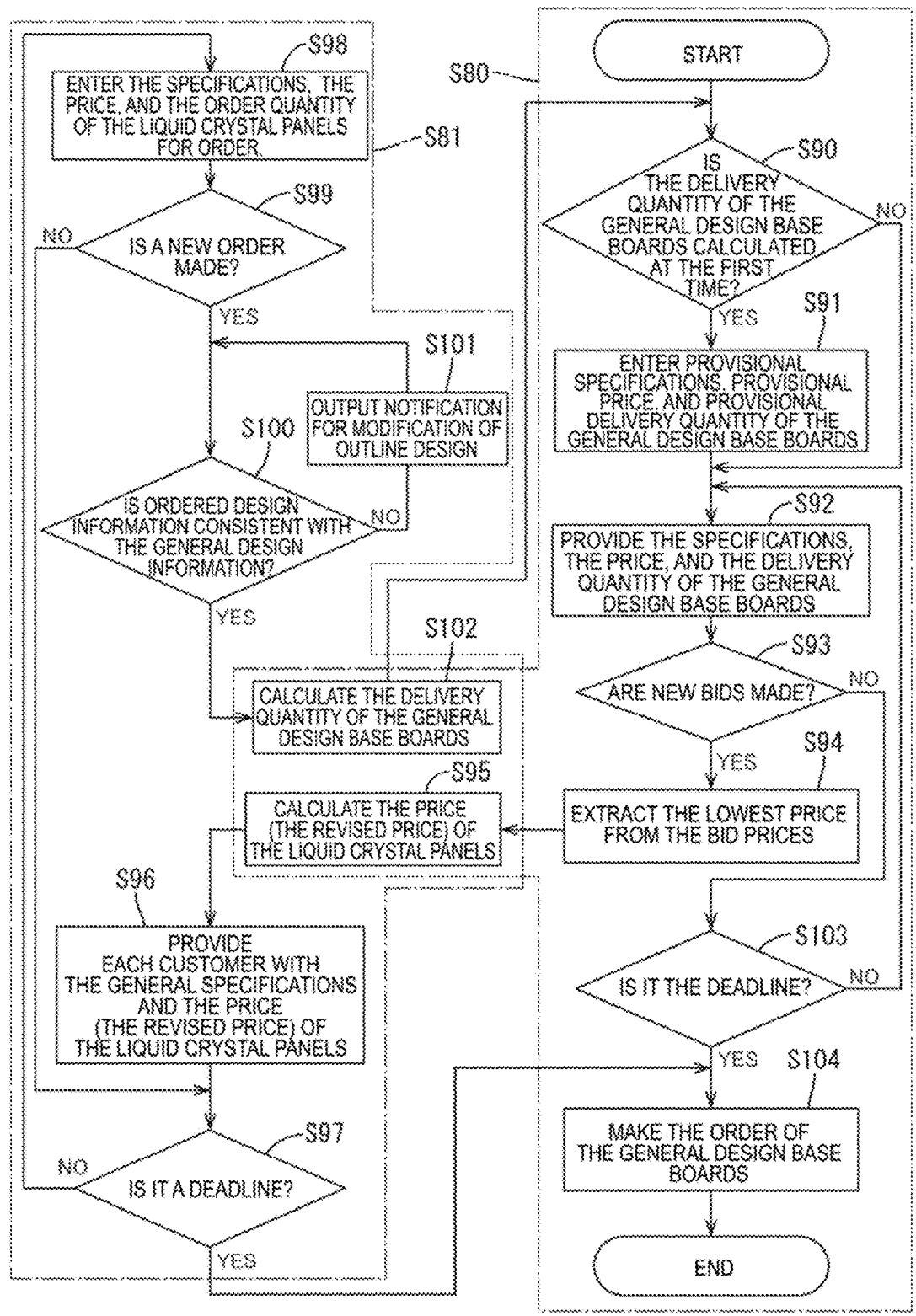
FIG. 39 is a flowchart illustrating a general design base board production outsourcing process and a liquid crystal panel order accepting process.

A fourth embodiment of the present invention will be described with reference to FIGS. 37 to 39. In the fourth embodiment, production of general design base boards is outsourced, which is different from the first embodiment. Configurations, functions, and effects similar to those of the third embodiment will not be described.

In this section, a liquid crystal panel manufacturer of the liquid crystal panels may outsource production of the general design base boards to the general design circuit board manufacturer and produce the liquid crystal panels with outlines specified in an order from the customer for order quantities in the order using the general design base boards delivered by the general design circuit board manufacturer. A liquid crystal panel production control system 50 is for such a case. As illustrated in FIG. 37, the liquid crystal panel production control system 50 according to this embodiment includes at least one general design circuit board manufacturer terminal 51, at least one customer terminal 52, a frame processing section 53, a memory 54 (a database), a liquid crystal panel producing section 55, a processor 56, and information and communication lines 57. A single or multiple general design circuit board manufacturers to which the production of the general design base boards are outsourced enter at least prices of the general design base boards in the general design circuit board manufacturer terminal(s) 51. A single or multiple customers enter at least the outlines of the liquid crystal panels and the order quantities in the customer terminal(s) 52. The frame processing section 53 is configured to process the frames of the general design circuit boards of the general design base boards based on the specified outlines of the liquid crystal panels in the order from the customer. The memory 54 stores at least information on the prices of the liquid crystal panel linked to the prices of the general design base boards and ordered design information on the specified outlines of the liquid crystal panel in the order from the customer and general design information on the general design circuit boards. The liquid crystal panel producing section 55 is configured to produce the liquid crystal panels using the general design base boards including the general design circuit boards on which the frame processing is performed by the frame processing section 53. The processor 56 is configured to control the frame processing section 53 and the liquid crystal panel producing section 55 to perform predefined processes. The information and communication lines 57 connect the general design circuit board manufacturer terminal 51, the customer terminal 52, the frame processing section 53, the memory 54, and the liquid crystal panel producing section 55 to the processor 56 for interactive information communication. The general design circuit board producing section for producing the general design base boards is in a production facility of the general design circuit board manufacturer to which the production of the general design base boards are outsourced. The customer terminal 52, the frame processing section 53, the liquid crystal panel producing section 55, and the information and communication lines 57 are similar to those of the first embodiment. Therefore, unnecessary details of those will be omitted.

The general design circuit board manufacturer terminal 51 includes a personal computer and a display of the personal computer at the site of the general design circuit board manufacturer. The general design circuit board manufacturer terminal 51 is connected to the processor 56 via the information and communication line 57. The general design circuit board manufacturer enters information on at least specifications, prices, and delivery quantities of the general design base boards (the general design circuit boards) to be produced by the general design circuit board manufacturer into the general design circuit board manufacturer terminal 51. The "specifications of general design base boards" entered in the general design circuit board manufacturer terminal 51 include outline sizes and the number of the general design circuit boards arranged within plate surfaces of the general design base boards. If the multiple numbers of general design circuit board manufacturers exist, the general design circuit board manufacturer terminal 51 is installed at the side of each general design circuit board manufacturer. This is the same for the customer terminal 52. The processor 56 connected to the general design circuit board manufacturer terminal 51 via the information and communication line 57 writes the information entered in the general design circuit board manufacturer terminal 51 into the memory 54, which will be described next. The memory 54 stores information on the prices of the liquid crystal panels linked to the prices of the general design base boards (the general design circuit boards) and information on the general design base boards (specifications, prices, delivery quantities, and so on) entered in the general design circuit board manufacturer terminal 51, which is different from the first embodiment. The prices of the liquid crystal panels linked to the prices of the general design base boards stored in the memory 54 are prices calculated by adding profits of the liquid crystal panel manufacturer to costs of the liquid crystal panels produced by the liquid crystal panel manufacturer using the general design base boards (individual production costs). Namely, the prices of the liquid crystal panels decrease as the quantities of the general design base boards, the production of which is outsourced, increase and the production costs decrease. The prices tend to decrease as the number of the general design circuit boards arranged within the plate surfaces of the general design base boards increases.

The processor 56 executes a first process, a second process, a third process, a force process, and a fifth process. The first process is for checking the price of the general design base board (the general design circuit board) entered in the general design circuit board manufacturer terminal 51 against the information on the prices of the liquid crystal panels stored in the memory 54, extracting the price of the liquid crystal panel linked to the prices of the general design base board, and outputting the price of the liquid crystal panel to the customer terminal 52. The second process is for calculating the delivery quantity of the general design base boards based on the outlines of the liquid crystal panels and the order quantity entered in the customer terminal 52 by the customer who has accepted the price of the liquid crystal panels entered in the customer terminal 52 and outputting the delivery quantity to the general design circuit board manufacturer terminal 51. The third process is for checking a revised price of the general design base boards entered in the general design circuit board manufacturer terminal 51 by the general design circuit board manufacturer based on the specification and the delivery quantity of the general design base boards output to the general design circuit board manufacturer terminal 51 against the information on the prices of the liquid crystal panels stored in the memory 54, extracting the price of the liquid crystal panels linked to the price of the general design base boards as the revised price, and outputting the price to the customer terminal 52. The fourth process is for calculating a revised delivery quantity of the general design base boards based on an additional outline and an additional order quantity of the liquid crystal panels if the revised price of the liquid crystal panels output to the customer terminal 52 is accepted by at least one of an original orderer who originally made the order in the second process and a new orderer who did not originally make the order in the second process included in the customer and the outline and the order quantity of the liquid crystal panels are entered in the customer terminal 52, calculating the revised delivery quantity of the general design base boards, and outputting the revised delivery quantity to the general design circuit board manufacturer terminal 51. The fifth process is for controlling the frame processing section 53 to process the frames of the general design base boards produced by the general design circuit board manufacturer based on the revised delivery quantity of the general design base boards output to the general design circuit board manufacturer terminal 51 based on the outline of the liquid crystal panels and the order quantity entered in the customer terminal 52.

As described above, the price of the general design base boards provided by the general design circuit board manufacturer and the price of the liquid crystal panels are revised when an additional order is made by the customer. Namely, an order of outsourcing for producing the general design circuit boards can be made to the general design circuit board manufacturer after compiling multiple orders from the customer. Economies of scale can be achieved, that is, the production cost of the general design base boards can be further reduced.

Next, a method of controlling the production of the liquid crystal panels using the liquid crystal panel production control system will be described. As illustrated in FIG. 38, the method of controlling the production of the liquid crystal panels according to this embodiment includes the following steps: a general design circuit board production outsourcing step for outsourcing the production of the general design base boards including the general design circuit boards within the plate surfaces thereof in general design to include the estimated maximum outline of the liquid crystal panels to be ordered (step S80); a liquid crystal panel order accepting step for accepting an order of the liquid crystal panels from the customer (step S81); a frame processing step for processing the frames of the general design circuit boards for the order quantity (step S82); and a liquid crystal panel producing step for producing the liquid crystal panels with the specified outlines in the order from the customer using the general design baseboards including the general design circuit boards on which the frame processing is performed (step S83). The frame processing step (step S82) and the liquid crystal panel producing step (step S83) are similar to those of the first embodiment and thus unnecessary details will be omitted.

Next, the general design circuit board production outsourcing step (step S80) and the liquid crystal panel order accepting step (S81) included in the method of controlling the production of the liquid crystal panels will be described in detail. In the general design circuit board production outsourcing step, as illustrated in FIG. 39, the processor 56 executes the following steps: a step for determining whether the delivery quantity of the general design base boards is calculated at the first time (step S90); a step for entering provisional specifications, provisional price, and provisional delivery quantity of the general design base boards provided by the liquid crystal panel manufacturer into the general design circuit board manufacturer terminal 51 (step S91); a step for providing the liquid crystal panel manufacturer with the specifications, the price, and the delivery quantity of the general design base boards entered in the general design circuit board manufacturer terminal 51 by the general design circuit board manufacturer (step S92); a step for determining whether new bids are made by general design circuit board manufacturers (step S93); a step for extracting the lowest price from the prices of the general deign base boards bidden by the general design circuit board manufacturer (step S94); a step for calculating the price or the revised price of the liquid crystal panels (step S95); a step for providing each customer with the general specifications and the price or the revised price of the liquid crystal panels (step S96); a step for determining whether it is a deadline (step S97); a step for providing the liquid crystal panel manufacturer with the specifications, the price, and the order quantity of the liquid crystal panels entered in the customer terminal 52 (step S98); a step for determining whether a new order is made by the customer (step S99); a step for determining whether ordered design information regarding the new order is consistent with the general design information if it is determined that the new order is made in step S99 (step S100); a step for outputting notification for modification of outline design of the liquid crystal panels if it is determined that the ordered design information is not consistent with the general design information in step S100 (step S101); a step for calculating the delivery quantity of the general design base boards if it is determined that the ordered design information is consistent with the general design information in step S100 (step S102); a step for determining whether it is the deadline if the result of step S93 is no (step S103); and a step for making the order of the general design base boards if it is determined that it is the deadline in step S103 (step S104). The general design circuit board production outsourcing process includes steps S90 to S94, S103, and S104. The liquid crystal panel order accepting process includes steps S96 to S100. Steps S95 and S102 are common steps included in the general design circuit board production outsourcing process and the liquid crystal panel order accepting process.

Specifically, if the processor 56 determines that the delivery quantity of the general design base boards is calculated at the first time in step S90, the process proceeds step S91 and the processor 56 executes instructions for inputting the provisional specification, price, and delivery quantity provided by the liquid crystal panel manufacturer into the general design circuit board manufacturer terminal 51. In step S91, default values regarding the specifications, the price, and the delivery quantity of the general design base boards provided by the liquid crystal panel manufacturer are input into the general design circuit board manufacturer terminal 51. When the specifications, the price, and the delivery quantity of the general design base boards are entered into the general design circuit board manufacturer terminal 51 by the general design circuit board manufacturer, the processor 56 executes instructions for providing the liquid crystal panel manufacturer with the specifications, the price, and the delivery quantity of the general design circuit boards entered in the general design circuit board manufacturer terminal 51 in step S92. If the processor 56 determines that the new bids are made by the general design circuit board manufacturers in step S93, the process proceeds to step S94 and the processor 56 executes instructions for extracting the lowest price from the prices of the general design base boards bidden by the general design circuit board manufacturer. In step S95, the processor 56 executes instructions for checking the price of the general design base board extracted in step S94 against the information on the liquid crystal panels stored in the memory 54 and calculating the price of the liquid crystal panels linked to the price of the general design base boards.

In step S96, the processor 56 executes instructions for providing general specifications and the price of the liquid crystal panels by outputting the general specifications of the liquid crystal panels and the price calculated in step S95 to the customer terminal 52 for each customer. If the processor 56 determines that it is not yet the deadline in step S97, the process proceeds to step S98. When the specification, the price, and the order quantity of the liquid crystal panels in the order are entered into the customer terminal 52 by the customer in step S98, the processor 56 executes instructions for providing the liquid crystal panel manufacturer with the specifications, the price, and the order quantity of the liquid crystal panels. If the processor 56 determines that no new order is made by the customer in step S99, the process returns to step S97. If the processor 56 determines that new order is made by the customer in step S99, the process proceeds to step S100. If the processor 56 determines that the ordered design information regarding the new order is not consistent with the general design information in step S100, the process proceeds to step S101 and the processor 56 outputs notification of modification of the outline design of the liquid crystal panels to the customer terminal 52. If the processor 56 determines that the ordered design information regarding the new order is consistent with the general design information, the process proceeds to step S102 and the processor 56 executes instructions for calculating the delivery quantity of the general design base boards required for producing the order quantity of the liquid crystal panels in the ordered design information stored in the memory 54.

After the delivery quantity of the general design base boards is calculated in step S102, the process proceeds to step S90. In step S90, the processor 56 determines that the calculation of the delivery quantity of the general design base boards is not the first time. Therefore, the process proceeds to step S92. When the specification, the price, and the delivery quantity of the general design base boards are entered into the general design circuit board manufacturer terminal 51 by the general design circuit board manufacturer, the processor 56 executes instructions for providing the liquid crystal panel manufacturer with the specifications, the price, and the delivery quantity of the general design base boards entered in the general design circuit board manufacturer terminal 51. If the processor determines that the new bids are made by the general design circuit board manufacturers in step S93, the process proceeds to step S94 and the processor 56 executes instructions for extracting the lowest price from the prices of the general design base boards bidden by the general design circuit board manufacturer as the revised price. In step S95, the processor 56 executes instructions for checking the revised price of the general design base boards extracted in step S94 against the information on the liquid crystal panels stored in the memory 54 and calculating the revised price of the liquid crystal panels linked to the revised price of the general design base boards.

In step S96, the processor 56 executes instructions for providing the customer with the general specification and the revised price of the liquid crystal panels by outputting the general specification and the revised price of the liquid crystal panels calculated in step S95 to the customer terminal 52. If the processor 56 determines that it is not yet the deadline in step S97, the process proceeds to step S98. When additional entries of the specification, the price, and the order quantity of the liquid crystal panels in the order into the customer terminal 52 are made by the customer in step S98, the processor 56 executes instructions for providing the liquid crystal panel manufacturer with the specifications, the price, and the order quantity of the liquid crystal panel in the additional entries and the process proceeds to step S99. The customer who made the additional entries includes the original orderer who made the order in step S98 performed previously or a new orderer who did not make the order in step S98 performed previously. The additional entries may be made by either one of them or both. In any cases, the additional entries will be accepted. Through steps S100 and S101, if the processor 56 determines that the ordered design information regarding the new entries is consistent with the general design information, the process proceeds to step S102 and the processor 56 executes instructions for calculating the delivery quantity of the general design base boards required for producing the order quantity of the liquid crystal panels in the ordered design information stored in the memory 54.

Because the order quantity of the liquid crystal panels stored in the memory 54 is a sum of the original order quantity and the additional order quantity, the delivery quantity of the general design base boards calculated by the processor 56 in step S102 is larger than the original quantity. The revised price of the general design base boards input into the general design circuit board manufacturer terminal 51 by the general design circuit board manufacturer in step S92 after the step S90 is based on the delivery quantity that is larger than the original quantity. Therefore, the price is expected to be lower than the original price. If the processor 56 determines that the new bids are made by the general design circuit board manufacturers in step S93, the process proceeds to step S94 again and the processor 56 extracts the lowest price from the prices of the general design base boards bidden by the general design circuit board manufacturers. The processor 56 calculates the revised price of the liquid crystal panels in step S95. Every time an additional order of the liquid crystal panels is made by the customer, a request for a new bid regarding the general design base boards is made to the general design circuit board manufacturers to reduce the price of the general design circuit boards. Because the price of the liquid crystal panels provided to the customer can be reduced along with the reduction of the price of the general design base boards, additional orders may be obtained from the customer (including the original orderer and new orderer). This may further reduce the production cost of the general design base boards and the liquid crystal panels.

Then, the process proceeds to step S96 and a request for a new order may be made to the customer (including the original orderer and new orderer) in the same procedures described above. If the processor 56 determines that it is the deadline in step S97, the process proceeds to step S104 and the processor 56 executes instructions for ordering the general design base boards to the general design circuit board manufacturer. If the processor 56 determines that no new bids are made in step S93, the process proceeds to step S103. If the processor 56 determines that it is not yet the deadline in step S103, the process returns to step S92 and make a request for new bids regarding the general design base boards to the general design circuit board manufacturers. If the processor 56 determines that it is the deadline in step S103, the process proceeds to step S104 and the processor 56 executes instructions for ordering the general design base boards to the general design circuit board manufacturer.

As described above, the liquid crystal panel production control system 50 according to this embodiment is for producing the liquid crystal panels with the specified outlines in the orders from a single or multiple customers by outsourcing the production of the general design circuit boards in the general design including at least the estimated maximum outlines of the liquid crystal panels (the display panels) in the expected orders to a single or multiple general design circuit board manufacturers and by processing the frames of the general design circuit boards. The liquid crystal panel production control system 50 includes the general design circuit board manufacturer terminal(s) 51, the customer terminal(s) 52, the frame processing section 53, the memory 54, the processor 56, and the information and communication lines 57. The prices of the general design circuit boards are entered into the general design circuit board manufacturer terminal(s) 51 by the general design circuit board manufacturer(s). The customer(s) enter the outlines and the order quantities of the liquid crystal panels into the customer terminal(s) 52. The frame processing section 53 is configured to process the frames of the general design circuit boards based on the specified outlines of the liquid crystal panels in the order(s) from the customer(s). The memory 54 stores the information on the prices of the liquid crystal panels linked to the prices of the general design circuit boards. The processor 56 is configured to execute the first process, the second process, the third process, the fourth process, and the fifth process. The first process is for checking the price of the general design circuit boards entered in the general design circuit board manufacturer terminal 51 against the information on the prices of the liquid crystal panels stored in the memory 54, extracting the price of the liquid crystal panels linked to the price of the general design circuit boards, and outputting the price of the liquid crystal panels to the customer terminal 52. The second process is for calculating the delivery quantity of the general design circuit boards based on the outline of the liquid crystal panels and the order quantity entered in the customer terminal 52 by the customer who has accepted the price of the liquid crystal panels output on the customer terminal 52 and outputting the delivery quantity to the general design circuit board manufacturer terminal 51. The third process is for checking a revised price of the general design circuit boards entered in the general design circuit board manufacturer terminal 51 by the general design circuit board manufacturer based on the specification and the delivery quantity of the general design circuit boards output to the general design circuit board manufacturer terminal 51 against the information on the prices of the liquid crystal panels stored in the memory 54, extracting the price of the liquid crystal panels linked to the price of the general design circuit boards as the revised price, and outputting the price to the customer terminal 52. The fourth process is for calculating a revised delivery quantity of the general design circuit boards based on the additional outline and the additional order quantity of the liquid crystal panels if the revised price of the liquid crystal panels output to the customer terminal 52 is accepted by at least one of the original orderer of the customer who originally made the order in the second process and the new orderer of the customer who did not originally make the order in the second process and the outline of the liquid crystal panels and the order quantity are entered in the customer terminal 52, calculating the revised delivery quantity of the general design base boards, and outputting the revised delivery quantity to the general design circuit board manufacturer terminal 51. The fifth process is for controlling the frame processing section 53 to process the frames of the general design circuit boards produced by the general design circuit board manufacturer based on the revised delivery quantity of the general design circuit boards output on the general design circuit board manufacturer terminal 51 based on the outline of the liquid crystal panels and the order quantity entered in the customer terminal 52. The information and communication lines 57 connect the general design circuit board manufacturer terminal 51, the customer terminal 52, the frame processing section 53, and the memory 54 to the processor 56 for interactive information communication.

When the general design circuit board manufacturer enters the price of the general design circuit boards into the general design circuit board manufacturer terminal 51, the processor 56 executes the first process for checking up the entered price of the general design circuit boards against the information on the prices of the liquid crystal panels stored in the memory 54, extracting the price of the liquid crystal panels linked to the price of the general design circuit boards, and outputting the price of the liquid crystal panels to the customer terminal 52 to prompt the customer to make an order of the liquid crystal panels. If the customer accepts the price of the liquid crystal panels output on the customer terminal 52 and enters the outline of the liquid crystal panel and the order quantity into the customer terminal 52, the processor 56 executes the second process for calculating the delivery quantity of the general design circuit boards based on the entered outline of the liquid crystal panels and the entered order quantity and outputting the delivery quantity to the general design circuit board manufacturer terminal 51. When the general design circuit board manufacturer enters the revised price of the general design circuit boards based on the delivery quantity of the general design circuit boards output to the general design circuit board manufacturer terminal 51 into the general design circuit board manufacturer terminal 51, the processor 56 executes the third process for checking the information on the prices of the liquid crystal panels stored in the memory 54, extracting the price of the liquid crystal panels linked to the price of the general design circuit boards as the revised prices of the liquid crystal panels, and outputting the revised price to the customer terminal 51 to prompt the customer to make an additional order of the liquid crystal panels. If the revised price of the liquid crystal panels output on the customer terminal 52 is accepted by at least one of the original orderer of the customer who made the order in the second process and the new orderer of the customer who did not make the order in the second process and makes additional entries of the outline of the liquid crystal panels and the order quantity into the customer terminal 52, the processor 56 executes the fourth process for calculating the revised delivery quantity of the general design circuit boards based on the entered outline of the liquid crystal panels and the entered order quantity and outputting the revised delivery quantity to the general design circuit board manufacturer terminal 51 to outsource the production of the general design circuit boards. When the general design circuit boards produced by the general design circuit board manufacturer based on the revised delivery quantity of the general design circuit boards output on the general design circuit board manufacturer terminal 51 are delivered, the processor 56 executes the fifth process for controlling the frame processing section 53 to process the frames of the general design circuit boards based on the outlines of the liquid crystal panels and the order quantities input in the customer terminal 52.

The frames of the general design circuit boards are processed based on the specified outlines of the liquid crystal panels in the order. Therefore, the liquid crystal panels with outlines in various types can be produced at low cost. Furthermore, the price of the general design circuit boards and the price of the liquid crystal panels provided based on the order from the customer are revised every time the additional order is made by the customer. Namely, the production of the general design circuit boards can be outsourced to the general design circuit board manufacturer after the orders from the customer are combined. Economies of scale can be achieved, that is, the production cost of the general design circuit boards can be further reduced.

The general design circuit board manufacturer terminals 51 are installed at the general design circuit board manufacturer sites, respectively. The processor 56 executes the first process and the third process for comparing the prices of the general design circuit boards entered in the respective general design circuit board manufacturer terminals 51 with each other, extracting the lowest price, checking the lowest price against the information on the prices of the liquid crystal panels stored in the memory 54, extracting the price of the liquid crystal panels linked to the lowest price, and outputting the price of the liquid crystal panels to the customer terminal 52. The price of the liquid crystal panels extracted based on the lowest price of the general design circuit boards among the prices provided by the general design circuit board manufacturers through bidding is provided to the customer. This is advantageous in competition against other companies.

When the production of the general design base boards including the plate surfaces within which the general design circuit boards are arranged is outsourced to the general design circuit board manufacturer, the number of the general design circuit boards arranged within the plate surface of each general design base board is stored in the memory 54. The processor 56 executes the second process and the fourth process for calculating the delivery quantity of the general design base boards by dividing the order quantity of the liquid crystal panel entered in the customer terminal 52 together with the outline of the liquid crystal panels by the customer by the number of the general design circuit boards on the general design base board stored in the memory 54 and outputting the delivery quantity to the general design circuit board manufacturer terminal 51. The delivery quantity of the general design base board including the plate surfaces within which the general design circuit boards are arranged is calculated based on the order quantity of the liquid crystal panels in the order from the customer and the production of the general design base boards is outsourced. Therefore, the production cost of the liquid crystal panels can be further reduced.

The method of controlling the production of the liquid crystal panels according to this embodiment is the method of controlling the production for outsourcing the production of the general design circuit boards in general design including at least the estimated maximum outline of the liquid crystal panels in the expected order to a single or multiple general design circuit board manufacturers and processing the frames of the general design circuit boards produced by outsourcing to produce the liquid crystal panels with the outlines specified in the orders from the single or the multiple customers. The method includes the first step, the second step, the third step, the fourth step, and the fifth step. The first step is for providing the customer(s) with the price(s) of the liquid crystal panels calculated based on the price(s) of the general design circuit boards provided by the general design circuit board manufacturer(s). The second step is for providing the general design circuit board manufacturer(s) with the delivery quantity (quantities) of the general design circuit boards calculated based on the specified outline(s) of the liquid crystal panels and the order quantity (quantities) in the order(s) from the customer(s) who accepted the provided price(s) of the liquid crystal panels. The third step is for providing the customer(s) with the price(s) of the liquid crystal panels calculated based on the revised price(s) of the general design circuit boards provided by the general design circuit board manufacturer(s) based on the provided delivery quantity (quantities) of the general design circuit boards as the revised price(s). The fourth step is for providing the general design circuit board manufacturer(s) with the revised delivery quantity (quantities) of the general design circuit boards based on the specified outline(s) of the liquid crystal panels and the order quantity (quantities) in the additional order(s) when either the original orderer(s) of the customer(s) who made the order(s) in the second step or new orderer(s) of the customer(s) who did not make the order(s) in the second step accept the provided revised price(s) of the liquid crystal panels and make the additional order(s) of the liquid crystal panels. The fifth step is for controlling the frame processing section 53 to process the frames of the general design circuit boards produced by the general design circuit board manufacturer(s) based on the provided revised quantity (quantities) of the general design circuit boards based on the specified outlines of the liquid crystal panels and the order quantities in the order(s) from the customer(s).

When the general design circuit board manufacturer(s) provide the price(s) of the general design circuit boards, the price(s) of the liquid crystal panels are calculated based on the entered price(s) of the general design circuit boards and provided to the customer(s) for prompting the customer(s) to make the order(s) of the liquid crystal panels in the first step. In the second step, when the provided price(s) of the liquid crystal panels are accepted and the order(s) are made by the customer(s), the delivery quantity (quantities) of the general design circuit boards are calculated based on the specified outline(s) of the liquid crystal panels and the order quantity (quantities) in the order(s) and the delivery quantity (quantities) of the general design circuit boards are proved to the general design circuit board manufacturer(s). In the third step, when the general design circuit board manufacturer(s) provide the revised price(s) of the general design circuit boards based on the provided delivery quantity (quantities) of the general design circuit boards provided to the general design circuit board manufacturer(s), the revised price(s) of the liquid crystal panels are calculated based on the revised price(s) and the revised price(s) of the liquid crystal panels are provided to the customer(s) to prompt the customer(s) to make the additions order(s) of the liquid crystal panels. In the fourth step, when either the original orderer(s) of the customer(s) who made the order(s) in the second step or new orderer(s) of the customer(s) who did not make the order(s) in the second step accept the provided revised price(s) of the liquid crystal panels and make the additional order(s) of the liquid crystal panels, the revised delivery quantity (quantities) of the general design circuit boards are calculated based on the specified outline(s) of the liquid crystal panels and the order quantity (quantities) in the additional order(s) and the revised delivery quantity (quantities) of the general design circuit boards are provided to the general design circuit board manufacturer(s). In the fifth step, the when general design circuit boards are produced by the general board manufacturer(s) based on the revised delivery quantity (quantities) of the general design circuit boards provided to the general design circuit board manufacturer(s), the frame processing section 53 processes the frames of the produced general design circuit boards based on the specified outline(s) of the liquid crystal panels and the order quantity (quantities) in the order(s) from the customer(s).

The frames of the general design circuit boards are processed based on the specified outline(s) of the liquid crystal panels in the order(s). Therefore, the liquid crystal panels with outlines in various types can be produced at low cost. Furthermore, the price(s) of the general design circuit boards and the prices of the liquid crystal panels provided based on the order(s) of the customer(s) are revised every time the customer(s) make additional order(s). Namely, the production of the general design circuit boards can be outsourced to the general design circuit board manufacturer(s) after the orders from the customer(s) are combined. Economies of scale can be achieved, that is, the production cost of the general design circuit boards can be further reduced.

Other Embodiments

The present invention is not limited to the embodiments described in the above sections and the drawings. For example, the following embodiments may be included in technical scopes of the technology.

(1) In the first and the third embodiment sections, the order including the liquid crystal panels with one type of outlines and the order including the liquid crystal panels with three types of outlines are described. However, the present invention can be applied to an order including liquid crystal panels with two types of outlines and an order including liquid crystal panels with four or more types of outlines.

(2) In the third embodiment, the order includes three types of liquid crystal panels in different sizes (the lengths of the terminals and the lengths of the gate drivers). However, the present invention can be applied to an order including two types or four or more types of liquid crystal panels in different sizes.

(3) The outlines and the sizes of the liquid crystal panels ordered by the customer(s) in the drawings in the above embodiments can be altered as appropriate.

(4) The number, the sizes, and the arrangement of the general design circuit boards arranged within the plate surface of each general design base board in the drawings in the above embodiments can be altered as appropriate.

(5) In the first and the second embodiment section, the production of the liquid crystal panels with the outlines including the winding section are described. However, liquid crystal panels with outlines that do not include winding section may be produced using the production control systems and the methods of controlling the production described in the first and the second embodiment sections. The liquid crystal panels with the outlines that do not include the winding section may have polygonal shaped including trapezoid shapes and triangular shapes in a plan view.

(6) In the third embodiment section, the production of the horizontally long liquid crystal panel and the vertically long liquid crystal panel with the outlines including the winding sections is described. However, horizontally long liquid crystal panels and vertically long liquid crystal panels with outlines that do not include winding section may be produced using the production control system and the method of controlling the production described in the third embodiment section.

(7) In the third embodiment section, the production of the large liquid crystal panels with the outlines that do not include winding sections is described. However, large liquid crystal panels with outlines including winding sections may be produced using the production control system and the method of controlling the production described in the third embodiment section.

(8) In the third embodiment section, two types of the general design base boards including the plate surfaces within which the general design circuit boards, the numbers and the sizes of which are different between the general design base boards. However, the three types of general design base boards may be produced.

(9) In the third embodiment section, the production of three types of the liquid crystal panels with the outlines in different types is described. However, two types of liquid crystal panels or four or more types of liquid crystal panels may be produced.

(10) In the fourth embodiment section, the provisional specifications, entries of the provisional prices, and the provisional delivery quantities of the general design base boards into the general design circuit board manufacturer terminal by the liquid crystal panel manufacturer are described. However, such entries may be omitted. In such a case, steps S90 and S91 in the flow of the production outsourcing control for the general design base boards are omitted. Namely, the flowchart of the method of controlling the production of the liquid crystal panels starts with step S98.

(11) In each of the above embodiments, the semiconductor films forming the channels of the TFTs are made of oxide semiconductor material. Continuous grain silicon that is a kind of polysilicon (polycrystal silicon) or amorphous silicon may be used as a material for the semiconductor film.

(12) In each of the above embodiment sections, the liquid crystal panels including the pixel electrodes and the common electrodes disposed to on top of each other on the array boards with the insulating films therebetween (the liquid crystal panels in FFS mode) are described. However, the present invention can be applied to production of liquid crystal panels including pixel electrodes disposed on array boards, common electrodes on CF boards, and liquid crystal layers between the pixel electrodes and the common electrodes that are on top of each other (the liquid crystal panels in VA mode). Furthermore, the present invention can be applied to production of liquid crystal panels in IPS mode or in TN mode.

(13) In each of the above embodiments, the color filters of the liquid crystal panels have the three-color configuration including red, green, and blue. However, the present invention can be applied to production of liquid crystal panels including color filters having a four-color configuration including yellow color portions in addition to the red, the green, and the blue color portions

(14) In each of the above embodiment sections, the production of the liquid crystal panels in the small size or the small-to-medium size category. However, the present invention may be applied to production of liquid crystal panels in the medium size or the large size (or the extra-large size) category, for example, with a screen size of 20 to 90 inches. Such liquid crystal panels may be used in electronic devices including television devices, digital signage devices, and electronic blackboards.

(15) In each of the above embodiment sections, the production of the liquid crystal panels having the configuration including the liquid crystal layer sandwiched between the boards is described. However, the present invention can be applied to production of display panels including functional organic molecules other than the liquid crystal material sandwiched between boards.

(16) In each of the above embodiments, the TFTs are used as the switching components of the liquid crystal panels. However, the present invention can be applied to production of liquid crystal panels using switching components other that TFTs (e.g., thin film diodes (TFDs)). The present invention can be applied to production of black-and-white liquid crystal panels other than the production of the color liquid crystal panels.

(17) In each of the above embodiment sections, the production of the liquid crystal panels to be used as display panels is described. However, the present invention can be applied to production of other types of display panels (e.g., plasma display panels (PDP), organic EL panels, electrophoretic display (EPD) panels, and micro electro mechanical systems (MEMS) display panels).

EXPLANATION OF SYMBOLS

10: Liquid crystal panel (Display panel)
10f: Sealing member
10i: Gate line (Line)
10j: Source line (Line)
14: Terminal
30: Production control system
31: General design circuit board producing section
32: Frame processing section
33: Customer terminal
34: Storage
35: Liquid crystal panel producing section (Bonding section)
36: Processor
37: Information and communication line
40, 240: General design circuit board
40AR: General design array board (General design component board)
40CF: General design CF board (General design counter board)
40M, 240M: General design base board
50: Production control system
51: General design circuit board manufacturer terminal
52: Customer terminal
53: Frame processing section
54: Storage
55: Liquid crystal panel producing section (Bonding section)
56: Processor
57: Information and communication line
AA: Display area (Arrangement area)
GDM: Gate driver (Scan driver)

The invention claimed is:

1. A production control system for producing display panels with at least one type of outlines specified in an order from a customer, the production control system comprising:
   a general design circuit board producing section configured to produce general design circuit boards in general design including at least an estimated maximum outline of the display panels in an expected order;
   a frame processing section configured to process frames of the general design circuit boards based on the specified outline of the display panels in the order from the customer;
   a customer terminal configured to receive the specified outline of the display panels and an order quantity entered by the customer;
   a processor configured to control the general design circuit board producing section to produce the general design circuit boards and the frame processing section to process frames of the general design circuit boards for the order quantity based on the specified outline of the display panels and the order quantity entered in the customer terminal; and
   information and communication lines connecting the general design circuit board producing section, the frame processing section, and the customer terminal to the processor for interactive information communication.

2. The production control system according to claim 1, further comprising a memory configured to store ordered design information on the specified outline of the display panel in the order from the customer and general design information on the general design circuit boards, wherein
   the processor executes a process for checking the ordered design information against the general design information and for outputting notification for modification of outline design of the display panels to the customer terminal if the ordered design information is incompatible with the general design information.

3. The production control system according to claim 1, wherein
   the processor executes a process for controlling the general design circuit board producing section to produce general design component boards including at least lines and general design counter boards including color filters as the general design circuit boards and a process for controlling the frame processing section to process frames of the general design component boards and the general design counter boards,
   the production control system further comprises a board bonding section configured to bond the general design component boards and the respective design counter boards together with sealing members between frames of the general design component boards and the general design counter boards, and
   the processor executes a process for controlling the frame processing section to partially remove at least sections of the lines and the color filters overlapping the sealing members.

4. The production control system according to claim 1, wherein
   the processor executes a process for controlling the general design circuit board producing section to produce general design component boards including at least lines and general design counter boards including at least color filters as the general design circuit boards and a process for controlling the frame processing section to selectively process frames of the general design component boards,
   the production control system further comprises a board bonding section configured to bond the general design component boards and the respective design counter boards together with sealing members between frames of the general design component boards and the general design counter boards, and
   the processor executes a process for partially removing at least sections of the lines overlapping the sealing members.

5. The production control system according to claim 1, wherein
   the processor executes a process for controlling the general design circuit board producing section to produce general design base boards including plate surfaces within which a plurality of the general design circuit boards are arranged,
   the production control system further comprises a memory configured to store a number of the general design circuit boards arranged within the plate surfaces of the respective general design base boards and order quantities of different types of the display panels if outlines and the order quantities regarding the different types of the display panels with outlines in different types are entered into the customer terminal, and the processor executes a process for calculating percentages of the order quantities of the different types of the display panels based on the order quantities of the different types of the display panels stored in the memory and controlling the frame processing section to process the frames of the general design circuit boards within the plate surfaces of the general design base boards with the calculated percentages of the order quantities reflected.

6. The production control system according to claim 1, further comprising a memory configured to store a production quantity of the general design circuit boards produced by the general design circuit board producing section, the order quantity of display panels entered in the customer terminal, an upper limit of stock of the general design circuit boards, and a lower limit of the stock of the general design circuit boards, wherein the processor calculates the stock of the general design circuit boards by subtracting the order quantity of the display panels from the production quantity of the general design circuit boards, the processor executes a process for controlling the general design circuit board producing section to halt production of the general design circuit boards if the stock of the general design circuit boards has reached the upper limit of the stock of the general design circuit boards, and the processor executes a process for controlling the general design circuit board producing section to start the production of the general design circuit boards if the stock of the general design circuit boards has reached the lower limit of the stock of the general design circuit boards.

7. The production control system according to claim 1, further comprising a memory configured to store an expected shipping date of the display panels in the order from the customer, wherein the processor calculates a start date of frame processing from the expected shipping date, the processor executes a process for controlling the frame processing section to process the frames of the general design circuit boards.

8. The production control system according to claim 1, wherein the general design circuit board producing section comprises at least:
a film forming device configured to form films on the general design circuit boards; and
a general exposure device configured to expose general patterns on the films using a general photomask based on the general design, wherein the frame processing section comprises at least a laser lithography device configured to apply a laser beam to the films on which the general patterns are formed through patterning to scan along the specified outlines of the display panels in the order.

9. The production control system according to claim 1, wherein the processor executes a process for controlling the general design circuit board producing section to produce a plurality of types of the general design circuit boards including at least:
display pixels for displaying images;
terminals disposed at first ends of the general design circuit boards at which the display pixel are not disposed to extend along the first ends for supplying data signals to the display pixels; and
scan drivers disposed within areas in which the display pixels are disposed to extend in a direction that crosses an extending direction of the terminals for supplying scan signals to the display pixels, at least lengths of the terminals or at least lengths of the scan drivers are different from each other, the production control system further comprises a memory configured to store the lengths of the terminals and the lengths of the scan drivers of the plurality of the general design circuit boards and the lengths of the terminals and the lengths of the scan drivers of the display panels entered in the customer terminal as ordered design information, and the processor executes a process for checking the ordered design information stored in the memory against pieces of the general design information and controlling the frame processing section to process the frames of the general design circuit boards that match the piece of the general design information the closest to the ordered design information.

10. The production control system according to claim 9, wherein the processor executes a process for checking integral multiples of the lengths of the terminals in the display panels included in the ordered design information when checking the ordered design information stored in the memory against the pieces of the general design information and for controlling the frame processing section to process the frames of the general design circuit boards that match the piece of the general design information the closest to the integral multiples so that the display panels are arranged in the extending direction of the terminals.

11. A production control system for outsourcing production of general design circuit boards in general design including at least one estimated maximum outline of display panels in an expected order from a customer to a single or a plurality of general design circuit board manufacturers and for producing display panels with an outline specified in an order from a single customer or with outlines specified in orders from a plurality of customers by processing frames of the general design circuit boards, the production control system comprising:

at least one general design circuit board manufacturer terminal into which prices of the general design circuit boards are entered by the at least one general design circuit board manufacturer;

at least one customer terminal configured to receive the outline of the display panels and an order quantity entered by the customer;

a frame processing section configured to process frames of the general design circuit boards based on the specified outline of the display panels in the order from the customer;

a memory configured to store information on prices of the display panels linked to the prices of the general design circuit boards;

a processor configured to execute:
a first process for checking the price of the general design circuit boards entered in the at least one general design circuit board manufacturer terminal by the general design circuit board manufacturer against information on the prices of the display panels stored in the memory, for extracting the price of the display panels linked to the price of the general design circuit boards, and for outputting the price of the display panels to the at least one customer terminal;

a second process for calculating a delivery quantity of the general design circuit boards based on the outline of the display panels and the order quantity entered into the at least one customer terminal by the customer who accepted the price of the display panels output on the at least one customer terminal;

a third process for checking a revised price of the general design circuit boards entered into the at least one general design circuit board manufacturer terminal by the general design circuit board manufacturer based on specification of the general design circuit boards and a delivery quantity output on the at least one general design circuit board manufacturer terminal against the information on the prices of the display panels stored in the memory, for extracting the price of the display panel linked to the price of the general design circuit boards as a revised price, and for outputting to the at least one customer terminal;

a fourth process, if at least one of an original orderer of the customer who made an order in the second process and a new orderer of the customer who did not make the order in the second process accepts the revised price output on the at least one customer terminal and enters an outline of the display panels and an order quantity into the at least one customer terminal, for calculating a revised delivery quantity of the general design circuit boards based on the entered outline of the display panels and the entered order quantity and for outputting the revised delivery quantity to the at least one general design circuit board manufacturer terminal; and a fifth process for controlling the frame processing section to process the frames of the general design circuit boards produced by the general design circuit board manufacturer based on the revised delivery quantity of the general design circuit boards output on the at least one general design circuit board manufacturer terminal based on the outline of the display panels and the order quantity entered in the at least one customer terminal; and information and communication lines connecting the at least one general design circuit board manufacturer terminal, the customer terminal, the frame processing section, and the memory to the processor for interactive information communication.

12. The production control system according to claim 11, wherein the at least one general design circuit board manufacturer terminal includes a plurality of general design circuit board manufacturer terminals, the processor performs a comparison between a plurality of prices of the general design circuit boards entered into the plurality of general design circuit board manufacturer terminals by the plurality of general design circuit board manufactures, extracts a lowest price, checks the lowest price against the information on the prices of the display panels stored in the memory, extracts the price of the display panels linked to the lowest price, and outputs the price of the display panels to the at least one customer terminal in the first and the processes.

13. The production control system according to claim 11, wherein the memory stores a number of the general design circuit boards arranged within plate surfaces of general design base boards when production of the general design base boards including the plate surfaces within which the general design circuit boards are arranged is outsourced to the general design circuit board manufacturer, and when an outline of the display panels and the order quantity are entered into the at least one customer terminal by the customer, the processor calculates a delivery quantity of the general design base boards by dividing an order quantity of the display panels by the number of the general design circuit boards per general design base board stored in the memory and outputting the delivery quantity to the at least one general design circuit board manufacturer in the second and the fourth processes.

14. A method of controlling production for producing display panels having an outline specified in an order from a customer, the method comprising:

a general design circuit board producing step for producing general design circuit boards in general design including at least an estimated maximum outline of the display panels in an expected order; and a frame processing step for processing frames of the general design circuit boards for an order quantity based on the specified outline of the display panels and the order quantity in the order from the customer.

15. A method of controlling production for producing display panels with at least one type of outlines specified in an order from a single or a plurality of customers by outsourcing production of general design circuit boards in general design including at least an estimated maximum outline of the display panels in an expected order to a single or a plurality of general design circuit board manufacturers and for processing frames of the general design circuit boards produced through outsourcing, the method comprising:

a first step for providing the single or the plurality of customers with a price of the display panels calculated based on a price of the general design circuit boards provided by the single or the plurality of general design circuit board manufacturers;

a second step for providing the single or the plurality of general design circuit board manufacturers with at least one delivery quantity calculated based on the outline of the display panels and an order quantity in an order from the single or the plurality of customers who accepted the provided price of the display panels;

a third step for providing the single or the plurality of customers with a price of the display panels calculated based on a revised price of the general design circuit boards provided by the single or the plurality of general design circuit board manufacturers based on the provided delivery quantity of the general design circuit boards as a revised price of the display panels;

a fourth step for calculating a revised delivery quantity of the general design circuit boards based on an outline of the display panels and an order quantity in an additional order if at least one of an original orderer of the customer who made the order in the second step and a new orderer of the customer who did not make the order in the second step accepted the provided revised price of the display panels and made the additional order and providing the single or the plurality of the general design circuit board manufacturers with the revised delivery quantity of the general design circuit boards; and a fifth step for controlling a frame processing section to process frames of the general design circuit boards produced by the single or the plurality of general design circuit board manufacturers based on the provided revised delivery quantity of the general design circuit boards based on the outline of the display panels and the order quantity in the order from the single or the plurality of customers.

\* \* \* \* \*